United States Patent
Tojo

(10) Patent No.: US 7,704,311 B2
(45) Date of Patent: *Apr. 27, 2010

(54) INK COMPOSITION, MANUFACTURING METHOD OF INK, INK SET, AND RECORDING METHOD

(75) Inventor: Kaoru Tojo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 12/090,089

(22) PCT Filed: Oct. 20, 2006

(86) PCT No.: PCT/JP2006/321451

§ 371 (c)(1),
(2), (4) Date: Apr. 12, 2008

(87) PCT Pub. No.: WO2007/046553

PCT Pub. Date: Apr. 26, 2007

(65) Prior Publication Data

US 2009/0148602 A1    Jun. 11, 2009

(30) Foreign Application Priority Data

Oct. 20, 2005 (JP) .............................. 2005-306440
Feb. 9, 2006 (JP) .............................. 2006-032735

(51) Int. Cl.
*C09D 11/02* (2006.01)
*B41J 2/01* (2006.01)

(52) U.S. Cl. ................ 106/31.52; 106/31.48; 106/31.5; 347/100

(58) Field of Classification Search .............. 106/31.52, 106/31.48, 31.5; 347/100
See application file for complete search history.

(56) References Cited

U.S. PATENT DOCUMENTS 7,211,133 B2 * 5/2007 Taguchi .................. 106/31.52
7,250,079 B2 * 7/2007 Chino et al. ............. 106/31.52
7,303,272 B2 * 12/2007 Taguchi et al. ............... 347/100
7,503,966 B2 * 3/2009 Yabuki et al. ............. 106/31.52
7,520,928 B2 * 4/2009 Ikeda et al. .............. 106/31.52
7,527,683 B2 * 5/2009 Kawakami et al. ....... 106/31.48
7,527,684 B2 * 5/2009 Wachi ..................... 106/31.52
2004/0187232 A1 * 9/2004 Chino et al. .................... 8/639
2007/0109376 A1 * 5/2007 Tojo et al. ................. 106/31.52
2008/0043078 A1 * 2/2008 Wachi ..................... 106/31.52
2008/0043079 A1 * 2/2008 Ikeda et al. .............. 106/31.52

FOREIGN PATENT DOCUMENTS

| JP | 8-302255 A | 11/1996 |
|---|---|---|
| JP | 9-255906 A | 9/1997 |
| JP | 2000-265099 A | 9/2000 |
| JP | 3178200 B2 | 4/2001 |
| JP | 2002-332426 A | 11/2002 |
| JP | 2005-146244 A | 6/2005 |
| JP | 2005-194522 A | 7/2005 |
| JP | 2005-344071 A | 12/2005 |
| JP | 2006-089686 A | 4/2006 |
| JP | 2006-282795 A | 10/2006 |

OTHER PUBLICATIONS

Abstract of WO 2006/006726, Jan. 2006.*
Abstract of WO 2006/006703, Jan. 2006.*
Abstract of WO 2005/121261, Dec. 2005.*
Shikisai Kagaku Handbook (Handbook of Color Science), The Second Edition, pp. 560-562.

* cited by examiner

*Primary Examiner*—Helene Klemanski
(74) *Attorney, Agent, or Firm*—Sughrue Mion, PLLC

(57) ABSTRACT

An ink composition, which comprises at least two kinds of water-soluble dyes, wherein at least one of the at least two kinds of water-soluble dyes is a compound selected from the group consisting of a compound represented by formula (S-1), which is described in the specification, and a salt of the compound represented by formula (S-1) and at least one of the at least two kinds of water-soluble dyes is a compound represented by formula (L-1), which is described in the specification, or a compound having a naphthalene ring substituted with at least one hydroxyl group and three or more azo groups.

14 Claims, No Drawings

INK COMPOSITION, MANUFACTURING METHOD OF INK, INK SET, AND RECORDING METHOD

TECHNICAL FIELD

The present invention relates to an ink composition, a manufacturing method of ink, an ink set, and a recording method, in particular, relates to a black ink composition capable of forming an image excellent in anti-blotting under high humidity conditions.

BACKGROUND ART

The ink jet recording method has rapidly developed and is spreading even now for the reasons that the materials are inexpensive, high speed recording is possible, the noise in the time of recording is low, and color recording is easy.

The ink jet recording method includes a continuous system of continuously ejecting ink droplets, and an on-demand system of ejecting ink droplets corresponding to image data signals, and the ejection system includes a system of ejecting ink droplets by the application of pressure with piezo elements, a system of ejecting ink droplets by the generation of foams in the ink by heat, a system of using ultrasonic waves, and a system of ejecting ink droplets by suction with electrostatic force.

As the ink jet recording ink, aqueous ink, oil ink or solid (melting type) ink is used.

The colorants for use in these ink jet recording inks are required to have good solubility or dispersibility in a solvent, to be excellent in a color developing property and capable of high density recording, to show good hue, to be fast to light, heat and active gases in the environment (oxidizing gases, e.g., $NO_x$, ozone, etc., and $SO_x$, etc.), to be excellent in fastness to water and chemicals, to be good in fixing ability to image-receiving materials and to hardly blot, to be excellent in preservability as ink, to be nontoxic, to be highly pure, and to be available inexpensively. However, it is extremely difficult to find colorants that satisfy these requirements on a high level. In particular, colorants for black ink having good black tone, capable of high density printing, and fast to light, humidity and heat are strongly desired.

Disazo dyes and trisazo dyes have been conventionally used as dyestuffs for black, but these dyes alone are not sufficient for absorption of blue and green lights to obtain good black tone in many cases, so that dyes for color correction of absorbing blue and green lights are generally used in combination. As such dyes for color correction, the dyes as disclosed in JP-A-9-255906 (the term "JP-A" as used herein refers to an "unexamined published Japanese patent application") and Japanese Patent 3178200 are proposed to contrive to improve the adjusting ability of black tone, a color developing property, fastness, the preservation stability of ink, water tightness, and clogging of nozzles.

However, conventionally proposed dyes for color correction are too short in wavelength of absorption, and so they are wanting in the adjusting ability of black tone such that dyes must be added in quantities or other dyes for color correction are further necessary.

Although dyes capable of absorbing blue and green lights are generally known, these dyes are inferior in fastness, so that hue is largely changed by the exposure of an image to light, heat and active gases in the environment, and fixing ability is also insufficient. As a result, a phenomenon that the dye at the contour part bleeds in yellow inevitably occurs under high humidity condition, thus further improvement is necessary.

In consideration of these drawbacks, a black ink composition comprising a black dye having been blended with, as the dye for color correction, a triazine dye having the absorption maximum at 435 nm of the absorption spectrum in the visible region in an aqueous solvent is disclosed in JP-A-2002-332426.

However, general black dyes have the absorption maximum at 570 to 620 nm, so that, considering the relationship of complementary colors important for black tone adjustment, it is apparent that suitable black tone cannot be obtained even the dye for color correction is used (Shikisai Kagaku Handbook (Handbook of Color Science), the Second Edition, pp. 560-562, Publishing Association, The University of Tokyo (1998)).

C.I. Direct Red 84 is disclosed in JP-A-8-302255, but there is no description in the same patent about a black ink composition of using the dye as the short wave dye and combining with a long wave dye.

JP-A-2000-265099 discloses C.I. Direct Red 84 (paragraph 8), but as magenta, and there is also no description in the same patent about a black ink composition of using the dye as the short wave dye and combining with a long wave dye similarly to the above patent.

A black ink composition combined with a specific long wave dye is disclosed in JP-A-2005-146244.

DISCLOSURE OF THE INVENTION

The present invention aims at solving the above problems and achieving the following objects.

Accordingly, an object of the invention is to provide a black ink composition containing at least two kinds of water-soluble dyes not necessitating the addition in large quantities or of other dyes for color correction, capable of printing of excellent black tone in high density, and excellent in weather-proofness, in particular excellent in water tightness (free from blotting), another object is to provide an ink set containing the same, and a further object is to provide an ink jet recording method using the same.

The present inventors have found that the above objects can be achieved by the use of specific water-soluble dyes in combination.

(1) An ink composition, which comprises:

at least two kinds of water-soluble dyes, wherein at least one of the at least two kinds of water-soluble dyes is a compound selected from the group consisting of a compound represented by formula (S-1) and a salt of the compound represented by formula (S-1); and at least one of the at least two kinds of water-soluble dyes is a compound represented by formula (L-1) or a compound having a naphthalene ring substituted with at least one hydroxyl group and three or more azo groups:

(S-1)

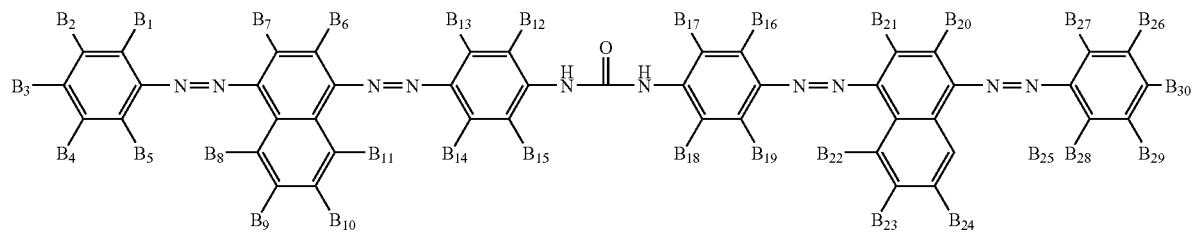

wherein $B_1$ to $B_{30}$ each independently represents a hydrogen atom or an ionic hydrophilic group, provided that at least one of $B_1$ to $B_{30}$ contains at least one ionic hydrophilic group:

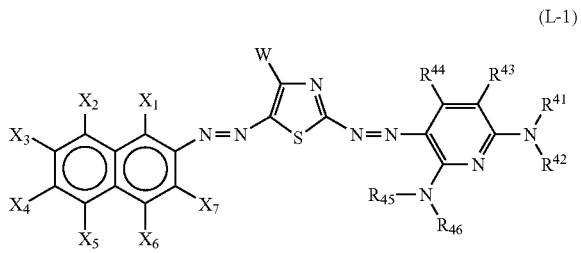

(L-1)

wherein W, $R_{43}$ and $R_{44}$ each independently represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, and a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each of these groups may further be substituted;

$R_{41}$, $R_{42}$, $R_{45}$ and $R_{46}$ each independently represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group or a sulfamoyl group, and each of these groups may further have a substituent, provided that $R_{41}$ and $R_{42}$ do not represent a hydrogen atom at the same time, and $R_{43}$ and $R_{41}$, $R_{41}$ and $R_{42}$, or $R_{45}$ and $R_{46}$ may be bonded to each other to form a 5- or 6-membered ring; and $X_1$, $X_2$, $X_3$, $X_4$, $X_5$, $X_6$ and $X_7$ each independently represents a monovalent group, provided that formula (L-1) contains at least one ionic hydrophilic group.

(2) The ink composition as described in above (1), wherein the number of azo groups of the compound having a naphthalene ring substituted with at least one hydroxyl group and three or more azo groups is five or less.

(3) The ink composition as described in above (1) or (2), wherein the compound having a naphthalene ring substituted with at least one hydroxyl group and three or more azo groups contains one or more sulfonic acid group(s), one or more carboxyl group(s), or one or more sulfonic acid group(s) and one or more carboxyl group(s).

(4) The ink composition as described in any of above (1) to (3), wherein the compound having a naphthalene ring substituted with at least one hydroxyl group and three or more azo groups is a compound selected from the group consisting of a compound represented by formula (L-2), a salt of the compound represented by formula (L-2), a compound represented by formula (L-2a), a salt of the compound represented by formula (L-2a), a compound represented by formula (L-3), a salt of the compound represented by formula (L-3), a compound represented by (L-4) and a salt of the compound represented by formula (L-4):

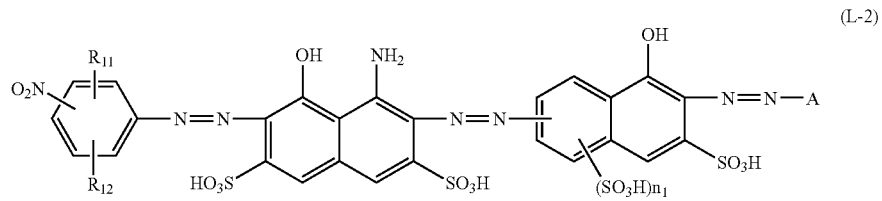

(L-2)

wherein $R_{11}$ and $R_{12}$ each independently represents a hydrogen atom; a halogen atom; a cyano group; a carboxyl group; a sulfo group; a sulfamoyl group that may be substituted with an alkyl group or a phenyl group; a phosphoric acid group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group or a carboxyl group; or an acylamino group that may be substituted with a hydroxyl group, an alkoxyl group having from 1 to 4 carbon atoms, a sulfo group or a carboxyl group;

A represents a phenyl group or a naphthyl group, and each of the phenyl group and the naphthyl group may be substituted with a halogen atom; a cyano group; a carboxyl group; a sulfo group; a sulfamoyl group that may be substituted with an alkyl group or a phenyl group; a phosphoric acid group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group or a carboxyl group; or an acylamino group that may be substituted with a hydroxyl group, an alkoxyl group having from 1 to 4 carbon atoms, a sulfo group or a carboxyl group; and $n_1$ represents 0 or 1:

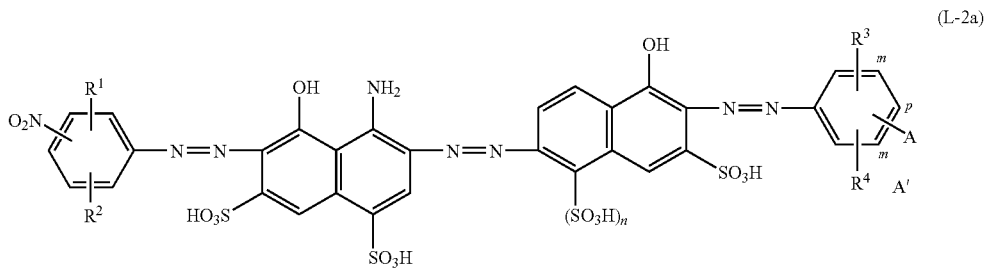

wherein A' represents formula (L-2a-1);

the substitution position of A' is the m- or p-position to the azo group;

$R^1$ and $R^2$ each represents a hydrogen atom; a halogen atom; a cyano group; a carboxyl group; a sulfo group; a sulfamoyl group; an N-alkylaminosulfonyl group; an N-phenylamino-sulfonyl group; a phospho group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group, or a carboxyl group; or an acylamino group that may be substituted with an alkoxyl group having from 1 to 4 carbon atoms, a sulfo group or a carboxyl group;

$R^3$ and $R^4$ each independently represents a hydrogen atom; a halogen atom; a cyano group; a carboxyl group; a sulfo group; a nitro group; an alkyl group having from 1 to 4 carbon atoms; a hydroxyl group; or an alkoxyl group having from 1 to 4 carbon atoms that may be substituted with an alkoxyl group having from 1 to 4 carbon atoms or a sulfo group; and n represents 0 or 1:

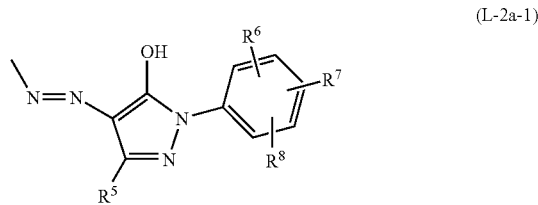

wherein $R^5$ represents a cyano group; a carboxyl group; an alkyl group having from 1 to 4 carbon atoms; an alkoxycarbonyl group having from 1 to 4 carbon atoms; or a phenyl group;

$R^6$, $R^7$ and $R^8$ each independently represents a hydrogen atom; a halogen atom; a cyano group; a carboxyl group; a sulfo group; a nitro group; an alkyl group having from 1 to 4 carbon atoms; a hydroxyl group; an alkoxyl group having from 1 to 4 carbon atoms that may be substituted with a sulfo group; or an acylamino group that may be substituted with a hydroxyl group, an alkoxyl group having from 1 to 4 carbon atoms or a sulfo group:

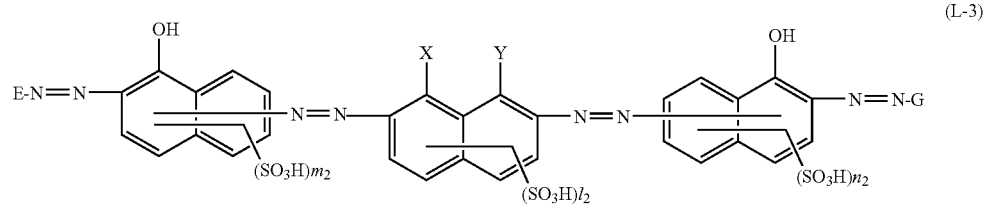

wherein E and G each independently represents a phenyl group that may be substituted; a naphthyl group that may be substituted; or a 5- or 6-membered aromatic heterocyclic group bonding to the azo group via a carbon atom, and each of E and G contains one or more carboxyl groups, one or more sulfo groups, or one or more carboxyl groups and one or more sulfo groups;

one of X and Y represents a hydroxyl group, and the other represents an amino group;

and $l_2$, $m_2$ and $n_2$ each independently represents 1 or 2:

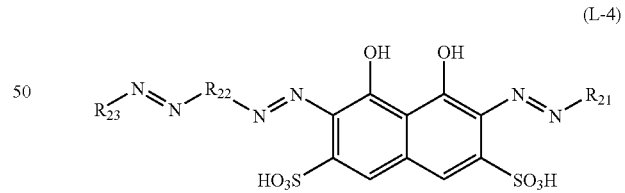

wherein $R_{21}$ represents a phenyl group having a substituent or a naphthyl group having a substituent;

$R_{22}$ represents a phenylene group having a substituent or a naplithylene group having a substituent;

$R_{23}$ represents a 5- to 7-membered heterocyclic group having at least one double bond and a substituent; and the substituents in $R_{21}$, $R_{22}$ and $R_{23}$ are each independently selected from the group consisting of OH, $SO_3H$, $PO_3H_2$, $CO_2H$, $NO_2$, $NH_2$, an alkyl group having from 1 to 4 carbon atoms, an alkyl group having from 1 to 4 carbon atoms and a substituent, an alkoxyl group having from 1 to 4 carbon atoms, an alkoxyl group having from 1 to 4 carbon atoms and a substituent, an amino group, an amino group having a substituent, and a phenyl group having a substituent.

(5) The ink composition as described in above (4), wherein the compound represented by formula (L-4) is selected from the group consisting of a compound represented by formula (L-5) and a salt of the compound represented by formula (L-5):

(L-5)

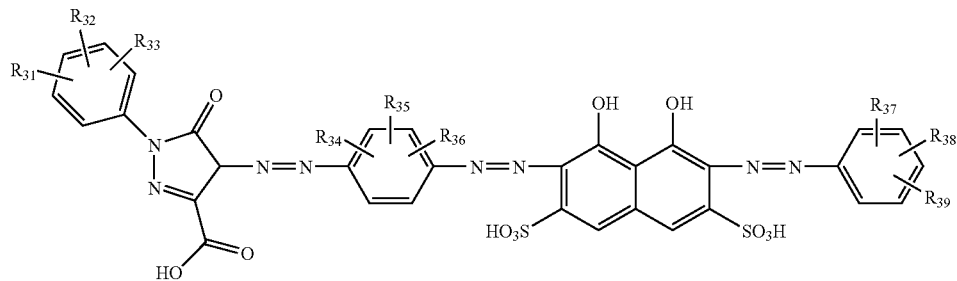

(L-5)

wherein $R_{31}$ to $R_{39}$ each independently represents a group selected from the group consisting of H, OH, $SO_3H$, $PO_3H_2$, $CO_2H$, $NO_2$ and $NH_2$.

(6) The ink composition as described in any of above (1) to (5), wherein at least one ionic hydrophilic group in the compound represented by formula (S-1) is a sulfo group.

(7) The ink composition as described in any of above (1) to (6), which comprises the compound represented by formula (S-1) and a salt of the compound represented by formula (S-1) in an amount of from 0.1 to 4 mass %. (In this specification, mass ratio is equal to weight ratio.)

(8) The ink composition as described in any of above (1) to (7), wherein at least one of the compound represented by formula (S-1), the compound represented by formula (L-1) and the compound having a naphthalene ring substituted with at least one hydroxyl group and three or more azo groups is a salt having a lithium ion as a counter ion.

(9) An ink-manufacturing method, which comprises:
preparing an ink stock solution by dissolving a compound represented by formula (S-1) in water; and
reducing a concentration of the compound represented by formula (S-1) in the ink stock solution to make the ink composition as described in any of above (1) to (8).

(10) The ink-manufacturing method as described in above (9), wherein the ink stock solution contains a water-miscible organic solvent.

(11) The ink-manufacturing method as described in above (10), wherein the water-miscible organic solvent is selected from the group consisting of 2-pyrrolidone, triethylene glycol monobutyl ether, diethylene glycol monobutyl ether, triethylene glycol and diethylene glycol.

(12) An ink composition, which is produced by the manufacturing method as described in any of above (9) to (11).

(13) An ink set comprising an ink composition as descried in any of above (1) to (8).

(14) A recording method, which comprises:
applying an ink composition as described in any of above (1) to (8) to a recording medium to perform record.

(15) A recording method, which comprises:
loading an ink set as described in above (13) on a recording apparatus; and
applying an ink from the recording apparatus to a recording medium.

(16) The recording method as described in above (14) or (15), which comprises:
ejecting the ink composition from an ink jet nozzle to a recording medium.

BEST MODE FOR CARRYING OUT THE INVENTION

The invention will be described in detail below.

The ink composition according to the invention is an ink composition containing at least two kinds of water-soluble dyes, and at least one of the water-soluble dyes is a compound selected from the group consisting of a compound represented by formula (S-1), and a salt thereof (hereinafter sometimes referred to as "water-soluble short wave dye S"), and at least one of the water-soluble dyes is a compound selected from a compound represented by formula (L-1), and a compound having a naphthalene ring substituted with at least one hydroxyl group and three or more azo groups (hereinafter sometimes referred to as "water-soluble long wave dye L").

The ink composition in the invention is preferably used as black ink.

Water-Soluble Short Wave Dye S:

Water-soluble short wave dye S is preferably a dye having the maximum of an absorption spectrum (the absorption maximum: λmax) in an aqueous solvent of from 440 to 540 nm, the half value width of the absorption spectrum of from 90 to 200 nm, and capable of achieving broad absorption. Here, an aqueous solvent means a medium comprising water as the main solvent and may contain an appropriate amount of a water-miscible organic solvent capable of dissolving or dispersing a dye. Further, an absorption spectrum means an absorption spectrum that is measured with a usually used spectrophotometer using a cell of 1 cm. These are also the same as in water-soluble long wave dye L described later.

The absorption spectrum of water-soluble short wave dye S is an absorption spectrum measured with a single compound. That is, when an absorption spectrum in an aqueous solvent is measured, water-soluble short wave dye S in the invention means to show the physical properties such as the desired absorption maximum and half value width not by combining a plurality of compounds but to show these physical properties by a single compound. Incidentally, it is apparent in the invention that as water-soluble short wave dyes S (hereinafter also referred to as "short wave dye S"), compounds having structures different from each other may be used in combination. Further, in the invention, dyes other than the compound represented by formula (S-1) may be used in combination.

Having such absorption characteristics, short wave dye S can absorb lights in a broad range from blue to green that is liable to be insufficient with the absorption spectra of water-soluble long wave dye L, and has preferred absorption characteristics as a color correction dye.

The absorption maximum of short wave dye S is preferably from 440 to 520 nm, and especially preferably from 460 to 500 nm.

The half value width at the absorption maximum of short wave dye S is preferably from 100 to 180 nm, and especially preferably from 110 to 160 nm.

It is preferred for short wave dye S in the invention not to have a dissociable phenolic hydroxyl group that is present in ordinary dyestuffs, which structure ensures preferred properties, for example, variation in tone dependent upon the image-receiving material used is little, and reactivity with oxidizing gas, e.g., ozone in the air, is low and excellent in an antigas property.

Here, "a dissociable phenolic hydroxyl group" means a dissociable hydroxyl group that is substituted with an aryl group. The aryl group may be substituted with other substituent.

It is preferred for short wave dye S in the invention to have from 4 or more azo groups in one molecule, which structure enhances a color developing property, and provides images having good fixing ability due to the broadened plane of dyestuff.

The ink composition in the invention contains a compound selected from the group consisting of a compound represented by formula (S-1) and a salt thereof:

In formula (S-1), $B_1$ to $B_{30}$ represent a hydrogen atom or an ionic hydrophilic group, and formula (S-1) contains at least one ionic hydrophilic group.

The ionic hydrophilic groups include a sulfo group, a carboxyl group, a phosphono group, a quaternary ammonium group, etc. As the ionic hydrophilic groups, a carboxyl group, a phosphono group, and a sulfo group are preferred, a carboxyl group and a sulfo group are especially preferred, and a sulfo group is most preferred from the viewpoint of increasing solubility in an aqueous solvent. A carboxyl group, a phosphono group, and a sulfo group may be in the state of a salt. The examples of ions having counter charge to the water-soluble groups and forming a salt (ion pair) (hereinafter referred to as a counter salt or a counter ion) include ammonium, an alkali metal (e.g., lithium, sodium, potassium), and an organic cation (e.g., tetramethylammonium, tetramethylguanidinium, tetramethylphosphonium). As the counter ions, ions of ammonium, lithium, sodium and potassium are preferred, a sodium ion and a lithium ion are more preferred, and a lithium ion is most preferred.

The examples of the compounds represented by formula (S-1) that are preferably used in the invention are shown below as the structure of a free acid, but of course the compounds may be used in the form of an arbitrary salt.

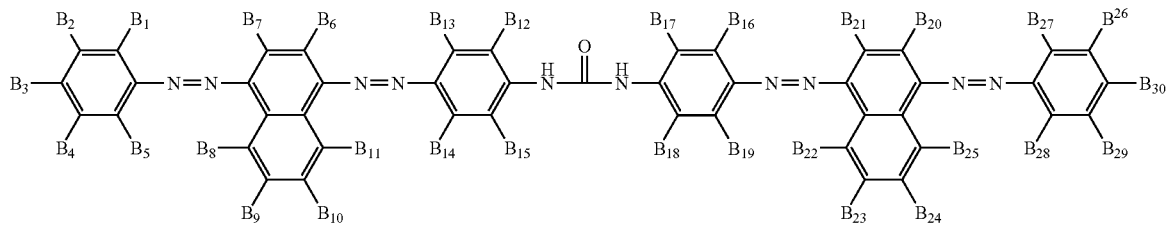

(S-1)

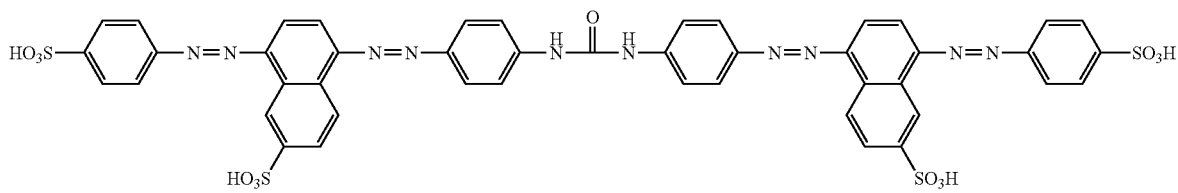

SB-1

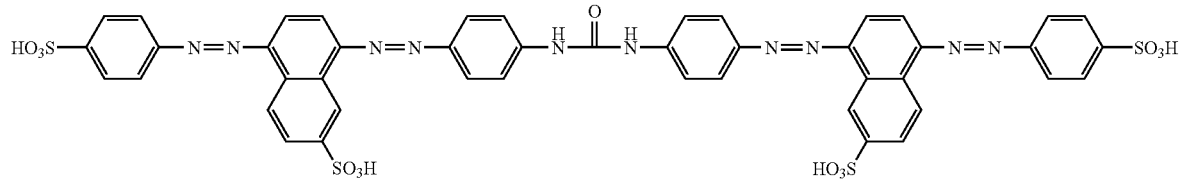

SB-2

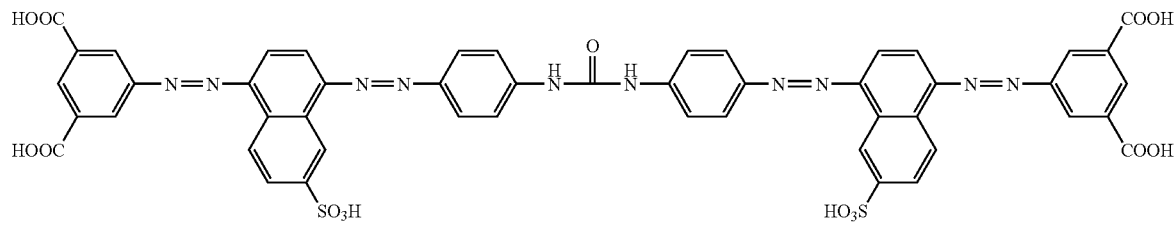

SB-3

Of these compounds, Compound (SB-1) is more preferred. The compounds may be used in the form of an salt as described above, and sodium salt of the exemplified Compound (SB-1) is preferred for capable of available as a commercial dye as C.I. Direct Red 84. A salt having lithium as the counter ion is excellent in water solubility and the dye is difficult to precipitate as compared with salts having other counter ions. Therefore, such a compound is excellent in preservation stability as a solution, and especially preferred in the point of capable of obtaining an image free from bronzing and blotting.

Incidentally, short wave dyes S other than commercially available dyes can be easily synthesized with commercially available materials according to the synthesizing route of C.I. Direct Red 84 as described in Color Index, Vol. 4, published by The Society of Dyers and Colourists.

The ink composition in the invention contains from 0.1 to 3 mass % of short wave dye S, preferably from 0.2 to 2.5 mass %, and especially preferably from 0.3 to 2.0 mass %, but the amount can be arbitrarily changed as desired.

Water-Soluble Long Wave Dye L:

Water-soluble long wave dye L in the invention has the maximum of an absorption spectrum (the absorption maximum) in an aqueous solvent of from 550 to 700 nm and half value width of 100 nm or more (preferably from 120 to 500 nm, and more preferably from 120 to 350 nm).

The absorption spectrum of water-soluble long wave dye L is an absorption spectrum measured with a single compound. That is, when an absorption spectrum in an aqueous solvent is measured, water-soluble long wave dye L in the invention means to show the physical properties such as the desired absorption maximum and half value width not by combining a plurality of compounds but to show these physical properties by a single compound. Incidentally, it is apparent in the invention that as water-soluble long wave dyes L (hereinafter also referred to as "long wave dye L"), compounds having structures different from each other may be used in combination so long as they satisfy the absorption spectra. Further, in the invention, dyes other than long wave dye L having the absorption spectrum characteristics may be used in combination.

It is preferred for long wave dye L to have from 2 to 5 conjugated azo groups in one molecule.

Further, as long wave dye L, a dye having a property capable of association and whose reaction can be physically controlled is more preferred.

Whether a dye is in an association state or not can be easily judged by the measurement of visible absorption spectra by changing the concentration of the dye, and judging whether the dye has an associating property or not by the examination of the absorption maximum wavelength, the molar absorption coefficient and the change of wave form, and comparing these solution physical properties and the absorption spectra of the dye on an image-receiving material.

Specifically, a preferred dye is a dye that forms the relationship of $\epsilon 1/\epsilon 2 > 1.2$ between the molar absorption coefficient ($\epsilon 1$) in the maximum wavelength of visible region absorption at the time when 0.1 mmol/liter of a dye aqueous solution is measured with a cell of optical path length of 1 cm, and the molar absorption coefficient ($\epsilon 2$) at the time when 0.2 mol/liter of the aqueous solution is measured with a liquid crystal cell of optical path length of 5 μm, as defined in JP-A-2004-307831.

The ink composition in the invention contains a compound represented by the following formula (L-1), or a compound having a naphthalene ring substituted with at least one hydroxyl group and three or more azo groups.

In the following formula, the dye is shown as a free acid structure, but of course the dye may be used in the form of a salt in practical use.

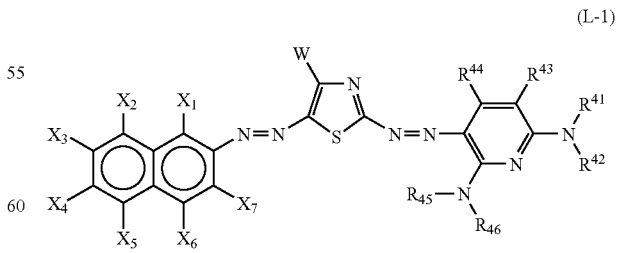

(L-1)

In formula (L-1), W, $R_{43}$ and $R_{44}$ each represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxyl group, an aryloxy group, a heterocyclic oxy group, a silyloxy group, an acyloxy group, a carbamoyloxy group, an alkoxycarbonyloxy group, an aryloxycarbonyloxy group, an amino group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group, and each of these groups may further be substituted; $R_{41}$, $R_{42}$, $R_{45}$ and $R_{46}$ each represents a hydrogen atom, an alkyl group, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, and each of these groups may further have a substituent, provided that $R_{41}$ and $R_{42}$ do not represent a hydrogen atom at the same time, and $R_{43}$ and $R_{41}$, $R_{41}$ and $R_{42}$, or $R_{45}$ and $R_{46}$ may be bonded to each other to form a 5- or 6-membered ring; $X_1$, $X_2$, $X_3$, $X_4$, $X_5$, $X_6$ and $X_7$ each represents a monovalent group, provided that formula (L-1) contains at least one ionic hydrophilic group.

Formula (L-1) in the invention will be described in detail below.

$X_1$, $X_2$, $X_3$, $X_4$, $X_5$, $X_6$ and $X_7$ each preferably represents a hydrogen atom, a halogen atom, an alkyl group having from 1 to 4 carbon atoms, an alkenyl group, an alkynyl group, an aralkyl group, an aryl group, a heterocyclic group, a hydroxyl group, an alkoxyl group, an aryloxy group, a heterocyclic oxy group, a silyloxy group, an acyloxy group, an amino group, an alkylamino group, an arylamino group, a heterocyclic amino group, an acylamino group, a ureido group, a sulfamoylamino group, an alkoxycarbonylamino group, an aryloxycarbonylamino group, an alkylthio group, an arylthio group, or a heterocyclic thio group, and each of these groups may further be substituted.

$X_1$, $X_2$, $X_3$, $X_4$, $X_5$, $X_6$ and $X_7$ each preferably represents a hydrogen atom, a halogen atom, an alkyl group having from 1 to 4 carbon atoms, a hydroxyl group, an alkoxyl group, an aryloxy group, a heterocyclic oxy group, a silyloxy group, an acyloxy group, an amino group, an alkylamino group, an arylamino group, a heterocyclic amino group, or an acylamino group, and of these groups, a hydrogen atom, an amino group, an alkylamino group, an arylamino group, a heterocyclic amino group, and an acylamino group are preferred, an amino group having a substituent is especially preferred, and an amino group substituted with an aryl group having an ionic hydrophilic group as the substituent (e.g., a substituted anilino group, etc.) is most preferred.

In formula (L-1), W preferably represents a substituted phenyl group, a substituted or unsubstituted naphthyl group, or a substituted or unsubstituted heterocyclic group (e.g., a pyrrole ring, a thiophene ring, an imidazole ring, a thiazole ring, a benzothiazole ring, a pyridine ring, or a pyridazine ring), and especially preferably a substituted phenyl group (in particular, a phenyl group substituted at the para-position), a substituted or unsubstituted β-naphthyl group, a pyridine ring, or a thiazole ring.

In formula (L-1), $R_{41}$ and $R_{42}$ each represents a hydrogen atom, an alkyl group having from 1 to 4 carbon atoms, an alkenyl group, an alkynyl group, an aralkyl group, an aryl group, a heterocyclic group, an acyl group, an alkoxycarbonyl group, an aryloxycarbonyl group, a carbamoyl group, an alkylsulfonyl group, an arylsulfonyl group, or a sulfamoyl group, and each of these groups may further have a substituent. Of these groups, a hydrogen atom, an alkyl group, an aryl group, a heterocyclic group, an acyl group, an alkylsulfonyl group, and an arylsulfonyl group are preferred, a hydrogen atom, an alkyl group, an aryl group, and a heterocyclic group are more preferred, a hydrogen atom, an aryl group having a substituent, and a heterocyclic group having a substituent are especially preferred, and a hydrogen atom, and an aryl group having a substituent are most preferred. However, $R_{41}$ and $R_{42}$ do not represent a hydrogen atom at the same time, and $R_{43}$ and $R_{41}$, $R_{41}$ and $R_{42}$, or $R_{45}$ and $R_{46}$ may be bonded to each other to form a 5- or 6-membered ring.

In formula (L-1), $R_{45}$ and $R_{46}$ have the same meaning as $R_{41}$ and $R_{42}$, and the preferred examples are also the same.

In formula (L-1), the ionic hydrophilic group has the same meaning as in Formula (S-1), and the preferred examples are also the same.

The especially preferred combinations as the compounds represented by formula (L-1) are combinations containing the following (a) to (e).

(a) $X_1$, $X_2$, $X_3$, $X_4$, $X_5$, $X_6$ and $X_7$ each represents a hydrogen atom, a halogen atom, an alkyl group having from 1 to 4 carbon atoms, an aryl group, a heterocyclic group, a cyano group, an alkoxyl group, an amido group, a ureido group, an alkylsulfonylamino group, an arylsulfonylamino group, a sulfamoyl group, an alkylsulfonyl group, an arylsulfonyl group, a carbamoyl group, an alkoxycarbonyl group, a sulfo group (including the salts thereof), a carboxyl group (including the salts thereof), a hydroxyl group (or the salts thereof), a phosphono group (or the salts thereof), or quaternary ammonium, and of these substituents, a hydrogen atom, a halogen atom, an alkyl group, a sulfo group (including the salts thereof), a carboxyl group (including the salts thereof), and a hydroxyl group (or the salts thereof) are preferred, and a hydrogen atom, a sulfo group (including the salts thereof), and a carboxyl group (including the salts thereof) are further preferred, in particular it is preferred that at least one of $X_1$, $X_2$, $X_3$, $X_4$, $X_5$, $X_6$ and $X_7$ represents a sulfo group (including the salts thereof) or a carboxyl group (including the salts thereof).

(b) W preferably represents a substituted phenyl group, a substituted or unsubstituted naphthyl group, or a substituted or unsubstituted heterocyclic group (e.g., a pyrrole ring, a thiophene ring, an imidazole ring, a thiazole ring, a benzothiazole ring, a pyridine ring, or a pyridazine ring), and especially preferably a substituted phenyl group (in particular, a phenyl group substituted at the para-position), a substituted or unsubstituted β-naphthyl group, a pyridine ring, or a thiazole ring.

(c) $R_{41}$ and $R_{42}$ each preferably represents a hydrogen atom, an alkyl group having from 1 to 4 carbon atoms, an aryl group, a heterocyclic group, an acyl group, an alkylsulfonyl group, or an arylsulfonyl group, more preferably a hydrogen atom, an alkyl group having from 1 to 4 carbon atoms, an aryl group, or a heterocyclic group, especially preferably a hydrogen atom, an aryl group having a substituent, or a heterocyclic group having a substituent, and most preferably a hydrogen atom or an aryl group having a substituent. However, $R_{41}$ and $R_{42}$ do not represent a hydrogen atom at the same time, and $R_{43}$ and $R_{41}$, or $R_{41}$ and $R_{42}$ may be bonded to each other to form a 5- or 6-membered ring.

(d) $R_{43}$ and $R_{44}$ each preferably represents a hydrogen atom, a halogen atom, an alkyl group, an alkenyl group, an alkynyl group, an aralkyl group, an aryl group, a heterocyclic group, a cyano group, a carboxyl group, a carbamoyl group, an alkoxycarbonyl group, an aryloxycarbonyl group, a heterocyclic oxycarbonyl group, a hydroxyl group, an amino group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, or a heterocyclic sulfonylamino group, and each of these groups may further be substituted.

$R_{43}$ more preferably represents a hydrogen atom, a halogen atom, an alkyl group, a heterocyclic group, a cyano group, a carboxyl group, a carbamoyl group, an alkoxycarbonyl group, an aryloxycarbonyl group, or a heterocyclic oxycarbonyl group, still more preferably represents a cyano group, a carboxyl group, a carbamoyl group, or an alkoxycarbonyl group, and especially preferably a cyano group.

$R_{44}$ more preferably represents a hydrogen atom, a halogen atom, an alkyl group having from 1 to 4 carbon atoms, an alkenyl group, an alkynyl group, an aralkyl group, an aryl group, a heterocyclic group, a hydroxyl group, an amino group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, or a heterocyclic sulfonylamino group, still more preferably represents a hydrogen atom, a halogen atom, an alkyl group having from 1 to 4 carbon atoms, an alkenyl group, an alkynyl group, an aralkyl group, or an aryl group, and most preferably a methyl group.

(e) $R_{45}$ and $R_{46}$ each preferably represents a hydrogen atom, an alkyl group having from 1 to 4 carbon atoms, an aryl group, a heterocyclic group, an acyl group, an alkylsulfonyl group, or an arylsulfonyl group, more preferably a hydrogen atom, an alkyl group having from 1 to 4 carbon atoms, an aryl group, or a heterocyclic group, especially preferably a hydrogen atom, an aryl group having a substituent, or a heterocyclic group having a substituent, and most preferably a hydrogen atom or an aryl group having a substituent. However, $R_{45}$ and $R_{46}$ do not represent a hydrogen atom at the same time, and $R_{45}$ and $R_{46}$ may be bonded to each other to form a 5- or 6-membered ring.

Regarding combination of the preferred substituents of the dyestuff represented by formula (L-1), a compound wherein at least one of various substituents is the above preferred group is preferred, a compound wherein more substituents of various substituents are the above preferred groups is more preferred, and a compound wherein all the substituents are the preferred groups is most preferred.

The specific examples of the azo dyes represented by formula (L-1) are shown below, but the invention is not limited thereto. The carboxyl group, phosphono group and sulfo group in the following specific examples may be in the state of salts, and the examples of counter ions for forming the salt include an ammonium ion, an alkali metal ion (e.g., a lithium ion, a sodium ion, a potassium ion), and an organic cation (e.g., a tetramethylammonium ion, a tetramethylguanidinium ion, a tetramethylphosphonium ion). Of these counter ions, the cases of an ammonium ion, a sodium ion, a potassium ion, and a lithium ion are preferred, and a lithium ion is most preferred.

| | A—N=N—B—N=N—C | |
|---|---|---|
| A | B | C |
| (a-1) 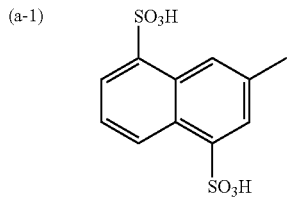 | 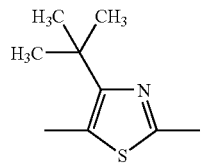 | 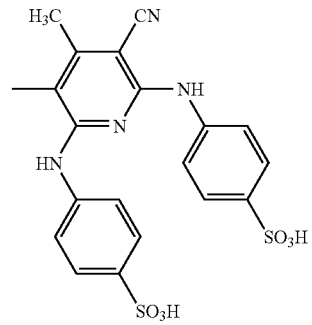 |
| (a-2) 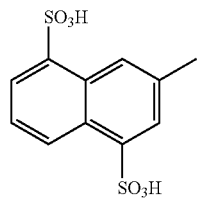 | 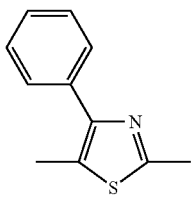 | 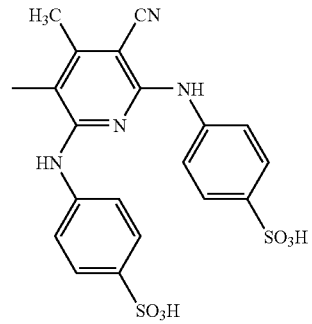 |

-continued
| | A | B | C |
|---|---|---|---|
A—N=N—B—N=N—C
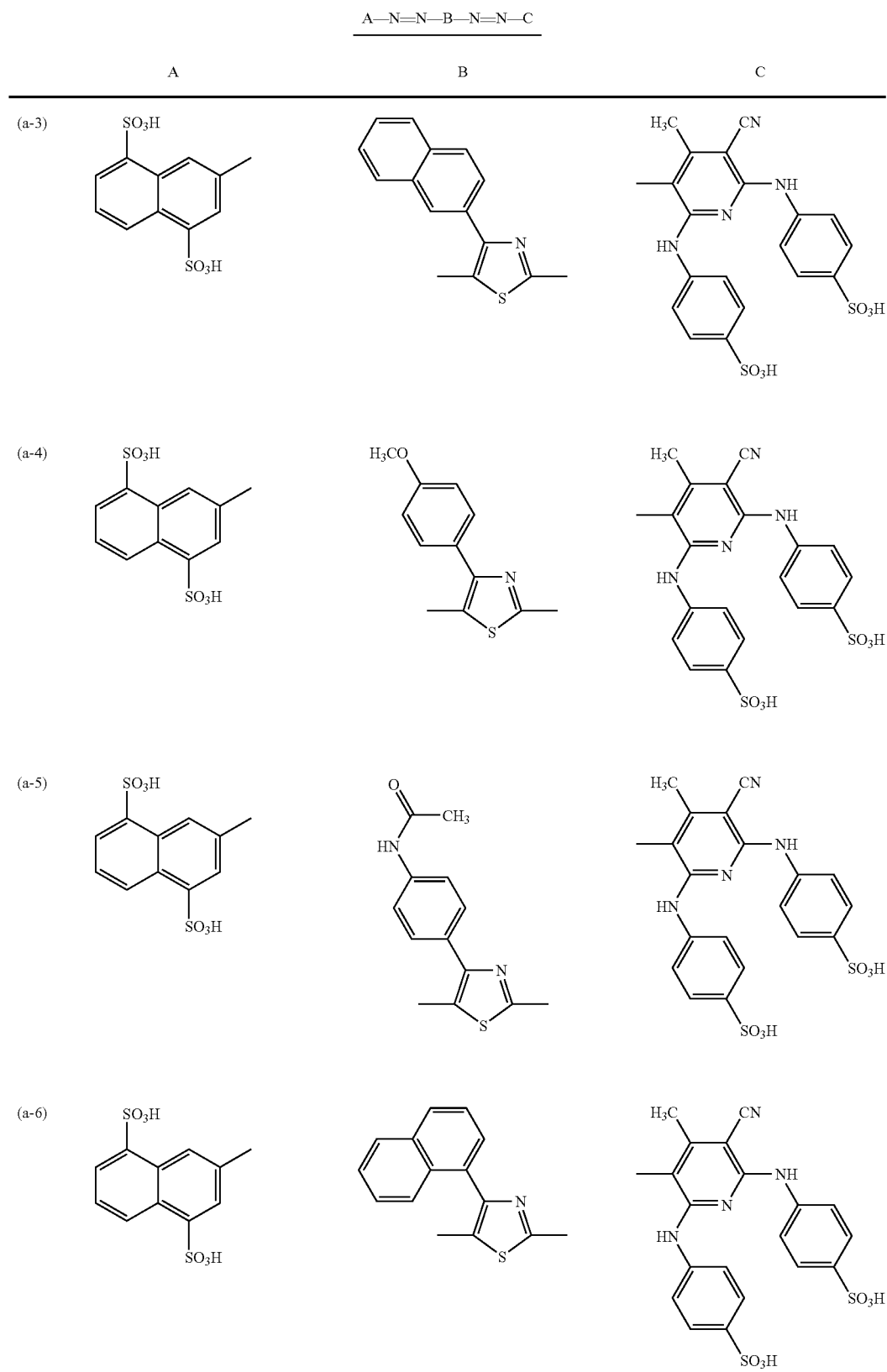
(a-3)
(a-4)
(a-5)
(a-6)

-continued
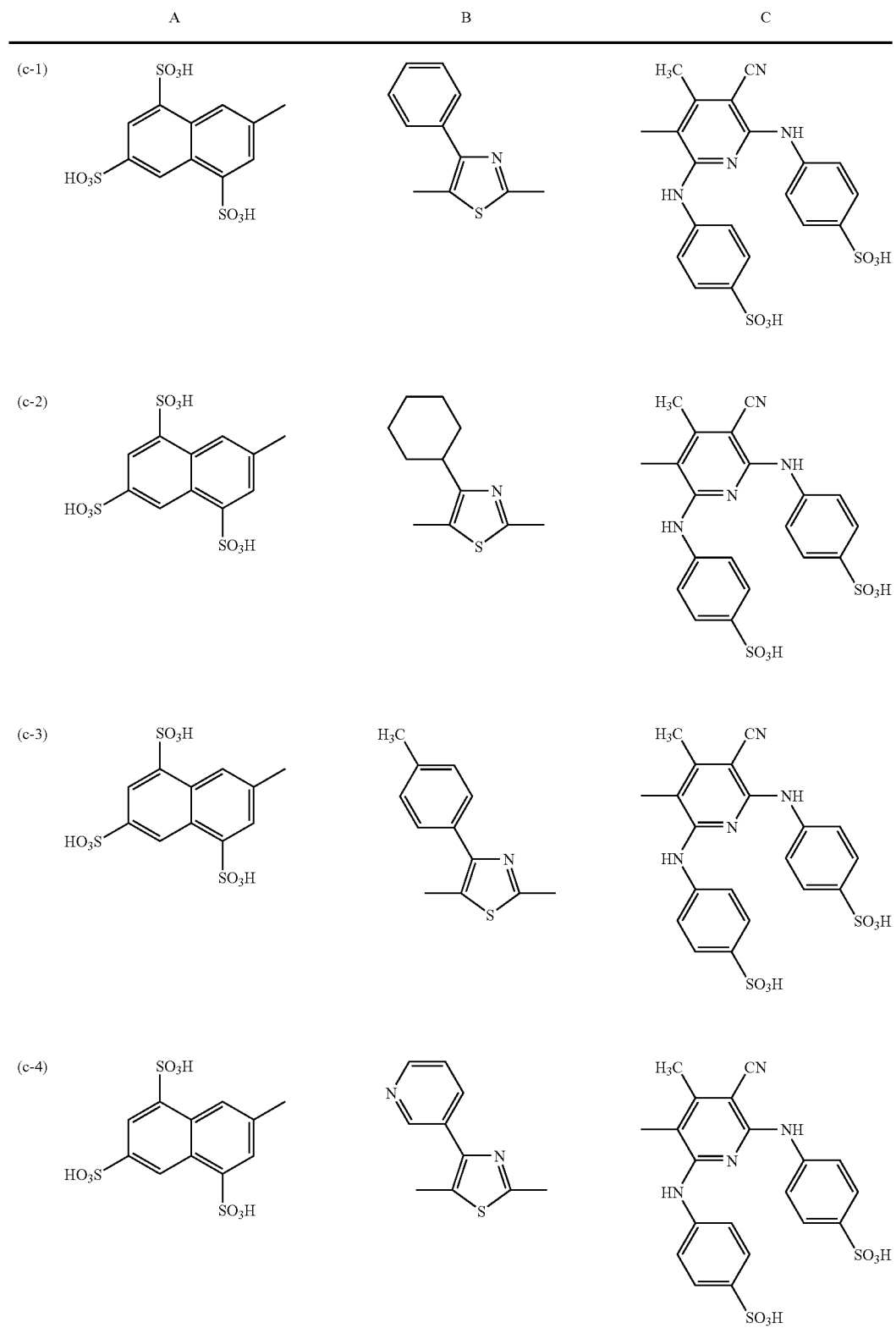

-continued
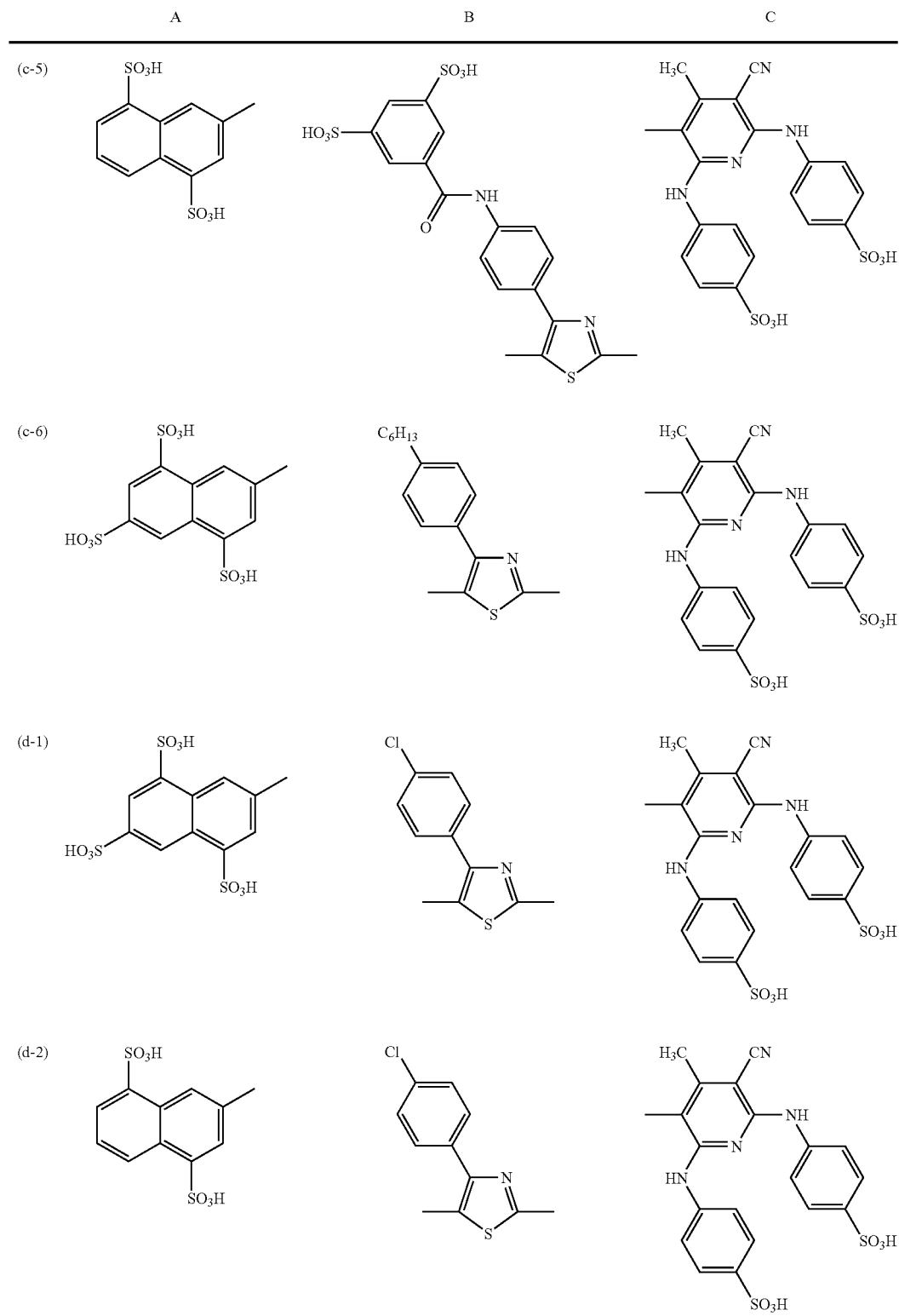

-continued
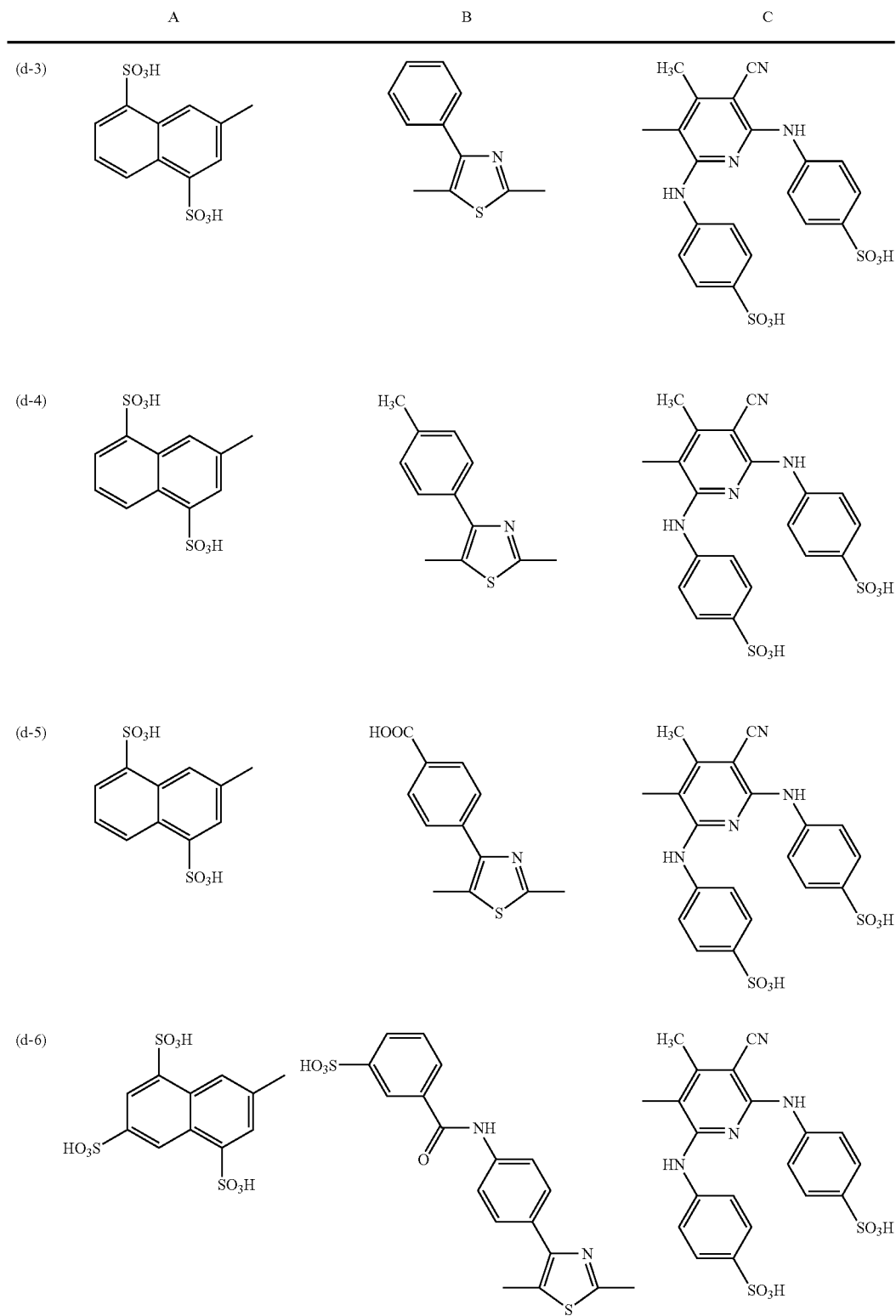

By using a compound having a naphthalene ring substituted with at least one hydroxyl group and three or more azo groups, an image excellent in image fastness and free from blotting in preservation under a high humidity condition can be obtained.

The more the number of azo groups of a compound, the higher is the molecular weight, so that the blotting of image can be restrained in preservation under a high humidity condition, but the solubility in ink is liable to lower, and there is a case where the preservation stability of ink becomes a problem. To reconcile these points, the number of azo groups is preferably from 3 to 5.

It is preferred for a compound having a naphthalene ring substituted with at least one hydroxyl group and three or more azo groups to have a hydrophilic group.

The examples of the hydrophilic groups include a sulfo group, a carboxyl group, a phosphono group, an amino group, a nitro group, and a quaternary ammonium group. As the hydrophilic groups, a carboxyl group, a phosphono group, an amino group, a nitro group, and a sulfo group are preferred, a carboxyl group and a sulfo group are especially preferred, and a sulfo group is most preferred from the viewpoint of increasing solubility in an aqueous solvent.

The hydrophilic group may be in the form of a salt. The examples of ions having counter charge to the hydrophilic groups and forming a salt (ion pair) (hereinafter referred to as a counter salt or a counter ion) include ammonium, an alkali metal (e.g., lithium, sodium, potassium), and an organic cation (e.g., tetramethylammonium, tetramethylguanidinium, tetramethylphosphonium). As the counter ions, ions of ammonium, lithium, sodium and potassium are preferred, a sodium ion and a lithium ion are more preferred, and a lithium ion is most preferred.

The compound having a naphthalene ring substituted with at least one hydroxyl group and three or more azo groups is preferably a compound selected from the compounds represented by formula (L-2), (L-2a), (L-3) or (L-4).

a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms or an acylamino group that may be substituted with a hydroxyl group, an alkoxyl group having from 1 to 4 carbon atoms, a sulfo group, or a carboxyl group; A represents a phenyl group or a naphthyl group, which may be substituted with a halogen atom; a cyano group; a carboxyl group; a sulfo group; a sulfamoyl group that may be substituted with an alkyl group having from 1 to 4 carbon atoms or a phenyl group; a phosphoric acid group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms or an acylamino group that may be substituted with a hydroxyl group, an alkoxyl group having from 1 to 4 carbon atoms, a sulfo group or a carboxyl group; and $n_1$ represents 0 or 1.

The compound represented by formula (L-2) is preferably a compound represented by the following formula (L-6).

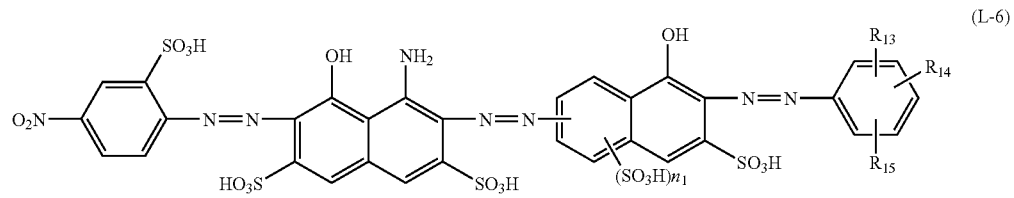

(L-6)

In formula (L-6), $R_{13}$, $R_{14}$ and $R_{15}$ each represents a hydrogen atom; a halogen atom; a cyano group; a carboxyl group; a sulfo group; a sulfamoyl group that may be substituted with an alkyl group having from 1 to 4 carbon atoms or a phenyl group; a phosphoric acid group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms or an acylamino group that may be substituted with a hydroxyl group, an alkoxyl group having from 1 to 4 carbon atoms, a sulfo group, or a carboxyl group; and at least one of $R_{13}$, $R_{14}$ and $R_{15}$ is a sulfo group or a carboxyl group; and $n_1$ is 0 or 1.

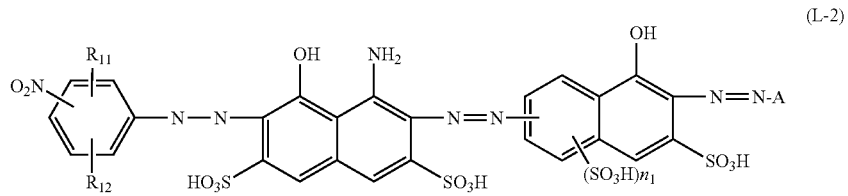

(L-2)

In formula (L-2), $R_{11}$ and $R_{12}$ each represents a hydrogen atom; a halogen atom; a cyano group; a carboxyl group; a sulfo group; a sulfamoyl group that may be substituted with an alkyl group having from 1 to 4 carbon atoms or a phenyl group; a phosphoric acid group; a nitro group; an acyl group;

The specific examples of preferred compounds represented by formula (L-2) and the salts thereof are shown below, but the invention is not restricted thereto. The following specific examples are shown in a free acid structure, but of course the compounds may be used in the form of an arbitrary salt.

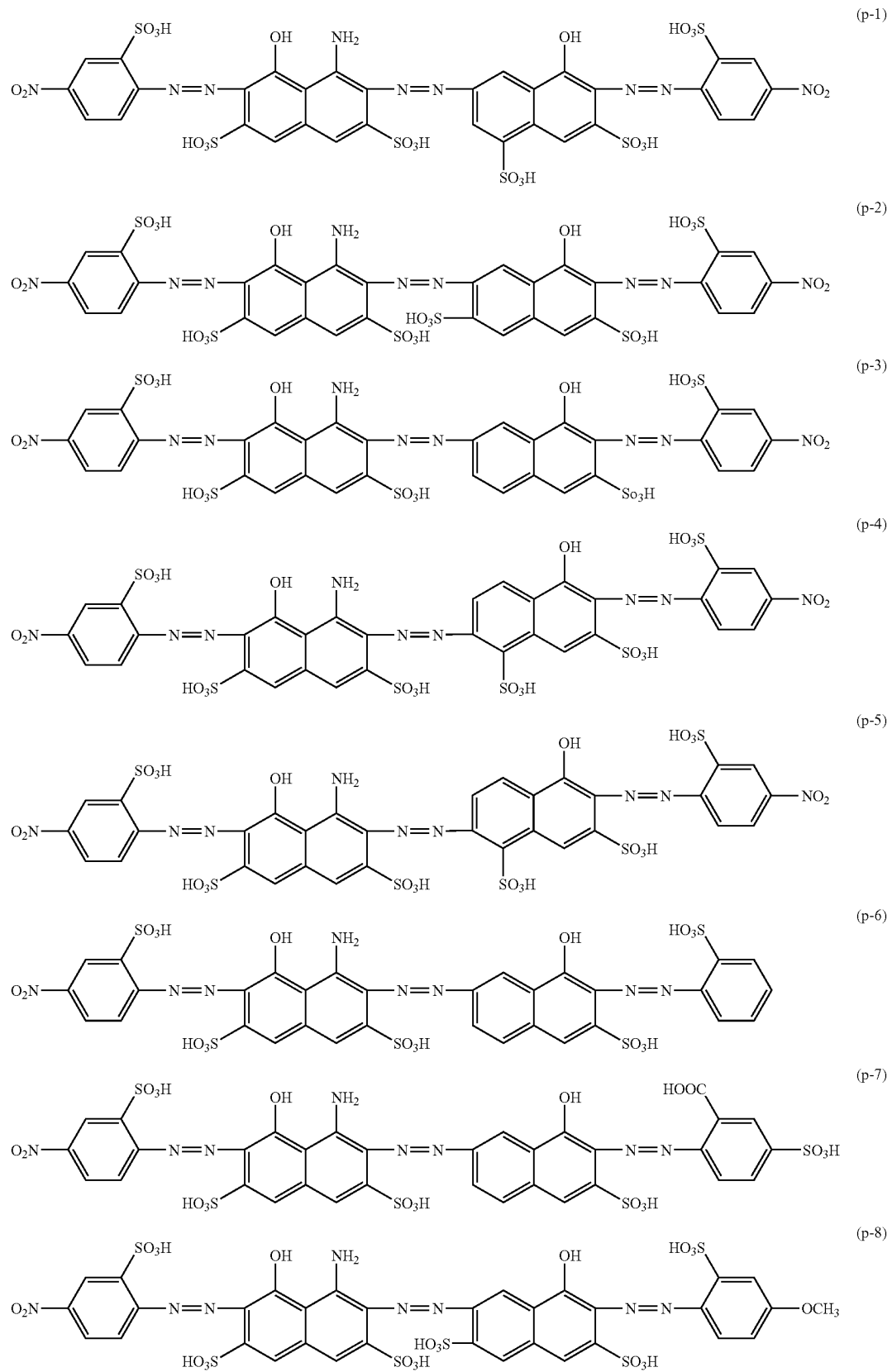

-continued

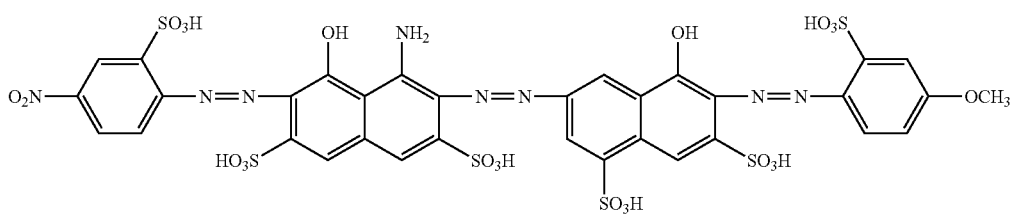

(p-9)

The compound represented by formula (L-2) and the salts thereof are disclosed in detail in JP-A-2005-220211, and the compounds shown in the same patent can be preferably used.

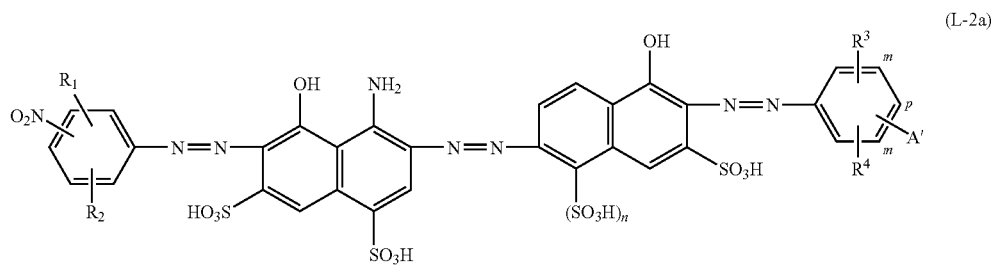

(L-2a)

In formula (L-2a), A' represents the following formula (L-2a-1), and the substitution position of A' is the m- or p-position to the azo group; $R^1$ and $R^2$ each represents a hydrogen atom; a halogen atom; a cyano group; a carboxyl group; a sulfo group; a sulfamoyl group; an N-alkylaminosulfonyl group; an N-phenylaminosulfonyl group; a phospho group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group, or a carboxyl group; or an acylamino group that may be substituted with an alkoxyl group having from 1 to 4 carbon atoms, a sulfo group, or a carboxyl group; $R^3$ and $R^4$ each represents a hydrogen atom; a halogen atom; a cyano group; a carboxyl group; a sulfo group; a nitro group; an alkyl group having from 1 to 4 carbon atoms; a hydroxyl group; or an alkoxyl group having from 1 to 4 carbon atoms that may be substituted with an alkoxyl group having from 1 to 4 carbon atoms or a sulfo group; and n represents 0 or 1.

In formula (L-2a-1), $R^5$ represents a cyano group; a carboxyl group; an alkyl group having from 1 to 4 carbon atoms; an alkoxycarbonyl group having from 1 to 4 carbon atoms, or a phenyl group; $R^6$, $R^7$ and $R^8$ each represents a hydrogen atom; a halogen atom; a cyano group; a carboxyl group; a sulfo group; a nitro group; an alkyl group having from 1 to 4 carbon atoms; a hydroxy group; an alkoxyl group having from 1 to 4 carbon atoms that may be substituted with a sulfo group; or an acylamino group that may be substituted with a hydroxyl group, an alkoxyl group having from 1 to 4 carbon atoms, or a sulfo group.

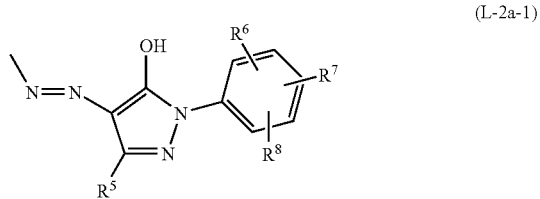

(L-2a-1)

The specific examples of preferred compounds represented by formula (L-2a) and the salts thereof are shown below, but the invention is not restricted thereto. The following specific examples (Compound Nos. 1 to 27) are shown in a free acid structure, but of course the compounds may be used in the form of an arbitrary salt.

| Cpd. No. | Structural Formula |
|---|---|
| 1 | |
| 2 | |
| 3 | |

| Cpd. No. | Structural Formula |
|---|---|
| 4 | (structure) |
| 5 | (structure) |
| 6 | (structure) |
| 7 | (structure) |

-continued

| Cpd. No. | Structural Formula |
|---|---|
| 8 | |
| 9 | |
| 10 | |

-continued

| Cpd. No. | Structural Formula |
|---|---|
| 11 | |
| 12 | |
| 13 | |

-continued

| Cpd. No. | Structural Formula |
|---|---|
| 14 | |
| 15 | |
| 16 | |

-continued

| Cpd. No. | Structural Formula |
|---|---|
| 17 | (structure) |
| 18 | (structure) |
| 19 | (structure) |

-continued

| Cpd. No. | Structural Formula |
|---|---|
| 20 | |
| 21 | |
| 22 | |

-continued

| Cpd. No. | Structural Formula |
|---|---|
| 23 | |
| 24 | |
| 25 | |

-continued

| Cpd. No. | Structural Formula |
|---|---|
| 26 | |
| 27 | |

The compound represented by formula (L-2a) and the salts thereof are disclosed in detail in JP-A-2005-097912, and the compounds shown in the same patent can be preferably used.

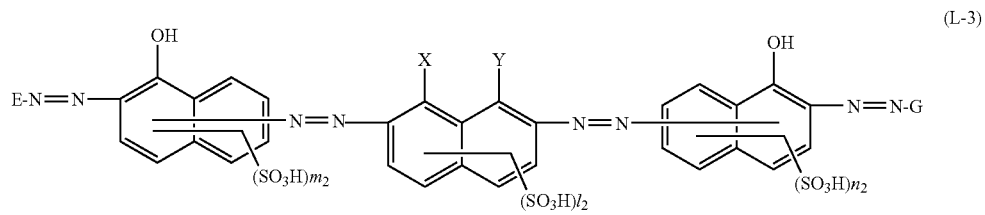
(L-3)

In formula (L-3), E and G each represents a phenyl group or a naphthyl group that may be substituted, or a 5- or 6-membered aromatic heterocyclic group bonding to the azo group via a carbon atom, and each of E and G contains at least one or more carboxyl group(s) or sulfo group(s); one of X and Y represents a hydroxyl group, and the other represents an amino group; and $l_2$, $m_2$ and $n_2$ each represents 1 or 2.

The compound represented by formula (L-3) is preferably a compound represented by the following formula (L-7).

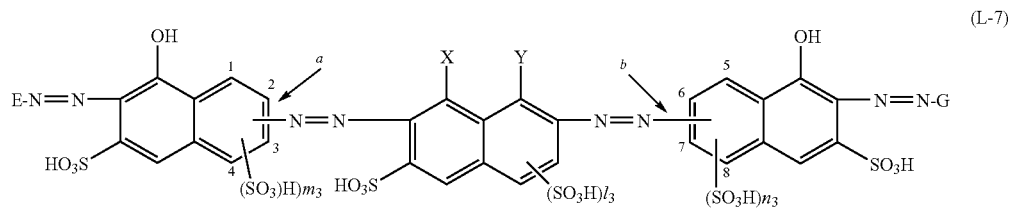
(L-7)

In formula (L-7), E and G each represents a phenyl group or a naphthyl group that may be substituted, or a 5- or 6-membered aromatic heterocyclic group bonding to the azo group via a carbon atom, and each of E and G contains at least one or more carboxyl group(s) or sulfo group(s); a and b each represents a single bond, the bonding position of bond a is the 2- or 3-position, and the bonding position of bond b is the 6- or 7-position; one of X and Y represents a hydroxyl group, and the other represents an amino group; and $l_3$, $m_3$ and $n_3$ each represents 0 or 1.

In formula (L-7), E and G each preferably represents a phenyl group or a naphtlhyl group that may be substituted with a substituent containing at least one or more carboxyl group(s) and/or sulfo group(s). The examples of the substituents substituted on E and G include a halogen atom; a hydroxyl group; an amino group; a carboxyl group; a sulfo group; a nitro group; an alkyl group; an alkoxyl group; an acyl group; a phenyl group; a ureido group; an alkyl group substituted with a hydroxyl group, an alkoxyl group, a sulfo group, or a carboxyl group; an alkoxyl group substituted with a hydroxyl group, an alkoxyl group, a sulfo group, or a carboxyl group; a phenyl group that may be substituted with a carboxyl group or a sulfo group; and an amino group substituted with an alkyl group or an acyl group.

In formula (L-7), it is preferred that E and G each has a sulfo group at the o-position to the azo group, and represents a phenyl group that may be substituted with a nitro group, an alkoxyl group, or a sulfo group.

The specific examples of preferred compounds represented by formula (L-3) and the salts thereof are shown below, but the invention is not restricted thereto. The following specific examples are shown in a free acid structure, but of course the compounds may be used in the form of an arbitrary salt.

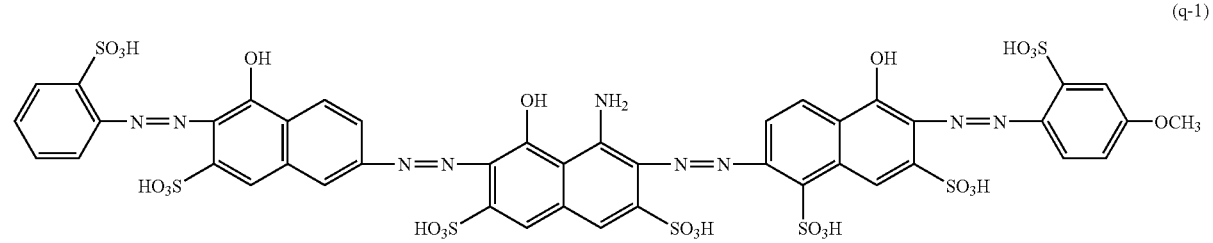
(q-1)

-continued
(q-2)
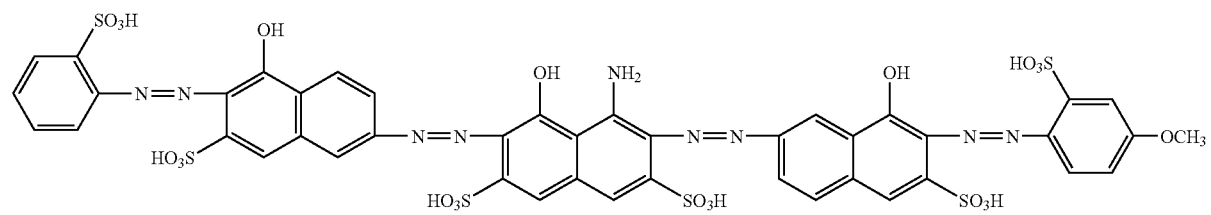
(q-3)
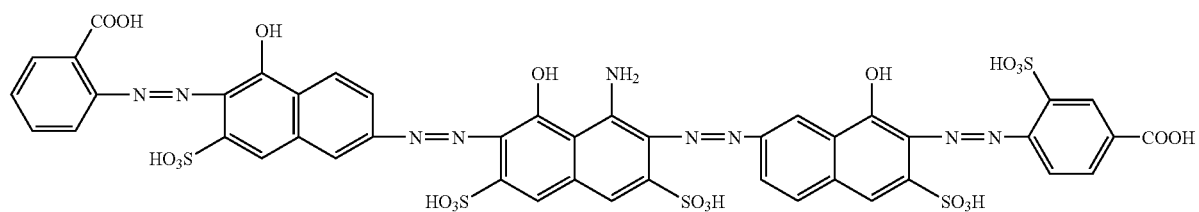
(q-4)
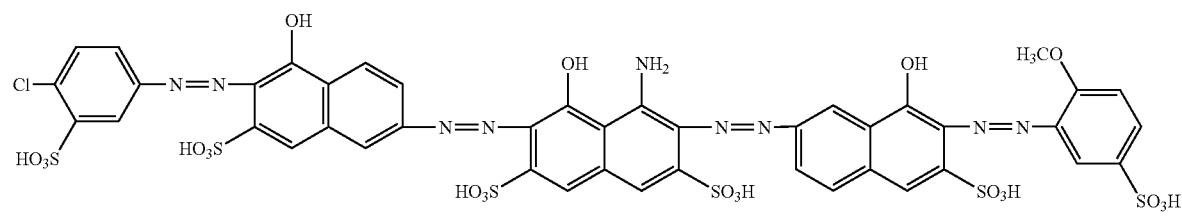
(q-5)
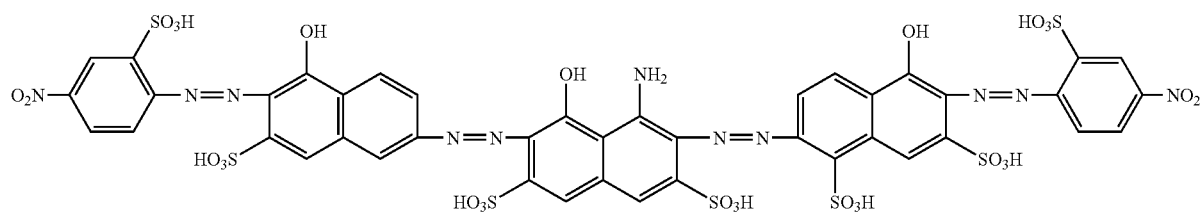
(q-6)
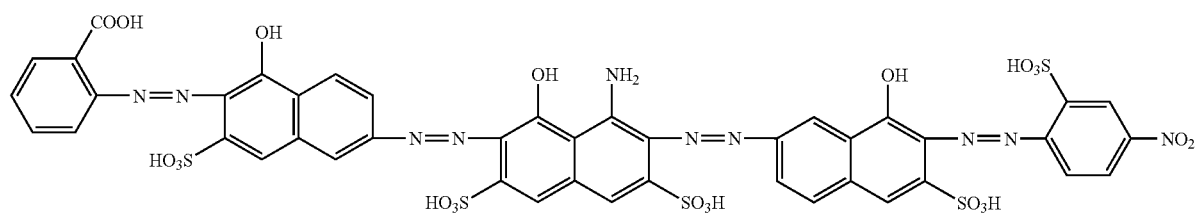
(q-7)
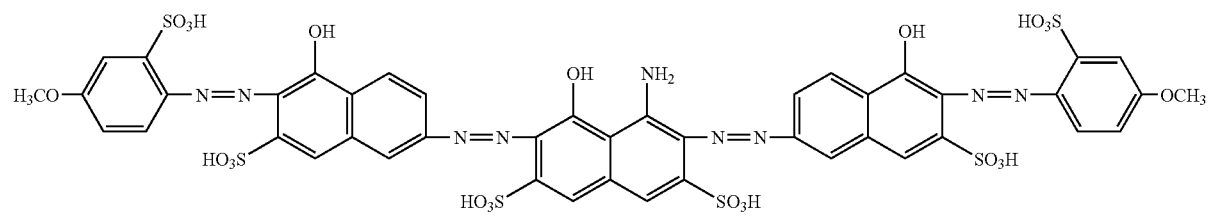

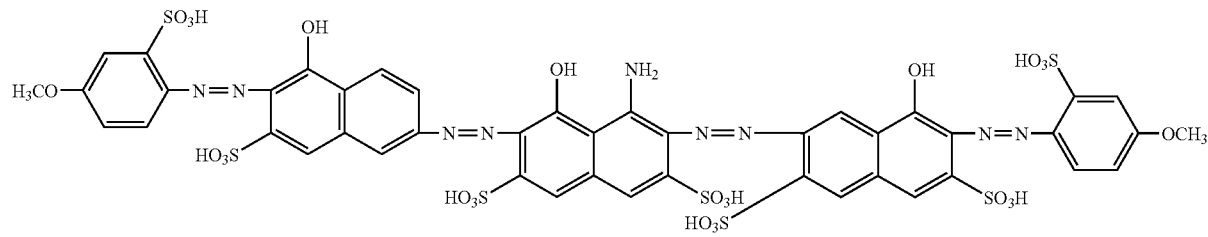

(q-8)

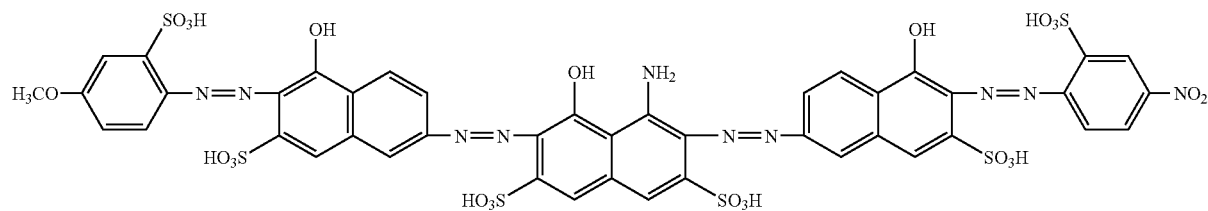

(q-9)

The compound represented by formula (L-3) and the salts thereof are disclosed in detail in JP-A-2004-285351, and the compounds shown in the same patent can be preferably used.

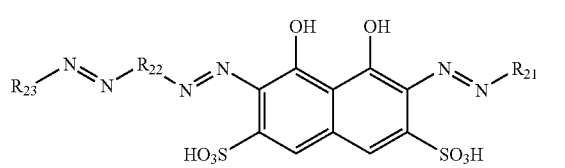

(L-4)

In formula (L-4), $R_{21}$ represents a phenyl group having a substituent, or a naphthyl group having a substituent; $R_{22}$ represents a phenylene group having a substituent, or a naphthylene group having a substituent; $R^{23}$ represents a 5- to 7-membered heterocyclic group having at least one double bond and a substituent; and the substituents in $R_{21}$, $R_{22}$ and $R_{23}$ are each selected from the group consisting of OH, $SO_3H$, $PO_3H_2$, $CO_2H$, $NO_2$, $NH_2$, an alkyl group having from 1 to 4 carbon atoms, an alkyl group having from 1 to 4 carbon atoms and having a substituent, an alkoxyl group having from 1 to 4 carbon atoms, an alkoxyl group having from 1 to 4 carbon atoms and having a substituent, an amino group, an amino group having a substituent, and a phenyl group having a substituent.

In the invention, the compound represented by formula (L-4) is preferably a compound represented by formula (L-5).

(L-5)

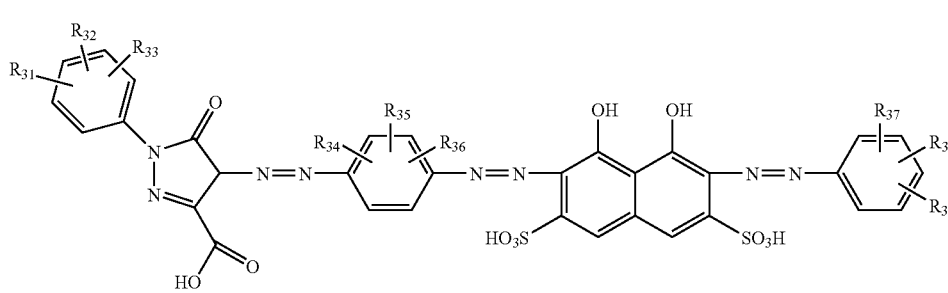

(L-5)

In formula (L-5), $R_{31}$ to $R_{39}$ each represents a group selected from the group consisting of H, OH, $SO_3H$, $PO_3H_2$, $CO_2H$, $NO_2$, and $NH_2$.

The specific examples of preferred compounds represented by formula (L-4) or (L-5) and the salts thereof are shown below, but the invention is not restricted thereto. The following specific examples are shown in a free acid structure, but of course the compounds may be used in the form of an arbitrary salt.

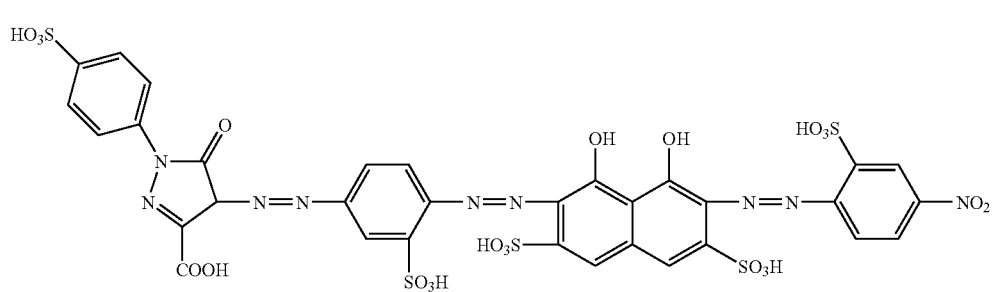
(r-1)
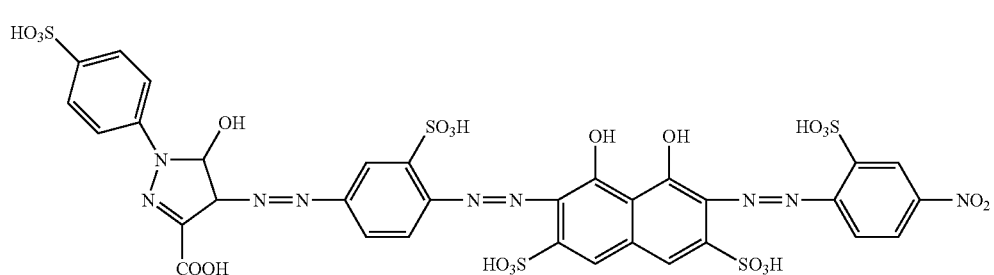
(r-2)
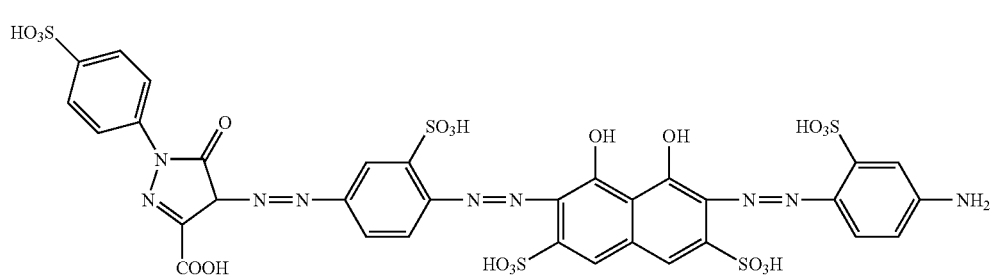
(r-3)
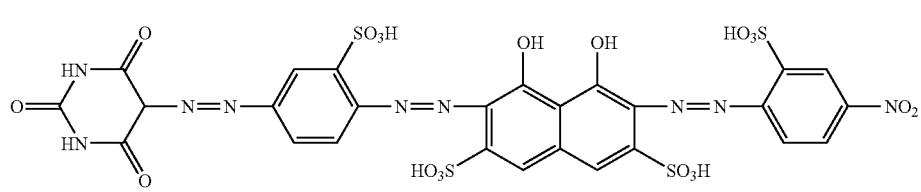
(r-4)
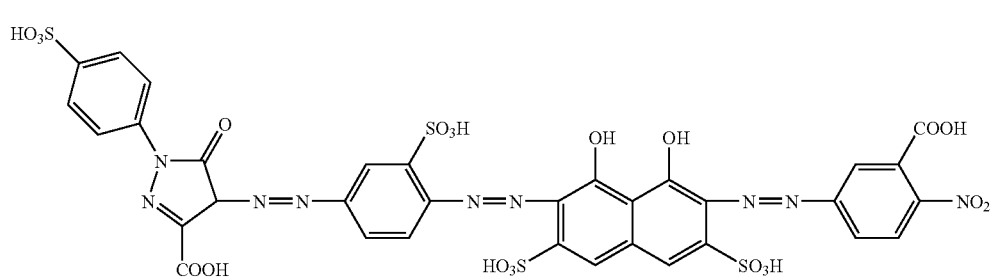
(r-5)
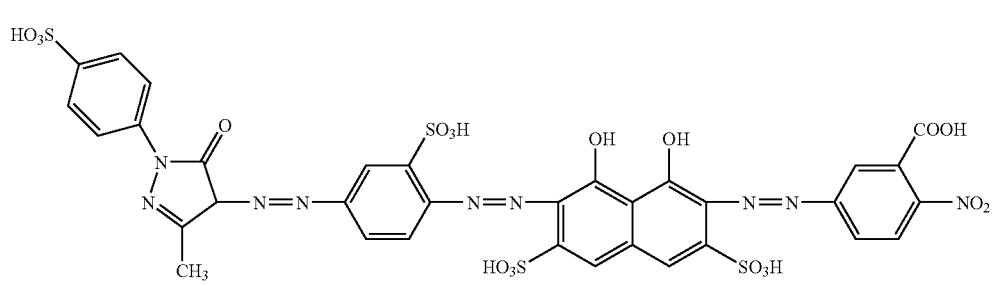
(r-6)

-continued

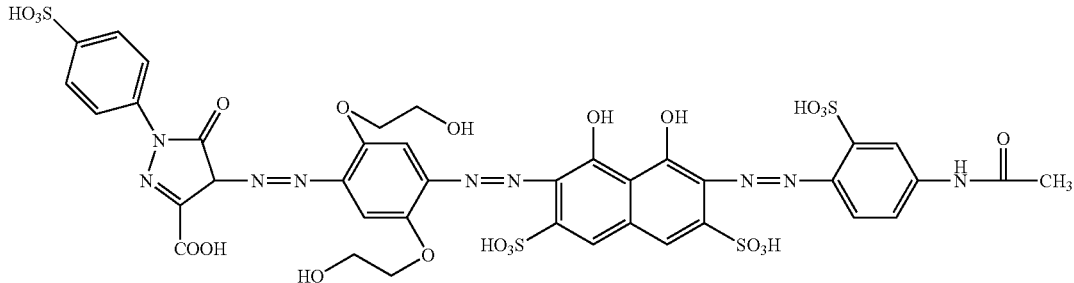

(r-7)

The compounds represented by formula (L-4) or (L-5) and the salts thereof are disclosed in detail in WO 03/106572 and JP-A-2005-2271, and the compounds shown in the same patents can be preferably used.

Other Dyes:

Further, other dyes can also be used in combination in the invention for adjusting the tone and the like of a black ink composition in the range not greatly impairing light fastness and ozone-proofness.

As yellow dyes, aryl or heteryl azo dyes having, e.g., phenols, naphthols, anilines, pyrazolones, pyridones or open chain type active methylene compounds as the coupling component; azomethine dyes having, e.g., open chain type active methylene compounds as the coupling component; methine dyes, such as benzylidene dyes and monomethine oxonol dyes; and quinone dyes, such as naphthoquinone dyes and anthraquinone dyes are exemplified. Besides these kinds of dyes, quinophthalone dyes, nitro-nitroso dyes, acridine dyes and acridinone dyes are exemplified. These dyes may be dyes that present yellow not until after a part of the chromophore has been dissociated, and the counter cations in that case may be inorganic cations, e.g., an alkali metal and ammonium, or may be organic cations, e.g., pyridinium and quaternary ammonium salt, or the counter cations may be polymer cations having these cations as the partial structure.

As magenta dyes, aryl or heteryl azo dyes having, e.g., phenols, naphthols or anilines as the coupling component; azomethine dyes having, e.g., pyrazolones or pyrazolo-triazoles as the coupling component; methine dyes, e.g., arylidene dyes, styryl dyes, merocyanine dyes, and oxonol dyes; carbonium dyes, e.g., diphenylmethane dyes, triphenylmethane dyes, and xanthene dyes; quinone dyes, e.g., naphthoquinone, anthraquinone and anthrapyridone; and condensation polycyclic dyestuffs, e.g., dioxazine dyes are exemplified. These dyes may be dyes that present magenta not until after a part of the chromophore has been dissociated, and the counter cations in that case may be inorganic cations, e.g., alkali metal and ammonium, or may be organic cations, e.g., pyridinium and quaternary ammonium salt, or the counter cations may be polymer cations having these cations as the partial structure.

As cyan dyes, azomethine dyes, e.g., indoaniline dyes and indophenol dyes; polymethine dyes, e.g., cyanine dyes, oxonol dyes and merocyanine dyes; carbonium dyes, e.g., diphenylmethane dyes, triphenylmethane dyes and xanthene dyes; phthalocyanine dyes; anthraquinone dyes; aryl or heteryl azo dyes having, e.g., phenols, naphthols or anilines as the coupling component; and indigo-thioindigo dyes are exemplified. These dyes may be dyes that present cyan not until after a part of the chromophore has been dissociated, and the counter cations in that case may be inorganic cations, e.g., alkali metal and ammonium, or may be organic cations, e.g., pyridinium and quaternary ammonium salt, or the counter cations may be polymer cations having these cations as the partial structure.

Black dyes, e.g., polyazo dye, can also be used.

Water-soluble dyes, such as direct dyes, acid dyes, food dyes, basic dyes, and reactive dyes can also be used in combination. Preferred dyes of such dyes are listed below, but the invention is not restricted thereto:

C.I. Direct Red 1, 2, 4, 9, 11, 23, 26, 31, 37, 39, 62, 63, 72, 75, 76, 79, 80, 81, 83, 84, 87, 89, 92, 95, 111, 173, 184, 207, 211, 212, 214, 218, 219, 223, 224, 225, 226, 227, 232, 233, 240, 241, 242, 243, 247, 254

C.I. Direct Violet 7, 9, 47, 48, 51, 66, 90, 93, 94, 95, 98, 100, 101

C.I. Direct Yellow 4, 8, 9, 11, 12, 27, 28, 29, 33, 35, 39, 41, 44, 50, 53, 58, 59, 68, 86, 87, 93, 95, 96, 98, 100, 106, 108, 109, 110, 120, 130, 132, 142, 144, 157, 161, 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 290, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 1, 8, 35, 42, 52, 57, 62, 80, 81, 82, 87, 94, 111, 114, 115, 118, 119, 127, 128, 131, 143, 144, 151, 152, 154, 158, 186, 245, 249, 254, 257, 261, 263, 266, 289, 299, 301, 305, 336, 337, 361, 396, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 87, 92, 106, 112, 113, 120, 127:1, 129, 138, 143, 175, 181, 185, 205, 207, 220, 221, 230, 232, 247, 249, 258, 260, 264, 271, 277, 278, 279, 280, 288, 290, 326

C.I. Acid Black 7, 24, 29, 48, 52:1, 172

C.I. Reactive Red 3, 6, 13, 17, 19, 21, 22, 23, 24, 29, 35, 37, 40, 41, 43, 45, 49, 55, 63, 106, 107, 112, 113, 114, 126, 127, 128, 129, 130, 131, 137, 160, 161, 174, 180

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 7, 8, 10, 13, 14, 15, 17, 18, 19, 21, 25, 26, 27, 28, 29, 38, 82, 89, 158, 182, 190, 203, 216, 220, 244

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basic Black 8

Besides the above dyes, the dyes disclosed in the following patents can also be used in combination, but the invention is not restricted thereto: WO 01/48090, WO 04/087815, WO 02/090441, WO 03/027185, WO 04/085541, JP-A-2003-321627, JP-A-2002-332418, JP-A-2002-332419, WO 02/059216, WO 02/059215, WO 04/087814, WO 00/58407, Japanese Patents 3558211, 3558212, 3558213, JP-A-2004-323605, and WO 04/104108.

The black ink composition in the invention contains at least two kinds of water-soluble dyes as colorants, and the colorants may be contained in the form of salts. When a plurality of colorants are contained in the form of salts, the same counter ions are preferably used. The counter ions are not especially limited, and the examples include ammonium, an alkali metal (e.g., lithium, sodium, potassium), and an organic cation (e.g., tetramethylammonium, tetramethylguanidinium, tetramethylphosphonium). As the counter ions of salts, ions of ammonium, lithium, sodium and potassium are preferred, a sodium ion and a lithium ion are more preferred, and a lithium ion is most preferred.

In particular, as the ink composition in the invention, it is preferred that at least one of the compound represented by formula (S-1), the compound represented by formula (L-1), and a compound having a naphthalene ring substituted with at least one hydroxyl group and three or more azo groups is a salt having a lithium ion as the counter ion. It is especially preferred as the ink composition in the invention that the compounds represented by formula (S-1) and formula (L-1) are salts having a lithium ion as the counter ion.

In the invention, when the colorants of the above counter salts are used as the ink set, sufficient effect of restraining blotting can be obtained in a full color image where blotting is liable to be deteriorated due to a great amount of ink supplied to a recording medium in printing.

The black ink composition in the invention contains at least two kinds of water-soluble dyes as colorants, and the total amount of the colorants preferably accounts for from 0.5 to 12 wt % in the total weight of the black ink composition, more preferably from 3.0 to 10.0 wt %, and especially preferably from 5.0 to 8.0 wt %.

When the total amount of the dyes contained in the black ink composition is 0.5 wt % or more, and when an image is recorded on a recording medium with this ink composition, sufficiently satisfactory color development and high image density can be obtained.

When the total amount of the dyes contained in the black ink composition is 12 wt % or less, the coefficient of viscosity of the ink composition can be adjusted to a desired value, the ejection amount of the ink composition from the ink jet head can be stabilized, and clogging of the ink jet head can be prevented.

Water-miscible organic solvents that can be used in the ink composition of the invention are materials having functions of a drying preventive, an osmosis accelerator, and a wetting agent, and water-miscible organic solvents having a high boiling point are used. The specific examples of such compounds are disclosed in JP-A-2004-331871, paragraphs [0419] to [0423].

Of water-miscible organic solvents, alcohol-based solvents are especially preferably used in the invention. It is also preferred in the ink composition of invention to contain to contain water-miscible organic solvents having a boiling point of 150° C. or higher.

These water-miscible organic solvents are preferably contained in a total amount of from 5 to 60 mass % in the ink composition, and especially preferably from 10 to 45 mass %.

For the purpose of enhancing the ejection stability of the ink composition of the invention, printing quality, and durability of images, additives such as a surfactant, a drying preventive, an osmosis accelerator, urea-based additives, a chelating agent, an ultraviolet absorber, an antioxidant, a viscosity adjustor, a surface tension adjustor, a dispersant, a dispersion stabilizer, an antiseptic, a mildewproofing agent, an anticorrosion, a pH adjustor, a defoaming agent, a polymer material, an acid precursor, etc., as disclosed in JP-A-2004-331871 can be used by arbitrary selection. The preferred use amount of these additives is as disclosed in JP-A-2004-331871.

In addition to the above components, the ink composition in the invention can further contain one or more additives selected from the group consisting of a blotting preventive, a bronzing improver, and an ozone-proofness improver, if necessary.

Blotting Preventive:

As a blotting preventive, betaine surfactants are exemplified. The betaine surfactants disclosed in JP-A-2005-111699, paragraphs [0017] to [0044] can be arbitrarily selected and used.

Bronzing Improver:

A bronzing improver for use in the invention has function to weaken or get rid of the bronzing phenomenon that occurs when solid printing is performed with an ink set containing a black ink composition, for example, aromatic compounds having a carboxyl group or salts thereof are exemplified as bronzing improvers.

As the aromatic compounds having a carboxyl group or salts thereof, the compounds disclosed in JP-A-2004-263155, paragraph [0044] can be arbitrarily selected and used.

The total use amount of the aromatic compound having a carboxyl group and/or a salt thereof is determined according to the kind of the aromatic compound having a carboxyl group and/or a salt thereof, the kinds of dyes, and the kind of solvent components.

Further, as other bronzing improvers, colorless and water-soluble plane compounds having more than ten delocalization a electrons in one molecule are preferably used.

As the water-soluble plane compounds, the compounds disclosed in JP-A-2005-105261, paragraphs [0012] to [0026] can be arbitrarily selected and used.

The content of these bronzing improvers is preferably from 0.1 to 10 wt % based on the total weight of the ink composition, and more preferably the range of from 0.5 to 5 wt %.

Ozone-Proofness Improver:

An ozone-proofness improver is a compound having function of restraining the oxidation of dyes and, for example, thiol-based compounds, amidine-based compounds, carbazide-based compounds, hydrazide-based compounds, guanidine-based compounds are exemplified.

Thiol-Based Compounds:

Thiol-based compounds for use in the invention are compounds having an SH group, and aromatic thiol and aliphatic thiol are preferred, e.g., a compound represented by the following formula (B) is preferred.

$$R_{10}\text{—SH} \tag{B}$$

wherein $R_{10}$ represents an alkyl group, an aryl group, or a heterocyclic group.

$R_{10}$ is described below.

As the alkyl group, preferably an alkyl group having from 1 to 12 carbon atoms, and more preferably from 1 to 6 carbon atoms.

As the aryl group, preferably an aryl group having from 6 to 18 carbon atoms, and more preferably from 6 to 10 carbon atoms.

As the heterocyclic group, a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, a trithianyl group, etc., are exemplified.

The substituents represented by $R_{10}$ include substituents whose hydrogen atoms are further substituted with other arbitrary substituents. Such substituents include a carboxyl group, an oxo group, an amino group, an amino acid residue (preferably having from 2 to 8 carbon atoms), an ammonium group, a hydroxyl group, a thiol group, an alkoxyl group (preferably having from 1 to 12 carbon atoms), an acylamino group (preferably having from 1 to 12 carbon atoms, the carboxyl group and the amino group may be substituted), a carbamoyl group, etc., are exemplified, and two or more of these substituents may be substituted on the same molecule.

As the synthesizing method of the compound represented by formula (B), e.g., by the reaction of applicable aryl Grignard's reagent and single sulfur, thiol wherein $R_{10}$ is an aryl group is obtained, and by the reaction of applicable halogenated alkyl and sodium hydrogensulfide or thiourea, thiol wherein $R_{10}$ is an aryl group is obtained.

Amidine-Based Compounds:

Amidine-based compounds for use in the invention are compounds having a structure in which —C(=NH)—NH$_2$ group (an amidino group) is bonded to the carbon atom of the group containing a carbon atom, and one or more hydrogen atoms of the —C(=NH)—NH$_2$ group may be substituted with substituents.

An amidine-based compound represented by the following formula (C) is preferably used.

$$R_{51}\text{—}C\begin{array}{c}\nearrow N\text{—}R_{52} \\ \searrow N\text{—}R_{53} \\ | \\ R_{54}\end{array} \tag{C}$$

In formula (C), $R_{51}$, $R_{52}$, $R_{53}$ and $R_{54}$ each represents a hydrogen atom, an alkyl group, an aryl group, or a heterocyclic group, and when $R_{51}$ contains a nitrogen atom, the nitrogen atom is not bonded to C shown in the formula.

The alkyl group is an alkyl group preferably having from 1 to 12 carbon atoms, and more preferably from 1 to 6 carbon atoms.

The aryl group is an aryl group preferably having from 6 to 18 carbon atoms, and more preferably from 6 to 10 carbon atoms.

As the heterocyclic group, a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, a trithianyl group, etc., are exemplified.

The hydrogen atoms of the substituents represented by $R_{51}$ to $R_{54}$ may further be substituted with arbitrary other substituents. As such substituents, a halogen atom, e.g., chlorine, a nitro group, an amino group, a carboxyl group, a carbamoyl group, an amidino group, an aryloxy group (the aryl moiety may further be substituted with any substituents enumerated here), etc., are exemplified, and two or more of these substituents may be substituted on the same molecule. The hydrogen atoms of the above amino group, carbamoyl group, and amidino group may be substituted with the alkyl group, aryl group or heterocyclic group represented by $R_{51}$ to $R_{54}$.

The amidine-based compound may take the form of a salt, such as hydrochloride.

The compound represented by formula (C) can be obtained at least by the process of acting ammonia on the applicable hydrochloride of iminoether.

Carbazide-Based Compounds:

Carbazide-based compounds for use in the invention are carbazide and derivatives thereof, and a compound represented by the following formula (D) is used.

$$R_{55}R_{56}\text{NCONHNR}_{57}R_{58} \tag{D}$$

In formula (D), $R_{55}$ to $R_{58}$ each represents a hydrogen atom or an organic group.

As the organic group, the organic groups represented by $R_{51}$ to $R_{54}$ above are preferred.

The substituents represented by $R_{55}$ to $R_{58}$ include substituents the hydrogen atoms of which are further substituted with other arbitrary substituents. As such substituents, in addition to those capable of being substituted with $R_{51}$ to $R_{54}$ exemplified above, —NHCONHNR$_{59}$R$_{60}$ (where $R_{59}$ and $R_{60}$ each represents an organic group, and the preferred examples are the same as $R_{51}$ to $R_{54}$) is preferably exemplified. In the invention, —NHCONHNR$_{59}$R$_{60}$ is called a carbazide structure. The carbazide-based compounds for use in the invention have preferably 2 or more (more preferably from 2 to 6) carbazide structures in the same molecule.

The carbazide-based compound represented by formula (D) can be obtained specifically by condensation reaction of applicable isocyanate or diisocyanate, urea derivatives, etc., with hydrazine compounds represented by NH$_2$NR$_{57}$R$_{58}$ (where $R_{57}$ and $R_{58}$ are the same as above).

Hydrazide-Based Compounds:

Hydrazide-based compounds for use in the invention are hydrazide and derivatives thereof, and a compound represented by the following formula (E) is used.

$$R_{61}\text{CONHNR}_{62}R_{63} \tag{E}$$

In formula (E), $R_{61}$, $R_{62}$ and $R_{63}$ each represents a hydrogen atom, a hydrazino group, or an organic group; $R_{61}$ and $R_{62}$ or $R_{63}$ may be bonded to form a ring.

As the organic group, the organic groups exemplified in $R_{51}$ to $R_{54}$ in formula (C) are preferred.

The substituents represented by $R_{61}$ to $R_{63}$ include substituents the hydrogen atoms of which are further substituted with other arbitrary substituents. As such substituents, in addition to those capable of being substituted with $R_{51}$ to $R_{54}$ exemplified above, an acyl group, a cyano group, an alkoxyl group, an aralkyloxy group, a benzoyloxy group, —NHCONHNR$_{64}$R$_{65}$ (where $R_{64}$ and $R_{65}$ each represents an organic group, and the preferred examples are the same as $R_{51}$ to $R_{54}$) is preferably exemplified. In the invention, —NHCONHNR$_{64}$R$_{65}$ is called a hydrazide structure. The hydrazide-based compounds for use in the invention have preferably 2 or more (more preferably from 2 to 6) hydrazide structures in the same molecule.

The hydrazide-based compound represented by formula (E) can be obtained specifically by condensation reaction of applicable acid derivatives or acid anhydrides such as carboxylic acid ester or acid halide, etc., with a hydrazine compound represented by NH$_2$NR$_{62}$R$_{63}$ (where $R_{62}$ and $R_{63}$ are the same as above).

Of the ozone-proofness improvers, guanidine-based compounds are especially preferred. Guanidine-based compounds are described in detail below.

Guanidine-Based Compounds:

Guanidine-based compounds for use in the invention are compounds having an N—C(=N)—N structure.

As guanidine-based compounds, a compound represented by the following formula (F) is preferred.

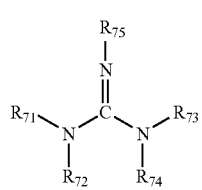

(F)

In formula (F), $R_{71}$, $R_{72}$, $R_{73}$ and $R_{74}$ each represents a hydrogen atom, an alkyl group, an alkoxyl group, an aryl group, a heterocyclic group, or an amino group; and $R_{75}$ represents a hydrogen atom, an alkyl group, an alkoxyl group, an aryl group, or a heterocyclic group. These alkyl group, alkoxyl group, aryl group, heterocyclic group, or amino group may be substituted or may not substituted.

The alkyl group is an alkyl group preferably having from 1 to 12 carbon atoms, and especially preferably from 1 to 6 carbon atoms.

The alkoxyl group is an alkoxyl group preferably having from 1 to 12 carbon atoms, and especially preferably from 1 to 6 carbon atoms.

The aryl group is an aryl group preferably having from 6 to 18 carbon atoms, and especially preferably from 6 to 10 carbon atoms.

As the heterocyclic group, a furyl group, a pyridyl group, a pyrimidyl group, a pyrrolyl group, a pyrrolinyl group, a pyrrolidyl group, a dioxolyl group, a pyrazolyl group, a pyrazolinyl group, a pyrazolidyl group, an imidazolyl group, an oxazolyl group, a thiazolyl group, an oxadiazolyl group, a triazolyl group, a thiadiazolyl group, a pyryl group, a pyridyl group, a piperidyl group, a dioxanyl group, a morpholyl group, a pyridazyl group, a pyrazyl group, a piperazyl group, a triazyl group, a trithianyl group, etc., are exemplified.

The hydrogen atoms of the allyl group, alkoxyl group, aryl group or heterocyclic group represented by $R_{71}$ to $R_{75}$ may further be substituted with arbitrary other substituents. As such substituents, a halogen atom, e.g., chlorine, a nitro group, an amino group, a carboxyl group, a hydroxyl group, a carbamoyl group, an amidino group, a guanidino group, an aryloxy group (the aryl moiety may further be substituted with any substituents enumerated here), etc., are exemplified, and two or more of these substituents may be substituted on the same molecule. The hydrogen atoms of the above amino group, carbamoyl group, amidino group and guanidino group may be substituted with the alkyl group, alkoxyl group, aryl group or heterocyclic group represented by $R_{71}$, to $R_{75}$.

The hydrogen atoms of the amino group represented by $R_{71}$ to $R_{74}$ may further be substituted with the alkyl group, alkoxyl group, aryl group or heterocyclic group represented by $R_{71}$ to $R_{75}$.

The guanidine-based compounds may be in the form of a salt or a metal complex, for example, hydrochloride, nitrate, phosphate, sulfamate, carbonate, acetate, etc., are exemplified.

The compound represented by formula (F) can be obtained at least by the process of acting ammonia on the applicable hydrochloride of iminoether.

The guanidine-based compounds may be polymers having an N—C(=N)—N structure. As such polymers, compounds containing a repeating unit represented by the following formula (F-a), (F-b) or (F-c), but the invention is not restricted thereto. The compounds containing the repeating unit may be oligomers. The compounds containing the repeating unit represented by formula (F-c) may be monomers. These compounds are preferably salts with acids.

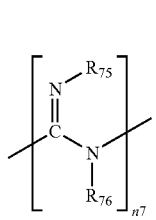

(F-a)

In formula (F-a), $R_{75}$ has the same meaning as above; $R_{76}$ represents any of $R_{71}$, $R_{72}$, $R_{73}$ and $R_{74}$, and n of $R_{75}$ and $R_{76}$ may be the same or different; and n7 represents an integer of 2 or more, preferably from 2 to 30, and more preferably from 2 to 15. The compound containing the repeating unit represented by formula (F-a) may be a homopolymer, or may be a copolymer with other repeating unit, e.g., azetidinium, etc. The terminal structure can be arbitrarily selected, but a hydrogen atom, an alkyl group, an alkoxyl group, an aryl group, a heterocyclic group or an amino group is preferred.

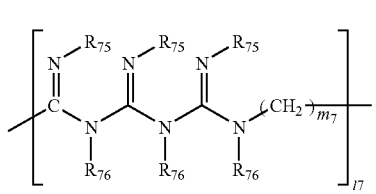

(F-b)

In formula (F-b), $R_{75}$ and $R_{76}$ have the same meaning as above, and l7 of $R_{75}$ and $R_{76}$ may be the same or different. l7 is an integer of 2 or more, preferably from 2 to 10, and more preferably from 2 to 5. m7 is an integer of 1 or more, preferably from 1 to 6, and more preferably from 1 to 3. The compound containing the repeating unit represented by formula (F-b) may be a homopolymer, or may be a copolymer with other repeating unit, e.g., azetidinium, etc. The terminal structure can be arbitrarily selected, but a hydrogen atom, an alkyl group, an alkoxyl group, an aryl group, a heterocyclic group or an amino group is preferred.

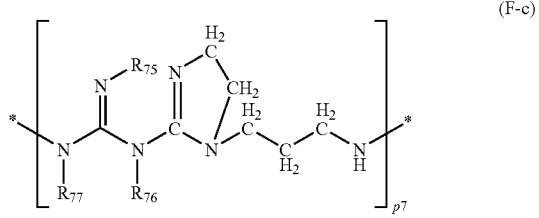

(F-c)

In formula (F-c), $R_{75}$ has the same meaning as above; $R_{77}$ has the same meaning as $R_{71}$ or $R_{72}$; $R_{76}$ has the same meaning as $R_{73}$ or $R_{74}$, and p7 of $R_{75}$, $R_{76}$ and $R_{77}$ may be the same or different. p7 is an integer of 1 or more, preferably from 1 to 10, and more preferably from 1 to 5. The compound containing the repeating unit represented by formula (F-c) may be a homopolymer, or may be a copolymer with other repeating unit, e.g., azetidinium, etc. The terminal structure can be arbitrarily selected, but a hydrogen atom, an alkyl group, an alkoxyl group, an aryl group, a heterocyclic group or an amino group is preferred.

These various compounds can be used alone or in combination as the ozone-proofness improver, and the use amount is preferably from 0.1 to 10 mass % in the ink composition.

The coefficient of viscosity of the ink composition in the invention is preferably from 1 to 20 mPa·s, more preferably from 2 to 15 mPa·s, and especially preferably from 2 to 10 mPa·s. When the coefficient of viscosity exceeds 20 mPa·s, the fixing speed of a recorded image lowers and the ejecting property also lowers. When the viscosity is less than 1 mPa·s, a recorded image blots and grade is deteriorated. The coefficient of viscosity is measured at 25° C. The coefficient of viscosity is adjusted with the viscosity adjustor. The addition amount of a water-miscible organic solvent is, in the case of ink jet recording, preferably from 5 to 70 mass % to the ink composition, and more preferably from 10 to 60 mass %. Water-miscible organic solvent can be used in combination of two or more kinds.

A measuring method of the coefficient of viscosity of a liquid is described in detail in JIS Z8803, but it can be measured easily with a commercially available viscometer. For instance, B type viscometer and E type viscometer (manufactured by Tokyo Keiki Co) are known as a rotary type. In the invention, viscosity was measured with an oscillating type MV-100A-L type (manufactured by YAMAICHI ELECTRONICS Co., Ltd.) at 25° C.

The ink composition in the invention preferably has surface tension of from 20 to 50 mN/m, and more preferably from 20 to 40 mN/m.

Surface tension means both dynamic surface tension and static surface tension, and both are measured at 25° C. When the surface tension is higher than 50 mN/m, ejection stability lowers, blotting occurs at color mixing time and the qualities of printed characters conspicuously deteriorate such that whiskers appear. When the surface tension of ink is lower than 20 mN/m, printing failure sometimes occurs due to adhesion of the ink to the surface of hardware. Surfactants can be used for the adjustment of surface tension, and the above-described surfactants can be used.

As measuring methods of static surface tension, a capillary rise method, a dropping method and a suspension lug method are known. A vertical panel method is used in measuring static surface tension in the invention.

When a part of a thin panel of glass or platinum is immersed in a liquid and hung vertically, the surface tension of the liquid works downward along the length where the liquid and the panel are in contact. Static surface tension can be measured with equilibrating this force by upward force.

As measuring methods of dynamic surface tension, a oscillation jet method, a meniscus dropping method, and a maximum bubble pressure method as described in Shin-Jiklcen Kagaku Koza (New Experimental Chemistry), Vol. 18, "Kaimen to Colloid (Interface and Colloid)", pp. 69 to 90, Maruzen Co. (1977) are known, further, as disclosed in JP-A-3-2064, a liquid film breaking method is known. In the invention, a bubble pressure differential pressure method is used for the measurement of dynamic surface tension. The principle of the measurement and measuring method are described below.

When bubbles are formed in a stirred and homogenized solution, new air-liquid interface is formed and surfactant molecules in the solution gather on the surface of the solution at a constant velocity. When a bubble rate (generating velocity of bubbles) is changed, if generating velocity slows down, more molecules of the surfactant gather on the surfaces of bubbles, thus the maximum bubble pressure just before breaking of bubbles becomes small and the maximum bubble pressure (surface tension) to the bubble rate can be detected. As the preferred measuring method of dynamic surface tension, a method of generating bubbles in a solution with two probes, large and small, measuring the differential pressure of two probes at the state of maximum bubble pressure, and computing the dynamic surface tension can be exemplified.

The conductivity of the ink composition in the invention is preferably from 0.01 to 10 S/m, and particularly preferably from 0.05 to 5 S/m. The conductivity is measured at 25° C. By making the conductivity the above range, image stability can be secured.

The conductivity can be measured by an electrode method using commercially available saturated potassium chloride.

The conductivity can be controlled primarily by the ion concentration in an aqueous solution. When the concentration of salt is high, desalinization can be performed through an ultrafiltration membrane. When conductivity is controlled by the addition of salts, control can be done by the addition of various organic and inorganic salts.

As the inorganic salts, inorganic compounds, e.g., potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogen-phosphate, sodium dihydrogenphosphate, etc., and organic compounds, e.g., sodium acetate, potassium acetate, potassium tartrate, sodium tartrate, sodium benzoate, potassium benzoate, sodium p-toluenesulfonate, potassium caccharinate, potassium phthalate, sodium picolinate, etc., can be used.

The conductivity can also be controlled by the selection of the above-described additives.

The pH of the ink composition in the invention is preferably from 7 to 9, and more preferably from 7 to 8. When the pH is less than 7, the solubility of dye lowers and nozzles are liable to generate clogging, while when the pH is higher than 9, a waterproof property is liable to deteriorate. pH can be measured with commercially available test paper, or can be measured by an electrode method with saturated potassium chloride.

The pH of the ink composition can be adjusted with the pH adjustor.

It is possible to use the ink composition in the invention in various image recordings for its high image durability. As the materials for imaging, for example, utilization for photographic photosensitive materials, utilization for heat transfer materials, utilization for heat-sensitive/pressure-sensitive materials, and utilization for ink jet recording are possible, and of these uses, utilization as ink composition for ink jet recording is most preferred.

Manufacturing methods of ink compositions are disclosed in detail in each of JP-A-5-295312, JP-A-7-97541 and JP-A-7-82515, in addition to the above patents, and these methods can be used in the manufacture of the ink composition in the invention.

A manufacturing method of ink in the invention comprises a process of preparing an ink stock solution by dissolving the compound represented by formula (S-1) in water, and a process of reducing the concentration of the compound represented by formula (S-1) in the ink stock solution to make an ink composition.

Manufacture of Ink Stock Solution:

In the ink manufacturing process in the invention, the ink stock solution containing the compound represented by formula (S-1) is prepared by dissolving the compound represented by formula (S-1) in water. The concentration of the dye is preferably from 3 to 15 wt %, and more preferably from 4 to 10 wt %.

If desired, an organic solvent such as a water-miscible organic solvent is contained in the ink stock solution. It is preferred that the organic solvent has a function of a viscosity reducing agent.

In the manufacturing method of the ink composition in the invention, in manufacturing an ink stock solution, a process of adding a viscosity reducing agent to adjust viscosity may be included after adding and dissolving a dye in water.

As the manufacturing method of an ink stock solution, a method of preparing a dye aqueous solution (containing components other than a dye, if necessary) in the first place, and then adding a viscosity reducing agent to the dye aqueous solution to reduce the viscosity of the ink stock solution can be exemplified. Addition of the viscosity reducing agent may be carried out while measuring qualitatively or quantitatively the viscosity of the dye aqueous solution to which the viscosity reducing agent have been uniformly dissolved, or may be performed by previously determining the addition amount of the viscosity reducing agent and adding it to the dye aqueous solution. In the manufacturing method of the ink stock solution, it is preferred that the process of adding the viscosity reducing agent to adjust the viscosity is a final process, but a process of adding other components and a filtering process may be provided simultaneously with or after the final process.

In preparing the dye aqueous solution, it is preferred that the dye aqueous solution is prepared by heating. The heating temperature is preferably from 30 to 80° C., and more preferably from 35 to 70° C.

A second manufacturing method of an ink stock solution of the invention includes a process of dissolving at least a dye, water and a viscosity reducing agent in a coexistent state of them in manufacturing an ink stock solution.

The process of dissolving at least a dye, water and a viscosity reducing agent in a coexistent state of them is at the same time a process of dissolving a viscosity reducing agent and, if necessary, other components in a stage of dissolving a dye in water, and this process is generally preferably used in an early process of the manufacturing of ink. The early process is preferably a final process (when the later-described filtration process is performed, a stage prior to the filtration process), but a process of the addition of other components may be provided before or after the final process.

Incidentally, in the second manufacturing method, a dye and the like may be dissolved by heating similarly to the first method.

The above two manufacturing methods of the ink stock solution in the invention are as to the case of water-soluble dyes, but it is possible to apply the similar technical concept also as to oil-soluble dyes.

In the process of manufacturing an ink stock solution, as the method of dissolving dyes and other components, various methods such as dissolution by stirring, dissolution by ultrasonic irradiation, and dissolution by shaking can be used. Of these methods, the stirring method is preferably used. In performing stirring, various methods such as flow stirring, and stirring by making use of shear force using a reverse agitator and dissolver well known in this field can be used. On the other hand, a stirring method utilizing the shear force with the bottom of a vessel such as magnetic stirrer can also be preferably used.

In addition to the function of accelerating dissolution of dyes, the ultrasonic vibration for dissolving dyes also has the function of defoaming by applying in advance the same or higher ultrasonic energy as received at a recording head to the manufacturing process of the ink stock solution in order to prevent the ink composition from generating foams at the recording head by the applied pressure.

The ultrasonic wave of ultrasonic vibration is in general 20 kHz or more, preferably 40 kHz or more, and more preferably 50 kHz or more. The energy applied to a liquid by ultrasonic vibration is in general $2 \times 10^7$ J/m$^3$ or more, preferably $5 \times 10^7$ J/m$^3$ or more, and more preferably $1 \times 10^8$ J/m$^3$ or more. The time of application of ultrasonic vibration is generally from 10 minutes to 1 hour or so.

The process of the application of ultrasonic vibration may be any time if it is after the addition of a dye to a medium. It is also effective to apply ultrasonic vibration after the finished ink composition is once preserved. However, to apply ultrasonic vibration in dissolving and/or dispersing a dye in a medium gives greater defoaming effect, and the dissolution and/or dispersion of the dye in the medium is accelerated by the ultrasonic vibration, and so preferred.

That is, the process of applying at least ultrasonic vibration can be performed any time during and after the process of dissolving and/or dispersing a dye in a medium. In other words, the process of applying at least ultrasonic vibration can be performed one time or more arbitrarily during the time after preparation of an ink stock solution and/or an ink composition until it becomes a product.

The process of blending the residual solvent may be performed in a single process or a plurality of processes.

In the manufacture of an ink stock solution in the invention, it is preferred to use heating deaeration and vacuum deaeration in combination to enhance the effect of removing the foams from the ink stock solution. It is preferred that the process of heating deaeration or vacuum deaeration is performed at the same time or after the process of blending the residual medium.

As the generating means of ultrasonic vibration in the process of applying ultrasonic vibration, known apparatus such as an ultrasonic disperser can be exemplified.

In manufacturing an ink stock solution, it is preferred to add a process of removal of residua that are solids content by filtration. A filter for use in this work preferably has an effective diameter of 1 μm or less, preferably 0.3 μm or less and 0.05 μm or more, and especially preferably 0.3 μm or less and 0.25 μm or more. As the material of the filter, various kinds of materials can be used, but in the case of the ink composition of water-soluble dyes, it is especially preferred to use filters manufactured for aqueous solvents. It is very preferred to use jacket type filters made of polymer materials hardly generating dusts. Filtration can be performed by any of methods of passing a solution through a jacket by feeding, pressure filtration, and vacuum filtration.

In many cases air is taken into the solution after filtration. Since the foams due to aeration in many cases cause the fluctuation in images in ink jet recording, it is preferred to provide a defoaming process separately. As the method of defoaming, various methods can be utilized, e.g., a solution after filtration may be allowed to stand, or methods of ultrasonic defoaming and vacuum defoaming by commercially available apparatus can be used. In the case of ultrasonic defoaming, the time required for defoaming is preferably from 30 seconds to 2 hours, and more preferably from 5 minutes to 1 hour.

It is preferred to perform these operations in a clean room or to work by making use of a space such as a clean bench for preventing the contamination of dusts at working time. In the invention, it is particularly preferred to carry out the operations in a space with the degree of cleanliness of class 1,000 or lower. "The degree of cleanliness" used here means the value measured by a dust counter.

Viscosity Reducing Agent:

The viscosity reducing agents usable in the manufacture of the ink stock solution of the invention means those having greater viscosity reducing function of the ink stock solution as compared with deionized water when the dye is water-soluble. That is, when the coefficient of viscosity of the ink stock solution of the invention is taken as $V_0$, and the coefficient of viscosity measured by adding the same amount of deionized water as the amount of the viscosity reducing agent removed from the ink stock solution of the invention is taken as $V_1$, the relationship of $V_0<V_1$ is formed, and the viscosity reducing agent is the one showing preferably $\Delta V=V_1-V_0$ of 10 mPa·s or more, and more preferably 20 mPa·s or more.

As the viscosity reducing agents, water-miscible organic solvents are preferably used. As the water-miscible organic solvents, the solubility in water at 25° C. is preferably 10 (g/100 g) or more, and more preferably 20 (g/100 g) or more.

The details of the water-miscible organic solvents are the same as described above, and as the water-miscible organic solvents as the viscosity reducing agents, high boiling point water-miscible organic solvents having functions as a drying preventive of ink for ink jet recording, an osmosis accelerator, and a wetting agent are mainly used, and triethylene glycol monobutyl ether (TEGmBE), diethylene glycol monobutyl ether, triethylene glycol, diethylene glycol, alcohols and nitrogen-containing compounds are preferably used.

As the alcohols, polyhydric alcohols having 2 or more hydroxyl groups and those having an ether bond are preferred for their great reducing effect of viscosity to the addition amount. The examples of alcohols include, e.g., ethanol, triethylene glycol, triethylene glycol monobutyl ether, 1,2-hexanediol, 1,5-pentanediol, diethylene glycol, 1-propanol, 2-propanol, methanol, 1,6-hexanediol, glycerol, etc., but the invention is not restricted thereto.

As the nitrogen-containing compounds, 2-pyrrolidone, N-methyl-2-pyrrolidone, dimethylformamide, dimethylacetamide, N-vinyl-2-pyrrolidone, etc., are exemplified, but the invention is not restricted thereto.

As especially preferably used water-miscible organic solvents among these, 2-pyrrolidone, triethylene glycol monobutyl ether, diethylene glycol monobutyl ether, triethylene glycol, and diethylene glycol are exemplified.

The addition amount of the viscosity reducing agent to an ink stock solution is preferably from 0.1 to 20 mass %, and more preferably from 1 to 15 mass %.

The ink stock solution can use arbitrarily an antiseptic, a mildewproofing agent and a pH adjustor.

The manufacturing method of ink in the invention has a process of reducing the viscosity of the compound represented by formula (S-1) by the addition of other dyes to the ink stock solution. Manufacturing methods of ink compositions are disclosed in detail in each of JP-A-5-148436, JP-A-5-295312, JP-A-7-97541, JP-A-7-82515, JP-A-7-118584, and JP-A-2004-331871, and these methods can be used in manufacturing the ink composition in the invention.

The ink composition in the invention can be used not only for forming a monochrome image but also a full color image. For forming a full color image, an ink set preferably contains at least the ink compositions of yellow, magenta and cyan, and a plurality of ink compositions that are the same in hue and different in density can also be used with respective colors. Further, red, green, blue, and intermediate tone ink composition such as violet can also be used.

The examples of dyes as the colorants contained in the ink composition that can be preferably used in the ink set in the invention are shown below, but the invention is by no means restricted thereto.

Yellow Dye:

As yellow dyes, those disclosed in WO 05/075573, JP-A-2004-83903 (paragraphs [0024] to [0062]), JP-A-2003-277661 (paragraphs [0021] to [0050]), JP-A-2003-277662 (paragraphs [0042] to [0047]), JP-A-2003-128953 (paragraphs to [0076]), JP-A-2003-41160 (paragraphs [0028] to [0064]), U.S. Patent Application U.S. 2003/0213405 (paragraph [0108]), and a compound represented by the following formula (Y-1) are exemplified.

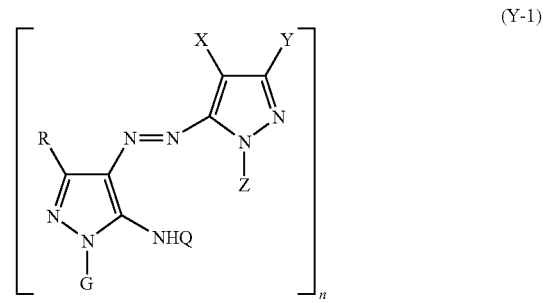

In formula (Y-1), G represents a heterocyclic group, and n represents an integer of from 1 to 3. When n is 1, R, X, Y, Z, Q and G each represents a monovalent group. When n is 2, R, X, Y, Z, Q and G each represents a monovalent or divalent substituent, and at least one represents a divalent substituent. When n is 3, R, X, Y, Z, Q and G each represents a monovalent, divalent or trivalent substituent, and at least two represent a divalent substituent or at least one represents a trivalent substituent.

The compound represented by formula (Y-1) is preferably a compound represented by any of the following formulae (Y-2), (Y-3), (Y-4), (Y-5) and (Y-6).

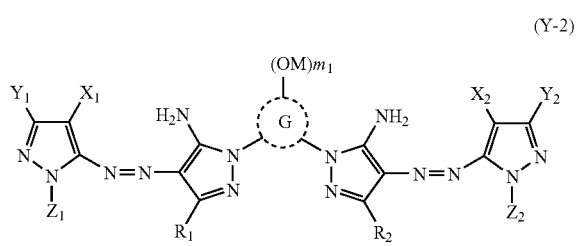

(Y-2)

In formula (Y-2), $R_1$, $R_2$, $X_1$, $X_2$, $Y_1$, $Y_2$, $Z_1$ and $Z_2$ each represents a monovalent group; G represents an atomic group to constitute a 5- to 8-membered nitrogen-containing heterocyclic ring; M represents a hydrogen atom or a cation; and $m_1$ represents an integer of from 0 to 3.

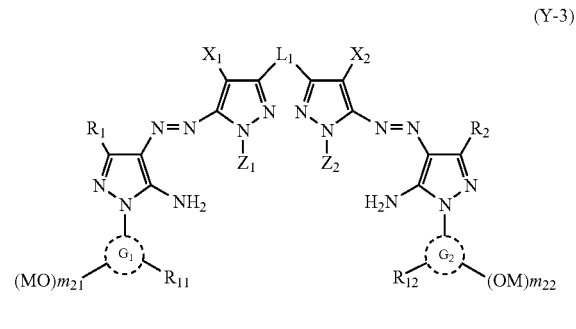

(Y-3)

In formula (Y-3), $R_1$, $R_2$, $R_{11}$, $R_{12}$, $X_1$, $X_2$, $Z_1$ and $Z_2$ each represents a monovalent group; $L_1$ represents a divalent linking group; $G_1$ and $G_2$ each represents an atomic group to constitute a 5- to 8-membered nitrogen-containing heterocyclic ring; M represents a hydrogen atom or a cation; and $m_{21}$ and $m_{22}$ each represents an integer of from 0 to 3.

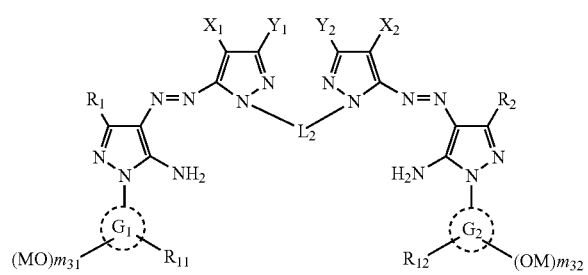

(Y-4)

In formula (Y-4), $R_1$, $R_2$, $R_{11}$, $R_{12}$, $X_1$, $X_2$, $Y_1$ and $Y_2$ each represents a monovalent group; $L_2$ represents a divalent linking group; $G_1$ and $G_2$ each represents an atomic group to constitute a 5- to 8-membered nitrogen-containing heterocyclic ring; M represents a hydrogen atom or a cation; and $m_{31}$ and $m_{32}$ each represents an integer of from 0 to 3.

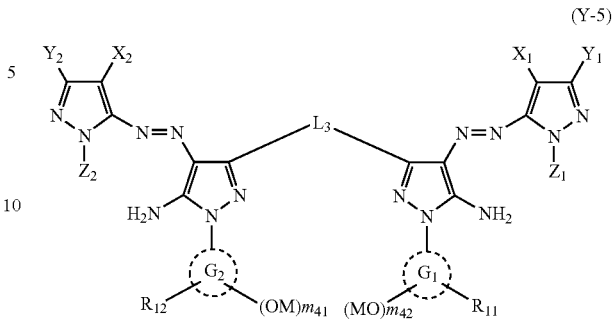

(Y-5)

In formula (Y-5), $R_{11}$, $R_{12}$, $X_1$, $X_2$, $Y_1$, $Y_2$, $Z_1$ and $Z_2$ each represents a monovalent group; $L_3$ represents a divalent linking group; $G_1$ and $G_2$ each represents an atomic group to constitute a 5- to 8-membered nitrogen-containing heterocyclic ring; M represents a hydrogen atom or a cation; and $m_{41}$ and $m_{42}$ each represents an integer of from 0 to 3.

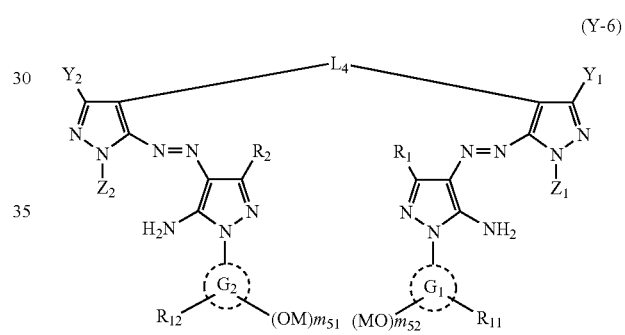

(Y-6)

In formula (Y-6), $R_1$, $R_2$, $R_{11}$, $R_{12}$, $Y_1$, $Y_2$, $Z_1$ and $Z_2$ each represents a monovalent group; $L_4$ represents a divalent linking group; $G_1$ and $G_2$ each represents an atomic group to constitute a 5- to 8-membered nitrogen-containing heterocyclic ring; M represents a hydrogen atom or a cation; and $m_{51}$ and $m_{52}$ each represents an integer of from 0 to 3.

In formulae (Y-2), (Y-3), (Y-4), (Y-5) and (Y-6), the nitrogen-containing heterocyclic ring constituted of G, $G_1$ and $G_2$ is preferably an S-triazine ring.

The specific examples of the compounds represented by formulae (Y-2), (Y-3), (Y-4), (Y-5) and (Y-6) (Exemplified Dyes 1 to 26) are shown below, but the dyes used in the invention are not restricted to these compounds.

The structures of the following specific examples are shown in the form of a free acid, but of course the compounds may be used in the form of an arbitrary salt.

As preferred counter cations, an alkali metal (e.g., lithium, sodium, potassium), ammonium, and an organic cation (e.g., pyridinium, tetramethylammonium, guanidinium) can be exemplified.

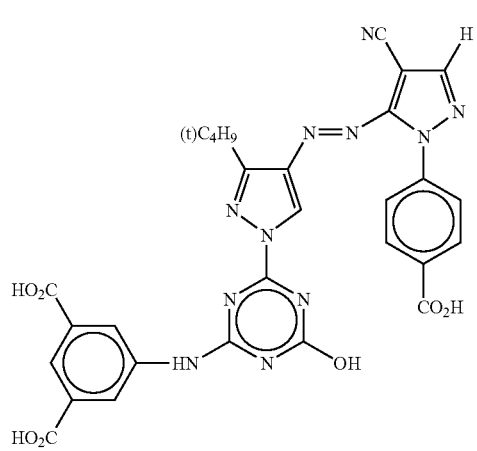
DYE-1
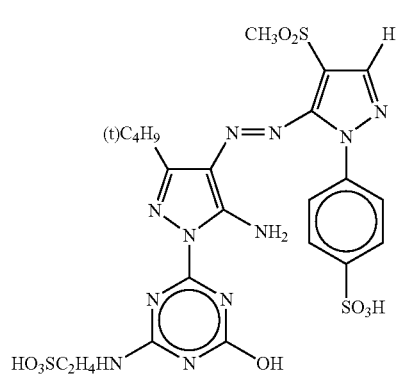
DYE-2
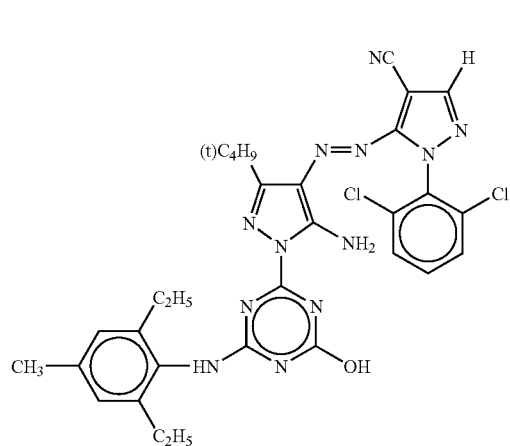
DYE-3
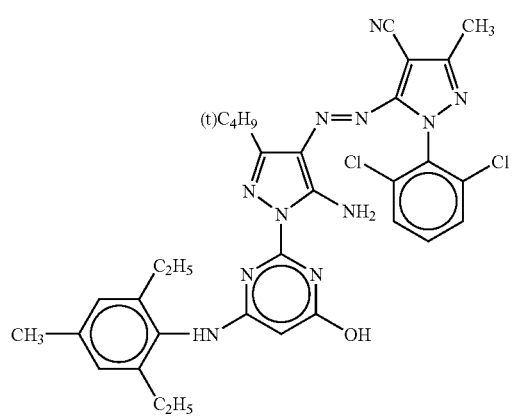
DYE-4
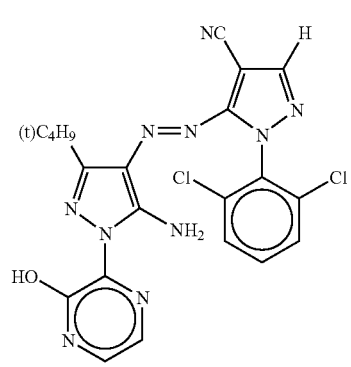
DYE-5
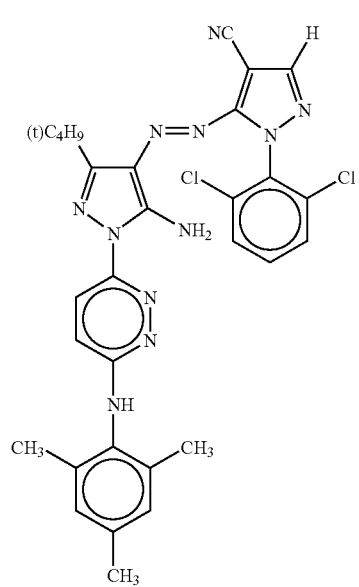
DYE-6

DYE-7
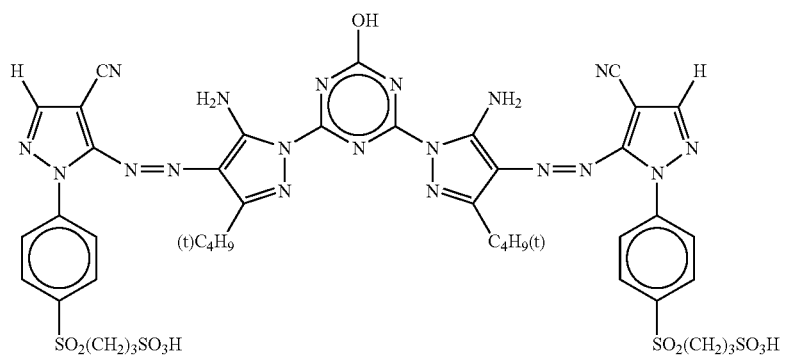
DYE-8
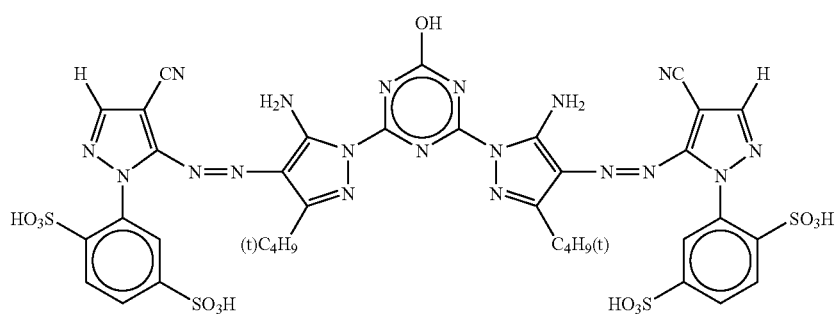
DYE-9
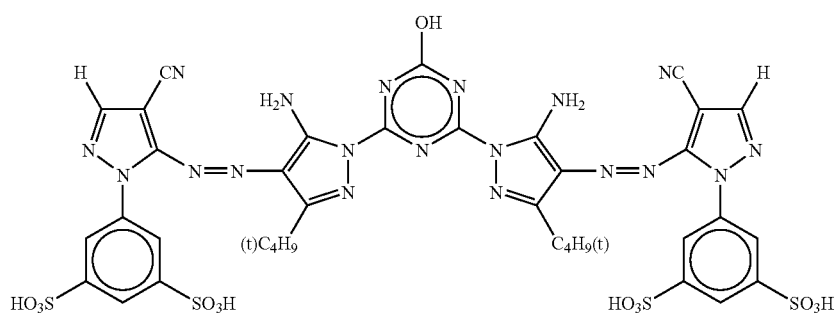
DYE-10
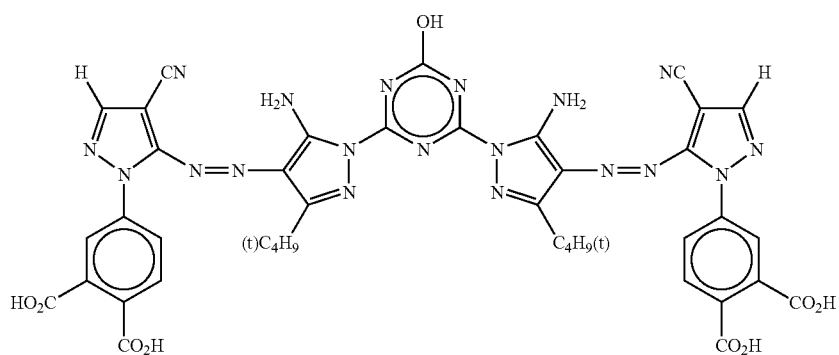

-continued
DYE-11
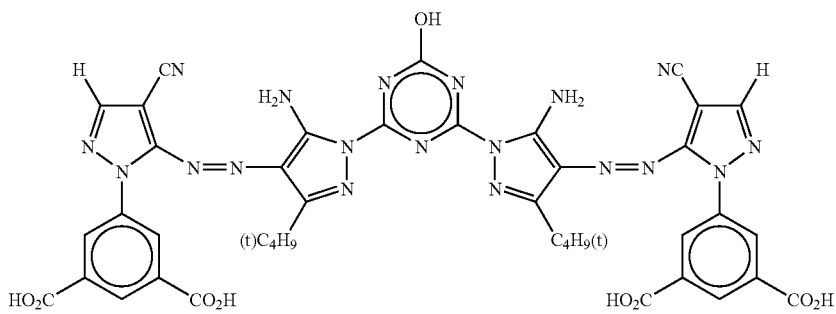
DYE-12
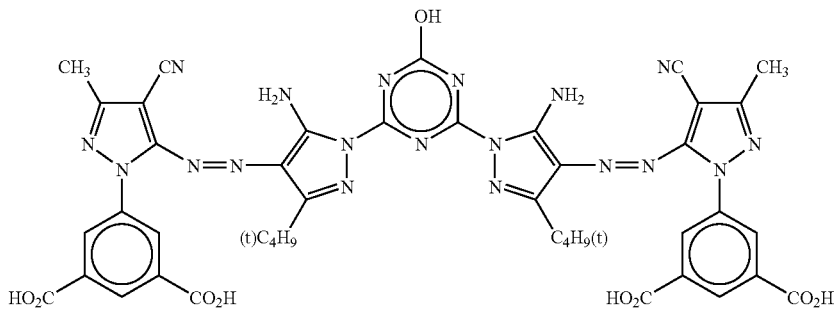
DYE-13
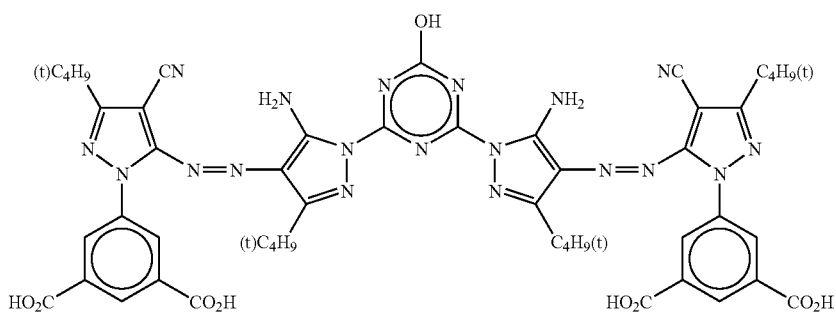
DYE-14
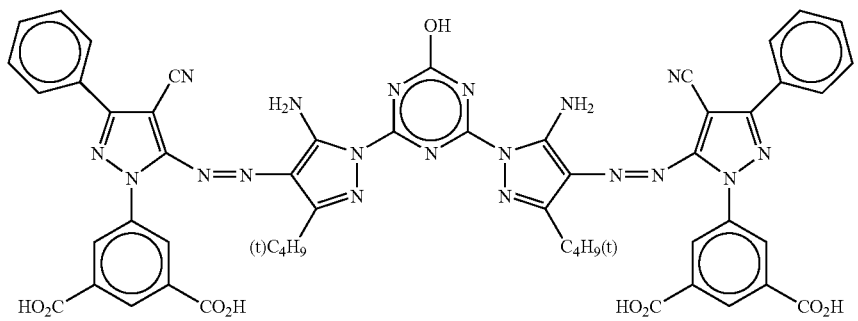
DYE-15
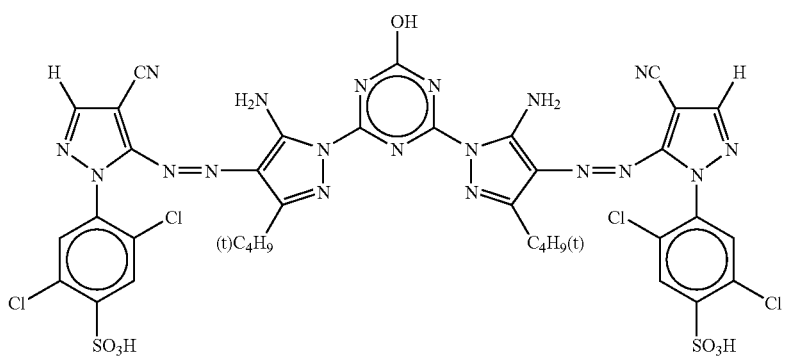

-continued
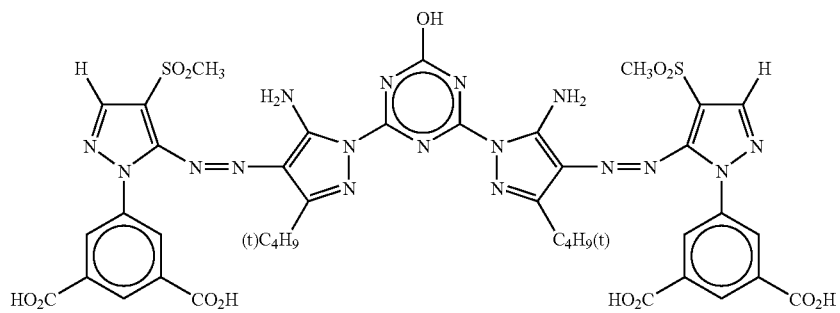
DYE-16
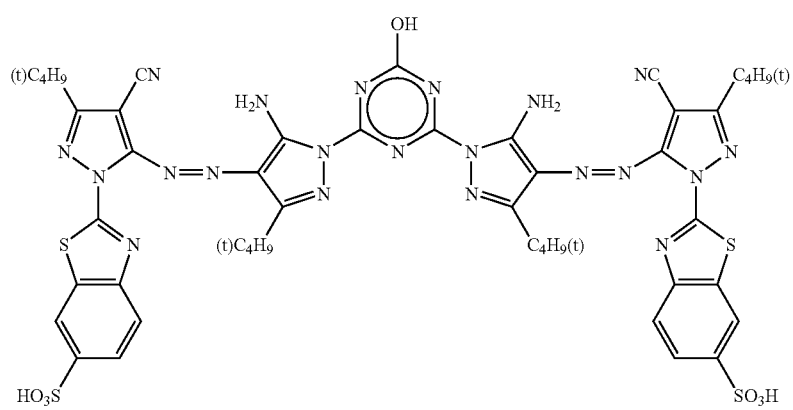
DYE-17
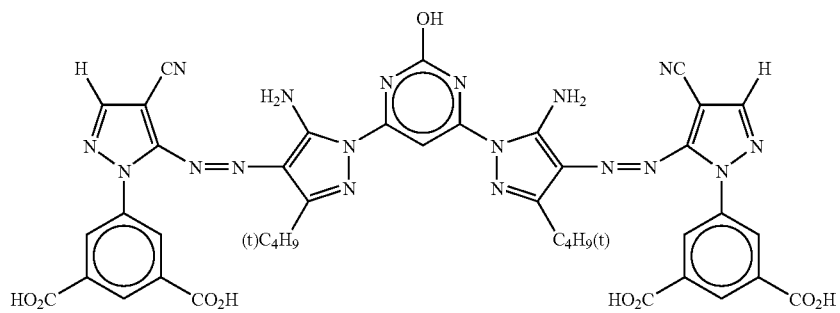
DYE-18
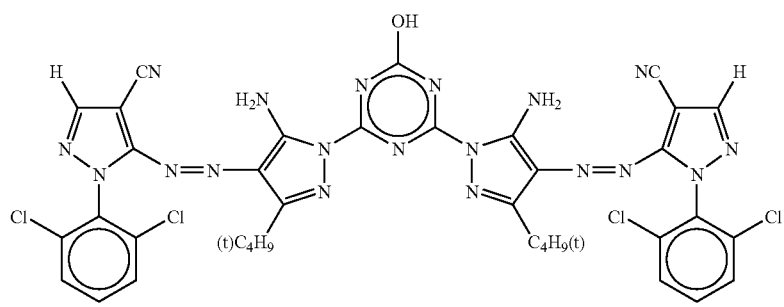
DYE-19
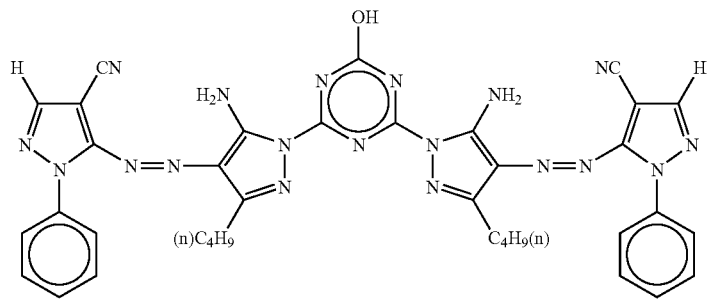
DYE-20

-continued
DYE-21
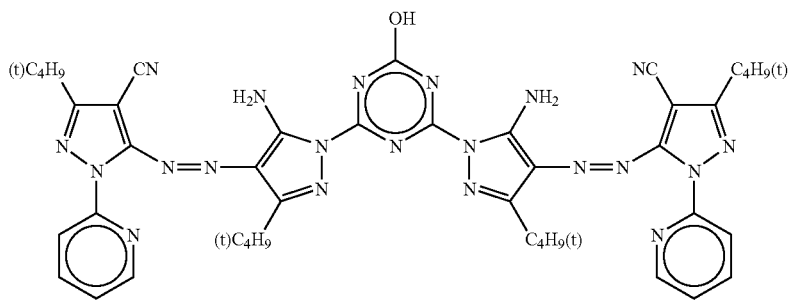
DYE-22
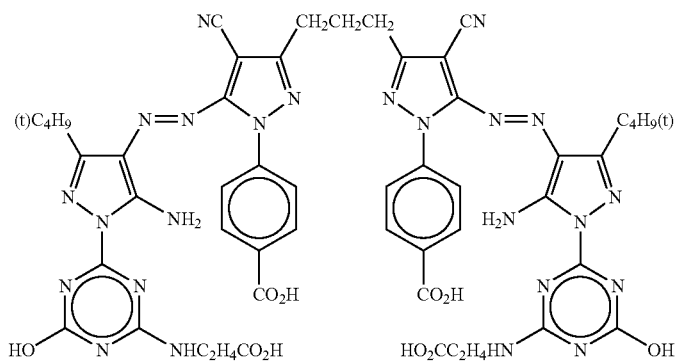
DYE-23
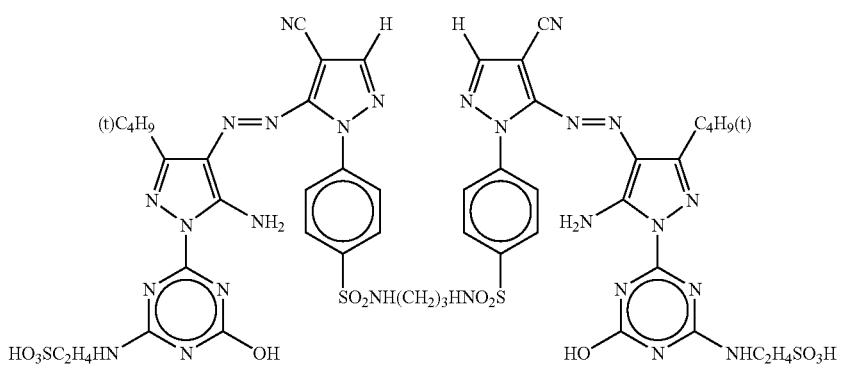
DYE-24
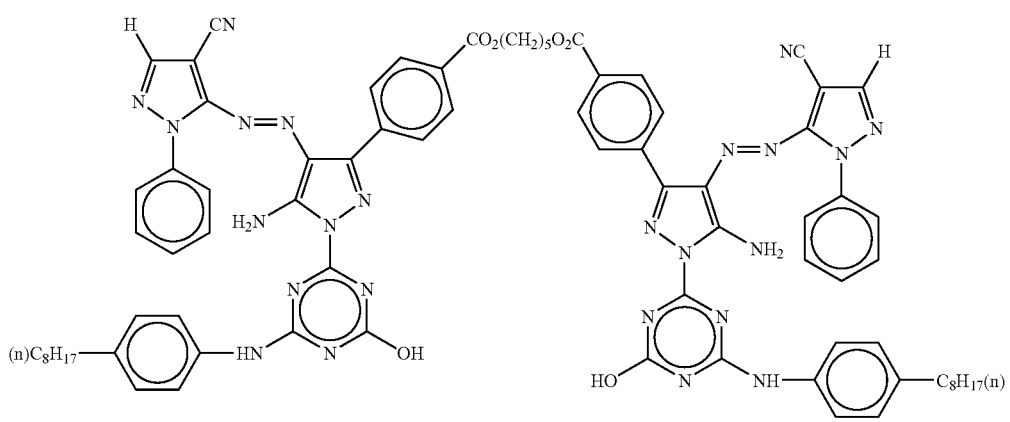

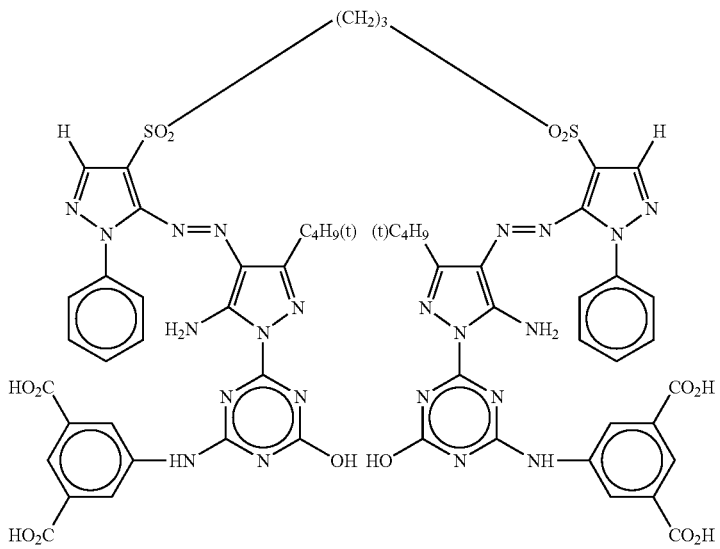

DYE-25

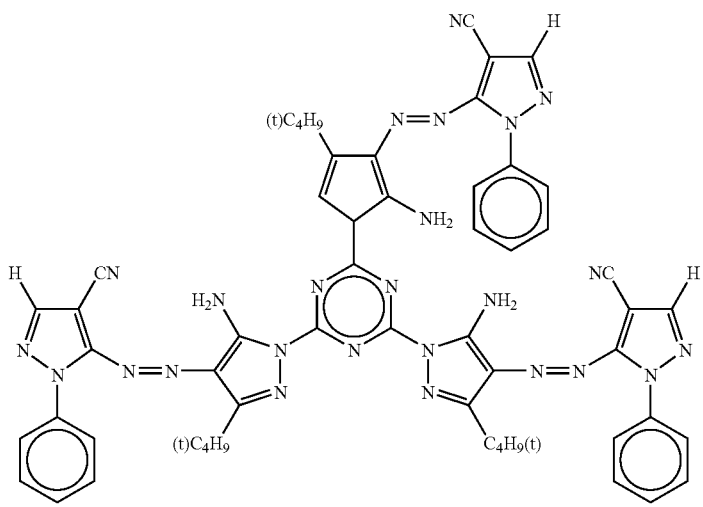

DYE-26

Magenta Dye:

As magenta dyes, heterocyclic azo dyes are preferred, and the azo dyestuffs disclosed in WO 02/83795 (pages 35-55), WO 02/83662 (pages 27-42), JP-A-2004-149560 (paragraphs [0046] to [0059]) and JP-A-2004-149561 (paragraphs to [0060]), and an azo dyestuff represented by the following formula (M-1) are exemplified.

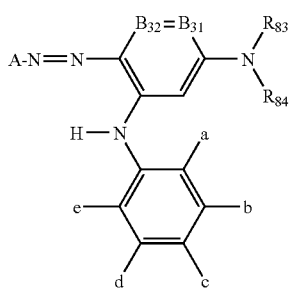

(M-1)

In formula (M-1), A represents the residue of a 5-membered heterocyclic diazo component A-NH$_2$; B$_{31}$ and B$_{32}$ each represents —CR$_{81}$= or —CR$_{82}$=, or either one represents a nitrogen atom and the other represents —CR$_{81}$= or —CR$_{82}$=; R$_{83}$ and R$_{84}$ each represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group, and each group may further have a substituent; R$_{81}$ and R$_{82}$ each represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxyl group, an aryloxy group, a silyloxy group, an acyloxy group, a carbamoyl group, a heterocyclic oxy group, an alkoxycarbonyloxy group, an aryloxycarbonyloxy group, an allylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group, or a heterocyclic thio group, and each group may further be substituted, and $R_{81}$ and $R_{83}$, or $R_{83}$ and $R_{84}$ may be bonded to form a 5- or 6-membered ring; a and e each represents an alkyl group, an alkoxyl group, or a halogen atom, when a and e both represent an alkyl group, the total number of carbon atoms constituting the alkyl group is 3 or more, and they may be further substituted; b, c and d each has the same meaning as $R_{81}$ and $R^2$, and a and b, or e and d, may be condensed with each other, provided that formula (M-1) has at least one ionic hydrophilic group.

A represents the residue of a 5-membered heterocyclic diazo component A-NH$_2$. As the examples of the hetero atoms of the 5-membered heterocyclic ring, N, O and S are exemplified. The 5-membered heterocyclic ring is preferably a nitrogen-containing 5-membered heterocyclic ring, and an aliphatic ring, an aromatic ring, or other heterocyclic ring may be condensed with the heterocyclic ring.

The preferred examples of the heterocyclic rings represented by A include a pyrazole ring, an imidazole ring, a triazole ring, a thiazole ring, an isothiazole ring, a thiadiazole ring, a benzothiazole ring, a benzoxazole ring, and a benzisothiazole ring. Each heterocyclic ring may further have a substituent. Of these heterocyclic rings, a pyrazole ring, an imidazole ring, an isothiazole ring, a thiadiazole ring, a benzothiazole ring, and a triazole ring are preferred.

The azo dyestuff represented by the formula (M-1) is preferably represented by the following formula (M-2).

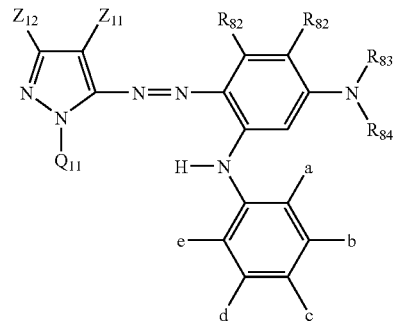

In formula (M-2), $Z_{11}$ represents an electron attracting group having a Hammett's substitution constant σp value of 0.20 or more; $Z_{12}$ represents a hydrogen atom, an acyl group, an aliphatic group, an aromatic group, or a heterocyclic group; $R_{81}$, $R_{82}$, $R_{83}$, $R_{84}$, a, b, c, d and e each the same meaning as in formula (M-1); and Q represents a hydrogen atom, an aliphatic group, aromatic group, or a heterocyclic group. Each of $Z_{11}$, $Z_{12}$ and $Q_{11}$ may further have a substituent, provided that formula (M-2) has at least one ionic hydrophilic group.

The specific examples of azo dyestuffs are shown below, but the invention is not restricted thereto.

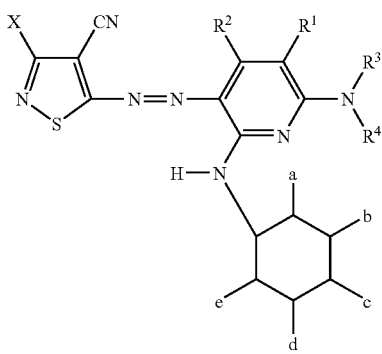

| Cpd. | X | $R^1$ | $R^2$ | $R^3$ | $R^4$ | a | b | c | d | e |
|---|---|---|---|---|---|---|---|---|---|---|
| a-1 | CH$_3$ | CN | CH$_3$ | H | 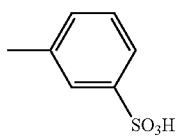 | CH$_3$ | H | SO$_3$H | H | C$_2$H$_5$ |
| a-2 | " | CONH$_2$ | H | " | 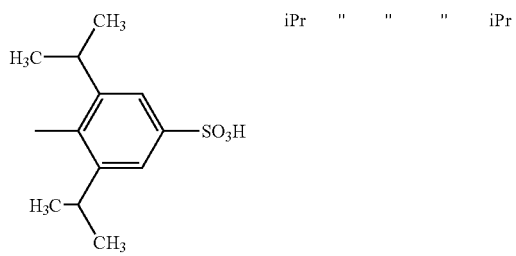 | iPr | " | " | " | iPr |

-continued
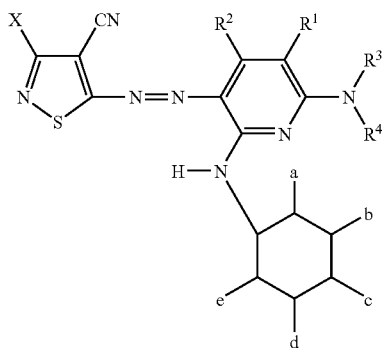
| Cpd. | X | R¹ | R² | R³ | R⁴ | a | b | c | d | e |
|---|---|---|---|---|---|---|---|---|---|---|
| a-3 | " | H | CH₃ | (2-methylbenzothiazole-6-SO₃H) | " | " | " | " | " | " |
| a-4 | " | " | " | " | (3,5-diethyl-4-methylphenyl-SO₃H) | C₂H₅ | " | " | " | C₂H₅ |
| a-5 | " | " | " | " | (2,6-dimethyl-3,5-diethylphenyl-SO₃H) | " | " | CH₃ | SO₃H | " |
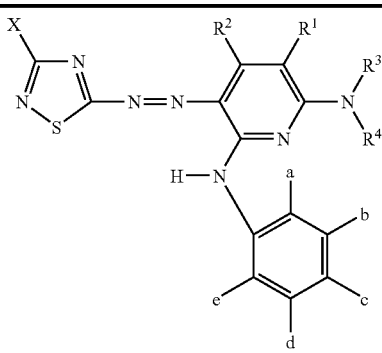
| Cpd. | X | R¹ | R² | R³ | R⁴ | a | b | c | d | e |
|---|---|---|---|---|---|---|---|---|---|---|
| b-1 | —SCH₃ | CN | CH₃ | H | (3-SO₃H-phenyl) | CH₃ | H | SO₂H | H | C₂H₅ |

-continued

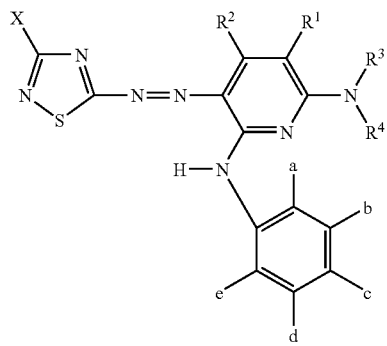

| Cpd. | X | R¹ | R² | R³ | R⁴ | a | b | c | d | e |
|------|---|----|----|----|----|---|---|---|---|---|
| b-2 | -S-CH₂CH₂-SO₃H | CONH₂ | H | " | 3,5-bis(isopropyl)-4-methylphenyl-SO₃H | iPr | " | " | " | iPr |
| b-3 | 3-methylphenyl-SO₃H | H | CH₃ | 2-methylbenzothiazol-6-yl-SO₃H | 3,5-bis(isopropyl)-4-methylphenyl-SO₃H | " | " | " | " | " |
| b-4 | -S-CH₂CH₂-SO₃H | " | " | 2-methylbenzothiazol-6-yl-SO₃H | 3,5-bis(ethyl)-4-methylphenyl-SO₃H | C₂H₅ | " | " | " | C₂H₅ |
| b-5 | —SCH₃ | " | " | 2-methylbenzothiazol-6-yl-SO₃H | 3,5-bis(ethyl)-2,6-dimethyl-4-SO₃H-phenyl | " | " | CH₃ | SO₂H | " |

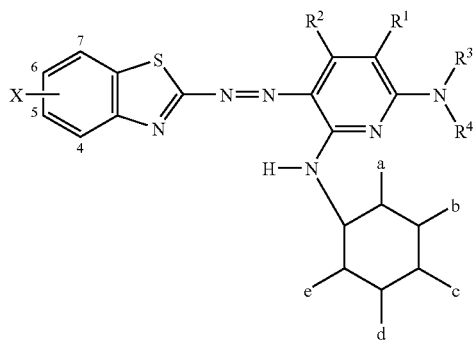
| Cpd. | X | R¹ | R² | R³ | R⁴ | a | b | c | d | e |
|---|---|---|---|---|---|---|---|---|---|---|
| c-1 | 5-Cl | CN | CH₃ | H | 3-methylphenyl-SO₃H | CH₃ | H | SO₃H | H | C₂H₅ |
| c-2 | 5,6-diCl | CONH₂ | H | " | 3,5-diisopropyl-4-methylphenyl-SO₃H | iPr | " | " | " | iPr |
| c-3 | 5-CH₃ | H | CH₃ | 2-methylbenzothiazol-6-yl-SO₃H | 3,5-diisopropyl-4-methylphenyl-SO₃H | " | " | " | " | " |
| c-4 | 6-Cl | " | " | 2-methylbenzothiazol-6-yl-SO₃H | 3,5-diethyl-4-methylphenyl-SO₃H | C₂H₅ | " | " | " | C₂H₅ |
| c-5 | 5,6-diCl | " | " | 2-methylbenzothiazol-6-yl-SO₃H | 3,5-diethyl-2,6-dimethylphenyl-SO₃H | " | " | CH₃ | SO₃H | " |

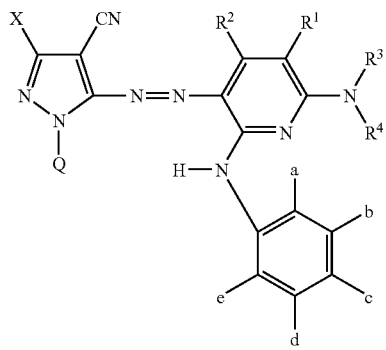
| Cpd. | X | Q | R¹ | R² | R³ |
|---|---|---|---|---|---|
| d-1 | (phenyl) | 2-methylbenzothiazole-6-SO₃H | CN | CH₃ | H |
| d-2 | t-Bu | 2-methylbenzothiazole-6-SO₃H | CONH₂ | H | " |
| d-3 | " | 2-methylbenzothiazole-6-SO₃H | H | CH₃ | 2-methylbenzothiazole-6-SO₃H |
| d-4 | " | 2-methylbenzothiazole-6-SO₃H | " | " | 2-methylbenzothiazole-6-SO₃H |
| d-5 | " | 2-methylbenzothiazole-6-SO₃H | " | " | 2-methylbenzothiazole-6-SO₃H |
| Cpd. | R⁴ | a | b | c | d | e |
|---|---|---|---|---|---|---|
| d-1 | 4-methylbenzenesulfonic acid | CH₃ | H | SO₃H | H | C₂H₅ |
| d-2 | 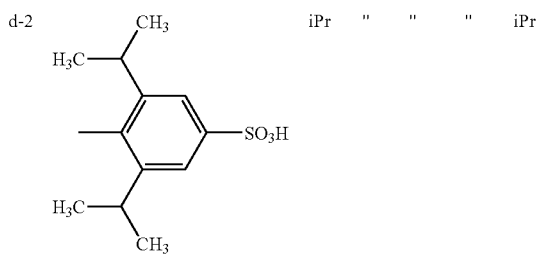 | iPr | " | " | " | iPr |

-continued
| | | | | | | |
|---|---|---|---|---|---|---|
| d-3 | 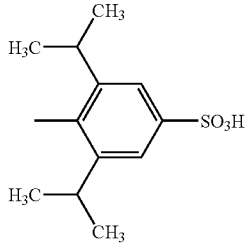 | " | " | " | " | " |
| d-4 | 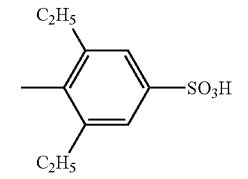 | C₂H₅ | " | " | " | C₂H₅ |
| d-5 | 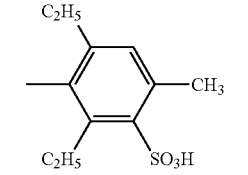 | " | " | CH₃ | SO₃H | " |
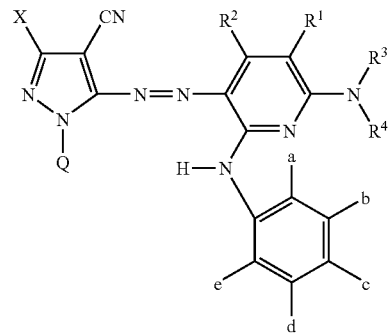
| Cpd. | X | Q | R¹ | R² | R³ |
|---|---|---|---|---|---|
| d-6 | t-Bu | 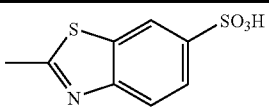 | H | CH₃ | 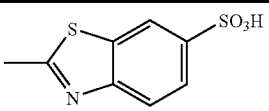 |
| d-7 | " | 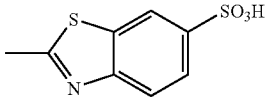 | " | " | 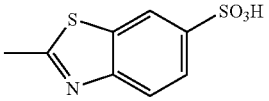 |
| d-8 | " | 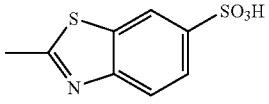 | " | " | 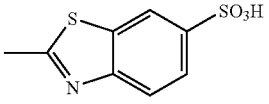 |
| d-9 | " | 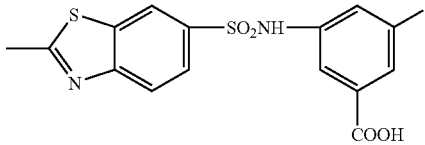 | " | " | 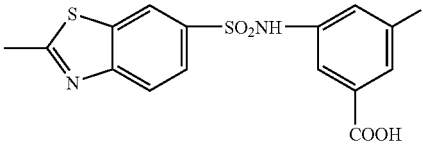 |

-continued
| Cpd. | R⁴ | a | b | c | d | e |
|---|---|---|---|---|---|---|
| d-10 | " | 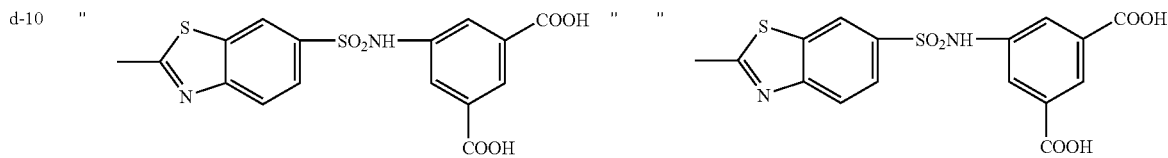 | " | " | | |
| d-6 | (3-methyl-4-methyl-5-isopropylphenyl-SO₃H) | CH₃ | H | SO₃H | H | iPr |
| d-7 | (3-methyl-4-methyl-5-methoxyphenyl-SO₃H) | " | " | " | " | OCH₃ |
| d-8 | (trimethyl-chloro-phenyl-SO₃H) | " | " | CH₃ | SO₃H | Cl |
| d-9 | (diethyl-dimethyl-phenyl-SO₃H) | C₂H₅ | " | " | " | C₂H₅ |
| d-10 | (diisopropyl-methyl-phenyl-SO₃H) | iPr | " | SO₃H | " | iPr |

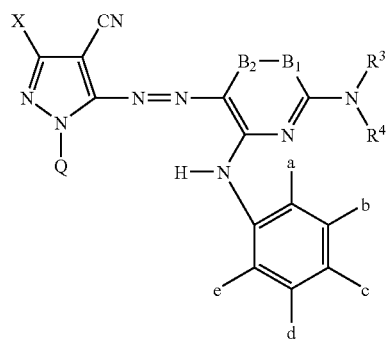

| Cpd. | Q | B₁ | B₂ | R³ |
|---|---|---|---|---|
| d-11 | 2-methylbenzoxazole-6-SO₃H | N | C—CH₃ | H |
| d-12 | 2-methylbenzothiazole-6-SO₃H | " | C—NHCCH₃ (C=O) | " |
| d-13 | 2-methylbenzothiazole-6-SO₃H | C—H | N | " |
| d-14 | 2-methylbenzothiazole-6-SO₂NH-(3,5-dicarboxyphenyl) | C—H | N | 2-methylbenzothiazole-6-SO₃H |
| d-15 | 2-methylbenzothiazole-6-SO₂NH-(3,5-dicarboxyphenyl) | N | C—NHCCH₃ (C=O) | 2-methylbenzothiazole-6-SO₃H |

| Cpd. | R⁴ | a | b | c | d | e |
|---|---|---|---|---|---|---|
| d-11 | 3,5-diethyl-2-methyl-6-(methyl)-4-(sulfophenyl) with CH₃, C₂H₅, SO₃H substituents | C₂H₅ | H | CH₃ | SO₃H | C₂H₅ |
| d-12 | 3,5-diethyl-2-methyl-6-(methyl)-4-(sulfophenyl) with CH₃, C₂H₅, SO₃H substituents | " | " | " | " | " |

-continued
| Cpd. | | | | | | |
|---|---|---|---|---|---|---|
| d-13 | 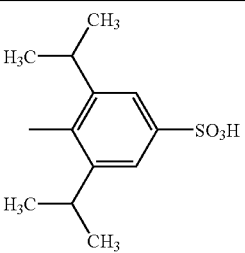 | iPr | " | SO₃H | H | iPr |
| d-14 | 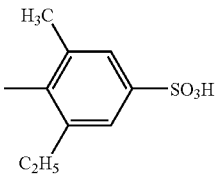 | CH₃ | " | " | " | C₂H₅ |
| d-15 | 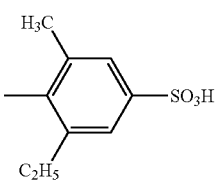 | " | " | " | " | " |
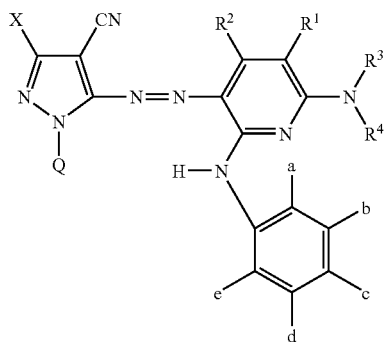
| Cpd. | X | Q | R¹ | R² | R³ |
|---|---|---|---|---|---|
| d-16 | t-Bu | 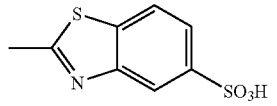 | H | CH₃ | 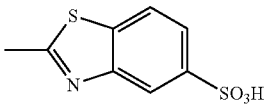 |
| d-17 | " | 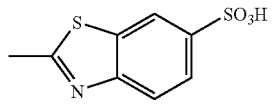 | " | " | 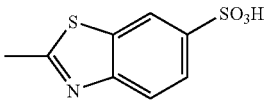 |
| d-18 | " | 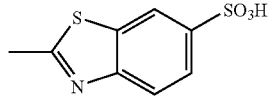 | " | " | 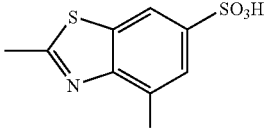 |
| d-19 | " | 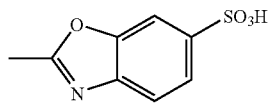 | " | " | 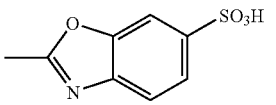 |

-continued

| Cpd. | R⁴ | a | b | c | d | e |
|---|---|---|---|---|---|---|
| d-16 | C₂H₅ 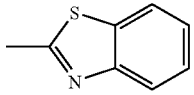 | C₂H₅ | H | CH₃ | SO₃H | C₂H₅ |
| d-17 | C₂H₅ 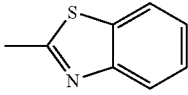 | " | " | " | " | " |
| d-18 | C₂H₅ 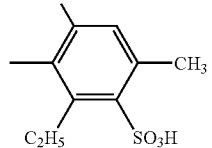 | " | " | " | " | " |
| d-19 | C₂H₅ 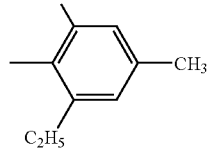 | " | " | " | " | " |
| d-20 | C₂H₅ 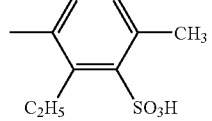 | " | " | " | " | " |

Also in the header row (above the table):
d-20 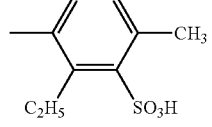 " " 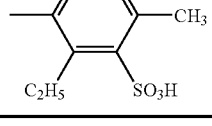

Cyan Dye:

As phthalocyanine dye is preferred as cyan dye, and associating phthalocyanine dyes are preferred. As the associating phthalocyanine dyes, those having an associating group are preferred. The associating group means a group at least having a bonding site (or a functional group) capable of hydrogen bonding between molecules at least in the group. The bonding site can be present one or more in one group. As the bonding sites, a hydroxyl group, an amino group, an amido bond, an oxide bond, etc., are exemplified, and hydrogen bonding is formed between the same kind or different kinds. The associating group may be one capable of hydrogen bonding between a phthalocyanine dye and an arbitrary additive.

For reducing the reactivity with ozone that is an electrophilic agent, it is preferred to make oxidation potential 1.0 V (vs SCE) or nobler by partially substituting the carbon atom of a phthalocyanine skeleton with a hetero atom, e.g., azaphthalocyanine, or by introducing an electron attracting group into a phthalocyanine skeleton. The nobler, the more preferred is the oxidation potential. The oxidation potential is more preferably 1.1 V (vs SCE) or nobler, and especially preferably 1.15 V (vs SCE) or nobler.

As associating phthalocyanine dyes, those disclosed in WO 02/60994, WO 03/811, WO 03/62324, JP-A-2003-213167, JP-A-2004-75986, JP-A-2004-323605, JP-A-2004-315758, JP-A-2004-315807 and JP-A-2005-179469 are exemplified.

Besides the above patents, phthalocyanine dyes can be synthesized according to JP-A-2004-315729, JP-A-2005-41856 and JP-A-2004-323511. Further, starting materials, dye intermediates, and synthesis route are not restricted thereto.

The ink set in the invention can also be used for uses other than ink jet recording. For example, the ink set can be used as materials for display image, image-forming materials of interior decoration, and image-forming materials of outdoor decoration as disclosed in JP-A-2004-331871, paragraphs [0727] to [0731].

Besides the above dyes, the dyes disclosed in the following patents can also be preferably used in ink composition of each color: JP-A-10-130557, JP-A-9-255906, JP-A-6-234944, JP-A-7-97541, EP 982371, WO 00/43450, WO 00/43451, WO 00/43452, WO 00/43453, WO 03/106572, WO 03/104332, JP-A-2003-238862, JP-A-2004-83609, JP-A-2002-302619, JP-A-2002-327131, JP-A-2002-265809, WO 01/48090, WO 04/087815, WO 02/00-441, WO 03/027185, WO 04/085541, JP-A-2003-321627, JP-A-2002-332418, JP-A-2002-332419, WO 02/059216, WO 02/059215, WO 04/087814, WO 04/046252, WO 04/046265, Japanese Patent 3479444, U.S. Pat. No. 6,652,637B, WO 03/106572, WO 03/104332, WO 00/58407, Japanese Patent 3558211, Japanese Patent 3558212, Japanese Patent 3558213, JP-A-2004-285351, JP-A-2004-323605, and WO 04/104108.

Recording Method:

The recording method in the invention is to adhere the ink composition of the invention to a recording material. The preferred recording method in the invention is an ink jet recording method of performing recording by ejecting the droplets of the ink composition onto a recording medium by imparting energy to the ink composition to form an image on known image-receiving materials as materials to be recorded, that is, plane paper and resin coat paper, e.g., special paper for ink jet recording, films, electrophotographic common paper, napkin, glass, metal, ceramics, etc., as disclosed in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947. The description in JP-A-2003-306623, paragraphs [0093] to [0105] can be applied to the ink jet recording method in the invention.

In forming an image, polymer latex compounds may be used in combination for the purpose of providing glossiness and a waterproof property, and improving a weather resisting property. The time of applying polymer latex compounds to an image-receiving material may be any time before, after, or at the same time with the addition of colorants, accordingly the plate of addition may be in image-receiving paper, in ink, or may be used as a liquid material of a polymer latex alone.

Specifically, the methods disclosed in JP-A-2002-166638, JP-A-2002-121440, JP-A-2002-154201, JP-A-2002-144696, JP-A-2002-080759, JP-A-2002-187342 and J-P-A-2002-172774 can be preferably used.

Recording paper and recording film for use in ink jet printing with the ink of the invention are described below. The supports in recording paper and recording film comprise chemical pulp, e.g., LBKP, NBIP, etc., mechanical pulp, e.g., GP, PGW, RMP, TMP, CTMP, CMP, CGP, etc., and wastepaper pulp, e.g., DIP, etc., and manufactured by adding various additives, according to necessity, e.g., a conventionally known pigment, a binder, a sizing agent, a fixing agent, a cationic agent, and a paper strength increasing agent, and made with various paper machines, e.g., Fourdrinier machine and cylinder paper machine. Other than these supports, synthetic paper and a plastic film sheet can be used as supports. The thickness of a support is preferably from 10 to 250 μm and weight is from 10 to 250 g/m². An ink-receiving layer and a back coat layer may be directly provided on a support, or an ink-receiving layer and a back coat layer may be provided after providing size press or an anchor coat layer with starch and polyvinyl alcohol. A support may be subjected to flattening treatment with calendering apparatus, e.g., machine calender, TG calender or soft calender. In the invention as supports, paper and plastic film both surfaces of which are laminated with polyolefin (e.g., polyethylene, polystyrene, polyethylene terephthalate, polybutene and copolymers thereof) are more preferably used. It is preferred to add white pigments (e.g., titanium oxide, zinc oxide) or toning dyes (e.g., cobalt blue, ultramarine, neodymium oxide) to polyolefin.

An ink-receiving layer provided on a support contains a pigment and an aqueous binder. The pigment is preferably a white pigment. The examples of white pigments include white inorganic pigments, e.g., calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium-dioxide, zinc sulfide, zinc carbonate, etc., and organic pigments, e.g., styrene-based pigments, acrylic-based pigments, urea resins melamine resins, etc. As white pigments contained in an ink-receiving layer, porous inorganic pigments are preferred, and synthetic amorphous silica having a large pore area is especially preferred. As synthetic amorphous silica, both of silicic anhydride manufactured by a dry manufacturing method and hydrous silicic acid manufactured by a wet manufacturing method can be used, but it is especially preferred to use hydrous silicic acid.

In the recording method of the invention, methods of ink jet recording are not restricted, and the ink or ink set of the invention can be used in known systems, for example, an electrical charge controlling system of making use of electrostatic induction force and ejecting ink droplets, a system of using ink jet heads of forming ink droplets by mechanical deformation of electrostrictive elements, a drop on demand system (a pressure pulse system) of utilizing vibratory pressure of piezo-elements, an acoustic ink jet system of converting electric signal to acoustic beam and irradiating ink, and ejecting ink droplets by making use of the radiation pressure, and a thermal ink jet system of heating ink to thereby generate bubbles, and ejecting ink droplets by utilizing the generated pressure. Ink jet recording systems include a system of ejecting a great number of minute volumes of ink droplets of so-called photo-ink of low density, a system of improving image quality by using a plurality of inks having substantially the same hue and different densities, and a system of using colorless and transparent ink.

Embodiment

The invention will be described with reference to examples, but the invention is by no means restricted thereto.

Manufacture of Ink Stock Solution:

To 50 g of dye (Black S-1) was added 850 g of ultrapure water (specific resistance value: 18 MΩ·cm or more), and the mixture was stirred by heating at 60 to 65° C. for 1 hour with heating. After the dye was thoroughly dissolved, the solution was cooled to room temperature, and 100 g of 2-pyrrolidone as a viscosity reducing agent, and 1.0 g of PROXEL XL2 as an antiseptic were added to the solution. After stirring for 10 minutes, the solution was filtered through a microfilter having an average pore size of 0.2 μm under reduced pressure to prepare an ink stock solution for inkjet recording.

The ink stock solutions of (Black S-2), (Black S-3) and (Black S-4) were manufactured.

Preparation of Black Ink:

After adding ultrapure water to the following components to make 100%, each mixture was stirred by heating at 30 to 40° C. for 1 hour. The resulted solution was then filtered through a microfilter having an average pore size of 0.25 μm under reduced pressure to prepare each black ink solution. In Table 1 below, the numerical value of each component is shown in wt % taking the mass of the ink composition as 100%, and "the rest" that shows the amount of water means the amount making 100% in total with the components other than water.

TABLE 1

|  | B-1 | B-2 | B-3 | B-4 | B-5 | B-6 | B-7 | B-8 | B-9 | B-10 | B-11 | B-12 |
|---|---|---|---|---|---|---|---|---|---|---|---|---|
| Black S-1 Ink stock solution | 30 |  |  |  | 30 | 18 | 14 | 20 | 25 | 30 | 30 | 30 |
| Black S-2 Ink stock solution |  | 30 |  |  |  |  |  |  |  |  |  |  |
| Black S-3 Ink stock solution (comparative dye) |  |  | 30 |  |  |  |  |  |  |  |  |  |
| Black S-4 Ink stock solution (comparative dye) |  |  |  | 30 |  |  |  |  |  |  |  |  |
| Black L-1 | 6 | 6 | 6 | 6 |  |  |  |  |  |  |  |  |
| Black L-2 |  |  |  |  | 6 |  |  |  |  |  |  |  |
| Black L-3 |  |  |  |  |  | 6 |  |  |  |  |  |  |
| Black L-4 |  |  |  |  |  |  | 6 |  |  |  |  |  |
| Black L-5 |  |  |  |  |  |  |  | 6 |  |  |  |  |
| Black L-6 |  |  |  |  |  |  |  |  | 6 |  |  |  |
| Black L-7 (comparative dye) |  |  |  |  |  |  |  |  |  | 6 |  |  |
| Black L-8 (comparative dye) |  |  |  |  |  |  |  |  |  |  | 6 |  |
| Black L-9 (comparative dye) |  |  |  |  |  |  |  |  |  |  |  | 6 |
| Glycerol | 10 | 10 | 10 | 10 | 10 | 10 | 10 | 10 | 10 | 10 | 10 | 10 |
| Triethylene glycol | 2 | 2 | 2 | 2 | 2 | 2 | 2 | 2 | 2 | 2 | 2 | 2 |
| Propylene glycol |  |  |  |  |  |  | 2 |  | 2 |  |  |  |
| TEGmBE | 8 | 8 | 8 | 8 | 8 | 8 | 8 | 8 | 8 | 8 | 8 | 8 |
| Sarfinol 465 (*1) | 1 | 1 | 1 | 1 | 1 | 1 | 1 | 1 | 1 | 1 | 1 | 1 |
| Urea | 5 | 3 | 3 | 3 | 3 | 5 | 5 | 5 | 5 | 3 | 3 | 3 |
| Bronzing inhibitor I |  |  |  |  |  |  |  | 1 |  |  |  |  |
| 1,2-Hexanediol | 3 | 3 | 3 | 3 | 3 |  | 1 |  | 1 | 3 | 3 | 3 |
| 2,5-Dimethyl-2,5-hexanediol |  |  |  |  |  | 3 |  | 1 |  |  |  |  |
| 2,4-Diethyl-1,5-pentanediol |  |  |  |  |  |  | 2 |  |  |  |  |  |
| 2-Methyl-2,4-pentanediol |  |  |  |  |  |  |  | 2 | 2 |  |  |  |
| PROXEL XL2 (*2) | 3 | 3 | 3 | 3 | 3 | 3 | 3 | 3 | 3 | 3 | 3 | 3 |
| Water | The rest | The rest | The rest | The rest | The rest | The rest | The rest | The rest | The rest | The rest | The rest | The rest |

Unit: wt %
(*1): Manufactured by Air Products and Chemicals Inc.
(*2): Manufactured by Avecia Water-soluble Short Wave Dye S in the Invention (Black·S-1)

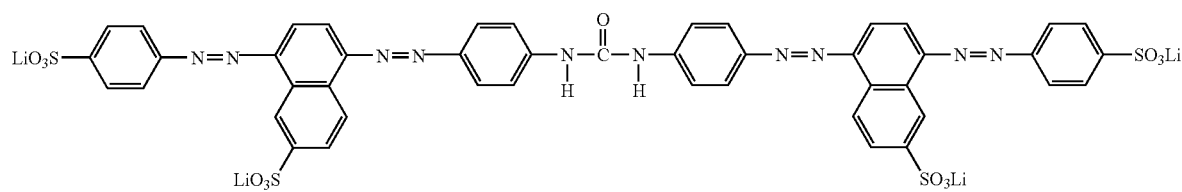

(Black·S-2)

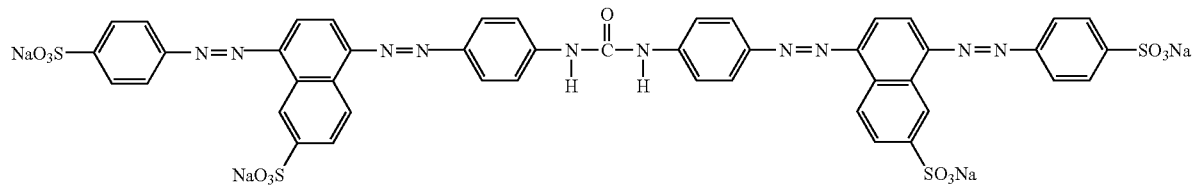

Comparative Dye (Black·S-3) C. I. Acid Yellow 23

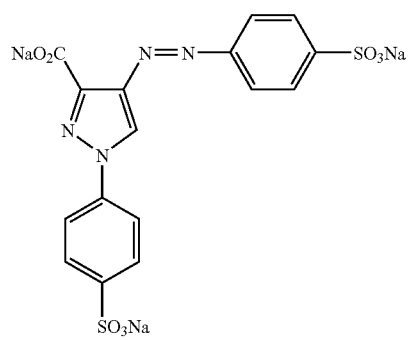

(Black·S-4) C. I. Direct Yellow 120
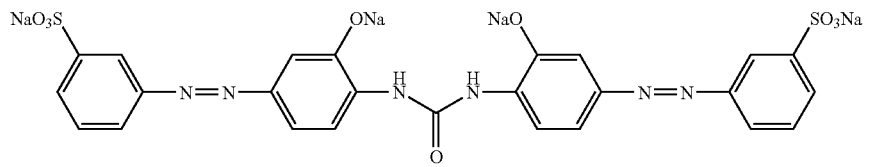
Water-soluble Long Wave Dye L
(Black•L-1)
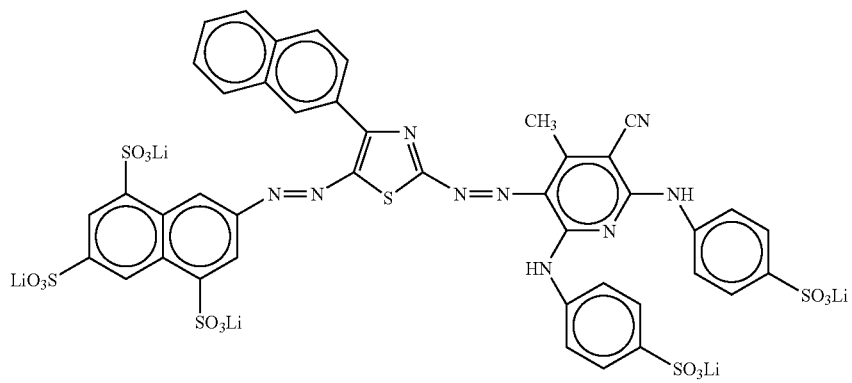
(Black•L-2)
(Black•L-3)
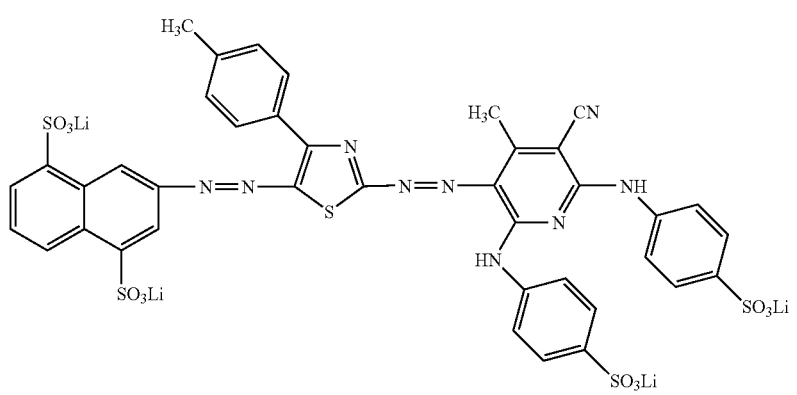
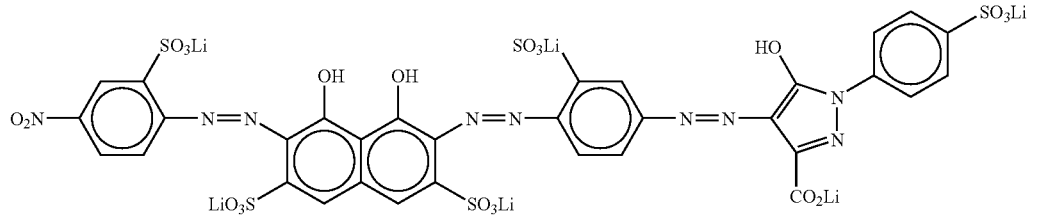
(Black L-4)
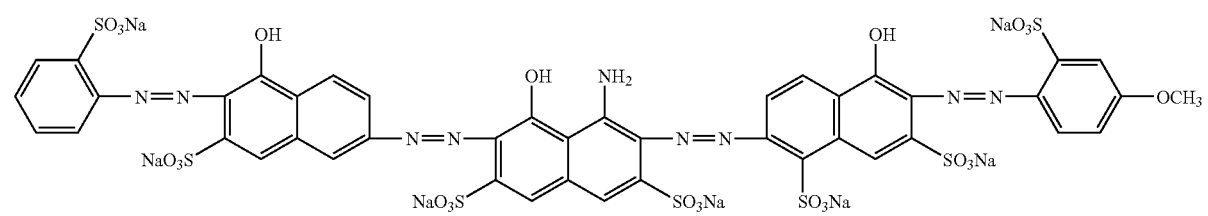

-continued
(Black L-5)
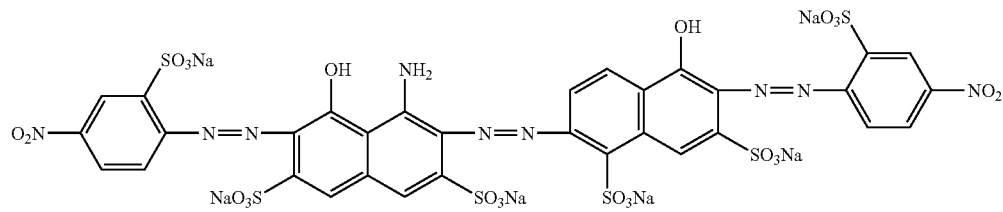
(Black L-6)
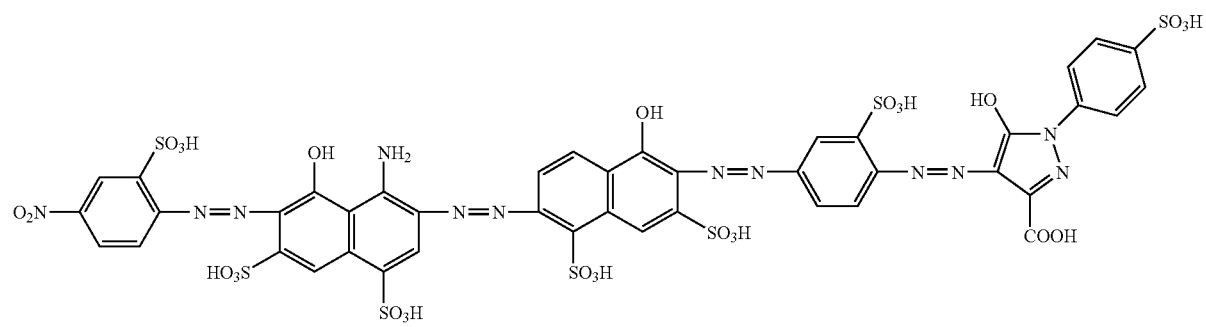
(Black L-7)
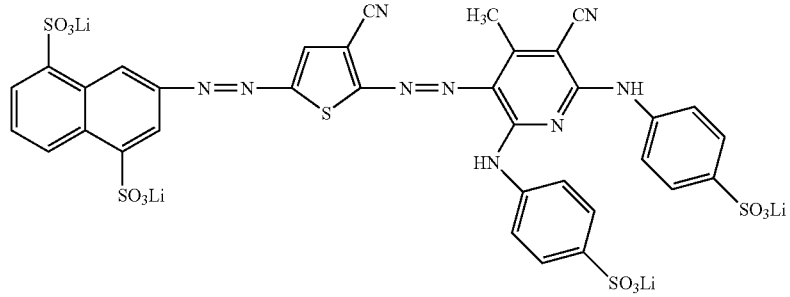
(Black L-8)
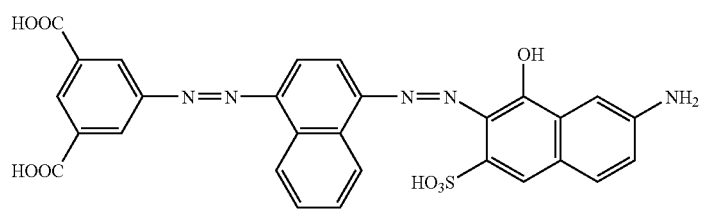
(Black L-9)
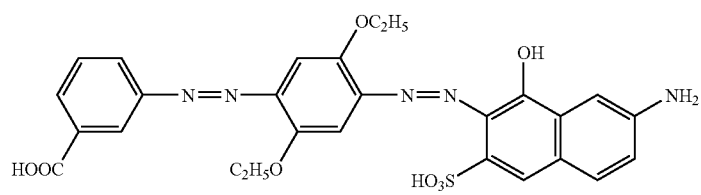
Bronzing Inhibitor I
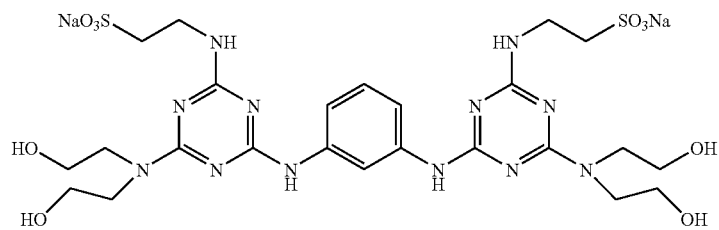

EXAMPLE 1

These black inks were filled in black ink cartridges of Ink Jet Printer PM-A700 (manufactured by SEIKO EPSON CORPORATION). A gray image whose density changed stepwise from R:0, G:0, B:0 to R:255, G:255, B:255 (hereinafter referred to as step pattern) was made with imaging software Photoshop (manufactured by Adobe Systems Incorporated), printed in "black" mode, and an image printed with black ink alone was obtained. As the image-receiving sheet, Kassai (Photo Finish Pro, manufactured by Fuji Photo Film Co., Ltd.) was used.

Evaluation:

1) The hue was evaluated by visually observing gray tone in each printed density in gray step pattern. The hue that shows preferred gray tone in each density is graded A, the hue where density of losing gray balance here and there is found is graded B, and the hue where almost all the densities lose gray balance is graded C.
2) Regarding preservation stability of image, evaluations of the following 3) and 4) were performed with a gray printed sample. In evaluation of image preservation stability, the density of step pattern was measured with densitometer X-rite 310 loading Status A Filter, and the change in density was measured with the point near Dvis=1.0 being the reference point.
3) Light fastness
3-1) Regarding light fastness, after measuring densities ($D_B$, $D_G$, $D_R$) Ci just after printing with X-rite 310, the image was irradiated with a xenon lamp (85,000 lux) for 10 days with a weather meter (manufactured by Atlas). After that, the densities Cf were measured, and light fastness was evaluated by finding the residual rate of dye [(Cf/Ci)×100].

The case where the residual rate of dye is 80% or more in all of $D_B$, $D_G$, $D_R$ is graded A, the case of from 70 to 80% even at a part is graded B, and the case of less than 70% even at a part is graded C.

3-2) With the gray step pattern used in the evaluation of hue, the image was irradiated with a xenon lamp (85,000 lux) for 10 days with a weather meter (manufactured by Atlas). The gray tone in each printed density after exposure to xenon lamp was visually judged. The case showing preferred gray tone in each density is graded A, the case where density of losing gray balance here and there is found is graded B, and the case where almost all the densities lose gray balance is graded C.
4) Ozone-proofness
4-1) Regarding ozone-proofness, after measuring densities ($D_B$, $D_G$, $D_R$) Ci just after printing with X-rite 310, the image was exposed to ozone gas in a box set at ozone gas concentration of 5 ppm for 170 hours. After that, densities Cf were measured, and ozone-proofness was evaluated by finding the residual rate of dye [(Cf/Ci)×100].

The ozone gas concentration in the box was set with an ozone gas monitor (model OZG-EM-01, manufactured by APPLICS).

The case where the residual rate of dye is 80% or more in all of $D_B$, $D_G$, $D_R$ is graded A, the case of from 70 to 80% even at a part is graded B, and the case of less than 70% even at a part is graded C.

4-2) With the gray step pattern used in the evaluation of hue, the image was exposed to ozone gas in a box set at ozone gas concentration of 5 ppm for 170 hours. The gray tone in each printed density after exposure to xenon lamp was visually judged. The case showing preferred gray tone in each density is graded A, the case where density of losing gray balance here and there is found is graded B, and the case where almost all the densities lose gray balance is graded C.

5) Regarding image blotting of black ink under high humidity condition, a checkered image having a line width of 0.2 mm and an interval between lines of 0.2 mm was made with imaging software Photoshop (manufactured by Adobe Systems Incorporated). A black-and-white checkered image sample comprising lines in black (R:0, G:0, B:0) and intervals between lines in white (R:255, G:255, B:255) was formed, and blotting of the image after being allowed to stand on the conditions of 25° C. 90% RH for 7 days was visually judged.

An image having no blotting in the area between the lines of checker is graded A, an image where the hue of color correction dye is observed a little is graded B, an image where the color correction dye is clearly blotted on the white area is graded C, and an image where not only the color correction dye but also the black dye are conspicuously blotted is graded D.

The results obtained are shown in Table 2 below.

TABLE 2

| Black Ink | Hue | Light Fastness | | Ozone proofness | | Blotting |
|---|---|---|---|---|---|---|
| | | Fastness | Hue | Fastness | Hue | |
| B-1 | A | A | A | A | A | A |
| B-2 | A | A | A | A | A | A |
| B-3 (comparison) | B | A | C | A | C | C |
| B-4 (comparison) | B | A | C | A | C | C |
| B-5 | A | A | A | A | A | A |
| B-6 | A | A | A | A | A | A |
| B-7 | A | A | A | A | A | A |
| B-8 | A | A | A | A | A | A |
| B-9 | A | A | A | A | A | A |
| B-10 (comparison) | A | B | C | B | C | A |
| B-11 (comparison) | A | C | C | C | C | D |
| B-12 (comparison) | A | C | C | C | C | D |

In black inks B-3 and B-4 in which comparative dyes are used, since the absorption in short wavelength region is not sufficient and the black hue is insufficient, inferior in light fastness, so that the absorption in short wavelength is reduced due to exposure to light and ozone, and further, the hue results in deviation from gray. When the black image is formed with the black ink of the invention, it has been confirmed that the ink composition in the invention is excellent in hue, light fastness, discoloration balance, and anti-blotting.

When the same tests were carried out except for changing image-receiving sheets, almost the same results as in Table 2 were obtained. As the image-receiving sheets, Kassai (Photo Finish Advance, manufactured by Fuji Photo Film Co., Ltd.) double weight Hi, photographic paper CRISPIA (high glossy, manufactured by SEIKO EPSON CORPORATION), photographic paper (glossy, manufactured by SEIKO EPSON CORPORATION), Professional Photo Paper (manufactured by Canon Inc.), Super Photo Paper (manufactured by Canon Inc.), and Photolike QP (photographic image quality, manufactured by KONICA MINOLTA HOLDINGS, INC.) super double weight, were used.

EXAMPLE 2

Preparation of Each Ink Composition

Each ink composition was prepared by stirring at room temperature for 30 minutes the components based on the composition shown in Tables 3 and 4 below, and filtering the obtained solution through a membrane filter having opening of 1.0 μm. In Tables 3 and 4, the numerical value of each component is shown in wt % taking the mass of the ink composition as 100%, and "the rest" that shows the amount of water means the amount making 100% in total with the components other than water.

TABLE 3

|  | Y-1 | Y-2 | Y-3 | Y-4 | Y-5 | M-1 | M-2 | M-3 | M-4 | M-5 | C-1 | C-2 | C-3 | C-4 | C-5 |
|---|---|---|---|---|---|---|---|---|---|---|---|---|---|---|---|
| YELLOW-1 | 5 |  |  | 4 |  |  |  |  |  |  |  |  |  |  |  |
| YELLOW-2 |  | 5 |  |  |  |  |  |  |  |  |  |  |  |  |  |
| YELLOW-3 |  |  | 5 |  |  |  |  |  |  |  |  |  |  |  |  |
| YELLOW-4 |  |  |  | 1 |  |  |  |  |  |  |  |  |  |  |  |
| YELLOW-5 |  |  |  |  | 1.5 |  |  |  |  |  |  |  |  |  |  |
| YELLOW-6 |  |  |  |  | 1.5 |  |  |  |  |  |  |  |  |  |  |
| YELLOW-7 |  |  |  |  | 0.5 |  |  |  |  |  |  |  |  |  |  |
| MAGENTA-1 |  |  |  |  |  | 3.2 |  |  |  |  |  |  |  |  |  |
| MAGENTA-2 |  |  |  |  |  |  | 3.2 |  |  |  |  |  |  |  |  |
| MAGENTA-3 |  |  |  |  |  |  |  | 3.2 |  |  |  |  |  |  |  |
| MAGENTA-4 |  |  |  |  |  |  |  |  | 3 |  |  |  |  |  |  |
| MAGENTA-5 |  |  |  |  |  |  |  |  |  | 4 |  |  |  |  |  |
| CYAN-1 |  |  |  |  |  |  |  |  |  |  | 5 | 4.5 | 4 |  |  |
| CYAN-2 |  |  |  |  |  |  |  |  |  |  |  | 0.5 | 1 |  |  |
| CYAN-3 |  |  |  |  |  |  |  |  |  |  |  |  |  |  |  |
| CYAN-4 |  |  |  |  |  |  |  |  |  |  |  |  |  | 5 |  |
| CYAN-5 |  |  |  |  |  |  |  |  |  |  |  |  |  |  | 5 |
| Glycerol | 12 | 12 | 12 | 12 | 12 | 10 | 10 | 10 | 10 | 10 | 12 | 12 | 12 | 12 | 12 |
| Triethylene glycol | 10 | 10 | 10 | 10 | 10 | 2 | 2 | 2 | 2 | 2 | 11 | 11 | 11 | 11 | 11 |
| Propylene glycol |  |  |  | 3 | 5 |  | 2 |  | 2 | 2 |  | 2 |  | 2 | 2 |
| TEGmBe | 10 | 10 | 10 | 7 | 5 | 10 | 10 | 10 | 10 | 10 | 9 | 9 | 9 | 9 | 9 |
| Sarfinol 465 (*1) | 1 | 1 | 1 | 1 | 1 | 1 | 1 | 1 | 1 | 1 | 1 | 1 | 1 | 1 | 1 |
| Urea | 2 | 2 | 2 | 2 | 2 | 2.5 | 2.5 | 2.5 | 2.5 | 2.5 | 2 | 2 | 2 | 2 | 2 |
| 1,2-Hexanediol |  |  | 2 | 3 | 3 |  |  | 2 | 5 | 5 | 2 | 2 |  | 2 | 2 |
| 2,5-Dimethyl-2,4-hexanediol |  | 2 |  |  |  |  | 2 |  |  |  |  | 2 |  |  |  |
| Triethanolamine | 0.1 | 0.1 | 0.1 | 0.1 | 0.1 | 0.2 | 0.2 | 0.2 | 0.2 | 0.2 | 0.1 | 0.1 | 0.1 | 0.1 | 0.1 |
| 2-Pyrrolidone |  |  |  |  |  |  |  |  |  |  | 4 | 4 | 4 | 4 | 4 |
| PROXEL XL2 (*2) | 0.3 | 0.3 | 0.3 | 0.3 | 0.3 | 0.1 | 0.1 | 0.1 | 0.1 | 0.1 | 0.1 | 0.1 | 0.1 | 0.1 | 0.1 |
| Water | The rest | The rest | The rest | The rest | The rest | The rest | The rest | The rest | The rest | The rest | The rest | The rest | The rest | The rest | The rest |

Unit: wt %
(*1): Manufactured by Air Products and Chemical, Inc.
(*2): Manufactured by Avecia

TABLE 4

|  | LM-1 | LM-2 | ML-3 | LM-4 | LM-5 | LC-1 | LC-2 | LC-3 | LC-4 | LC-5 |
|---|---|---|---|---|---|---|---|---|---|---|
| MAGENTA-1 | 1 |  |  |  |  |  |  |  |  |  |
| MAGENTA-2 |  | 1 |  |  |  |  |  |  |  |  |
| MAGENTA-3 |  |  | 1 |  |  |  |  |  |  |  |
| MAGENTA-4 |  |  |  | 2 |  |  |  |  |  |  |
| MAGENTA-5 |  |  |  |  | 2 |  |  |  |  |  |
| CYAN-1 |  |  |  |  |  | 1.7 |  |  |  |  |
| CYAN-2 |  |  |  |  |  |  | 1.7 |  |  |  |
| CYAN-3 |  |  |  |  |  |  |  | 1.7 |  |  |
| CYAN-4 |  |  |  |  |  |  |  |  | 1.7 |  |
| CYAN-5 |  |  |  |  |  |  |  |  |  | 1.5 |
| Glycerol | 12 | 12 | 12 | 12 | 12 | 11 | 11 | 11 | 11 | 11 |
| Triethylene glycol | 10 | 10 | 10 | 10 | 8 | 4.5 | 4.5 | 2 | 4.5 | 3.5 |
| Propylene glycol |  |  |  |  | 2 |  |  | 2.5 |  |  |
| TEGmBE | 11 | 11 | 11 | 11 | 11 | 10 | 10 | 10 | 10 | 10 |
| Sarfinol 465 (*1) | 1 | 1 | 1 | 1 | 1 | 1 | 1 | 1 | 1 | 1 |
| Urea | 2.5 | 2.5 | 2.5 | 2.5 | 2.5 | 2.5 | 2.5 | 2.5 | 2.5 | 2.5 |
| 1,2-Hexanediol |  |  | 3 |  |  | 3.4 |  | 3.4 | 3.4 | 3.4 |
| 2,5-Dimethyl-2,5-hexanediol |  | 3 |  |  |  |  | 3.4 |  |  |  |
| Triethanolamine | 0.2 | 0.2 | 0.2 | 0.2 | 0.2 | 0.2 | 0.2 | 0.2 | 0.2 | 0.2 |
| PROXEL XL2 (*2) | 0.1 | 0.1 | 0.1 | 0.1 | 0.1 | 0.1 | 0.1 | 0.1 | 0.1 | 0.1 |
| Water | The rest | The rest | The rest | The rest | The rest | The rest | The rest | The rest | The rest | The rest |

Unit: wt %
(*1): Manufactured by Air Products and Chemical, Inc.
(*2): Manufactured by Avecia

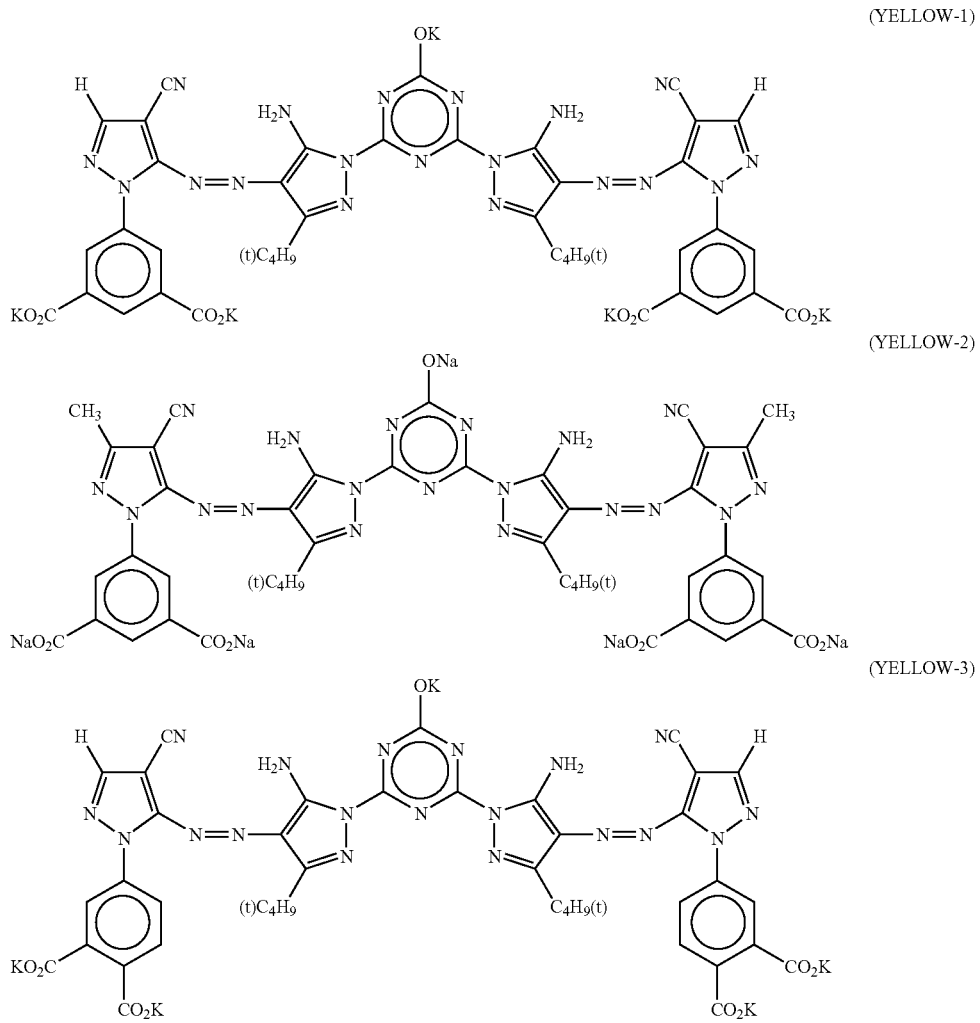

Compound (YELLOW-1) can be synthesized according to the following method.

(1) Synthesis of Compound (YELLOW-1b):

Sodium hydrogencarbonate (25.5 g) and 150 ml of ion exchange water were heated at 40° C., and 25.0 g of cyanuric chloride (manufactured by Tokyo Chemical Industry Co., Ltd.) was added in parts by 1/5 with every 10 minutes, and the mixture was stirred for 1 hour. The solution was dropped to a mixed solution (8° C.) of 52.8 ml of hydrazine and 47 ml of ion exchange water so that the inner temperature was not higher than 10° C. The inner temperature was raised to 50° C. and the solution was stirred for 30 minutes. The precipitated crystal was filtered to obtain 23.4 g of Compound b (YELLOW-1b) (hydrazine derivative, m.p.>300° C.). The yield was 94.7%.

(2) Synthesis of Compound (YELLOW-1c):

The compound (YELLOW-1b) (hydrazine derivative) (35.0 g) was suspended in 420 ml of ethylene glycol and stirred at inner temperature of 50° C. To the solution was added 59 ml of concentrated hydrochloric acid, and then 60.1 g of pivaloyl acetonitrile (manufactured by Tokyo Chemical Industry Co., Ltd.), and the solution was stirred at 50° C. for 10 hours. Concentrated hydrochloric acid (95 ml) and 145 ml of methanol were added, and stirring was continued for further 8 hours. The temperature was lowered to room temperature, and the precipitated crystal was filtered to obtain 81.6 g of Compound c (5-aminopyrazole derivative, m.p.=233 to 235° C.). The yield was 94.2%. $^{1}$H-NMR (DMSO-d6), δ value TMS standard: 1.2 to 1.3 (18H, s)

(3) Synthesis of Compound (YELLOW-1e):

Compound d (manufactured by Tokyo Chemical Industry Co., Ltd.) (90.57 g) was suspended in 500 ml of $H_2O$, and 130 ml of concentrated hydrochloric acid was poured thereto and the inner temperature was lowered to 5° C. or lower. Subsequently, an aqueous solution containing 36.23 g of sodium nitrite and 70 ml of ( ) was dropped thereto at inner temperature of from 4 to 6° C., and the mixed solution was stirred at inner temperature of 5° C. or lower for 30 minutes. After that, 159 g of sodium sulfite and 636 ml of $H_2O$ were poured thereto while maintaining the inner temperature at 20° C. or lower, and then 250 ml of concentrated hydrochloric acid was poured thereto at inner temperature of 25° C., after stirring the solution for 1 hour at inner temperature of 90° C., the inner temperature was lowered to room temperature, and the reaction product was filtered and washed with 200 ml of water and dried to obtain 80.0 g of Compound e.

(4) Synthesis of Compound (YELLOW-1f):

After 28 ml of triethylamine was dropped into a suspension containing 23.3 g of Compound e and 209 ml of ethanol at room temperature, 12.2 g of ethoxymethylene malononitrile (a product of ALDRICH) was added thereto in parts, and the suspension was refluxed for 3 hours. The inner temperature was lowered to room temperature, and the reaction solution was filtered, washed with 400 ml of isopropyl alcohol and dried, whereby 23.57 g of Compound f was obtained.

(5) Synthesis of Compound (YELLOW-1):

Into 32.4 ml of sulfuric acid was poured 145.56 ml of acetic acid at inner temperature of 4° C. or lower, subsequently 15.9 ml of 40% nitrosylsulfuric acid (a product of ALDRICH) was dropped thereto at inner temperature of 7° C. or lower while stirring.

Compound (YELLOW-1f) (32.4 g) was added in parts to the above solution, after stirring the solution at inner temperature at 10° C. for 60 minutes, 18.8 g of Compound C obtained by the addition of 1.83 g of urea to the reaction solution was suspended in 470 ml of methanol, and to this solution was dropwise added diazonium salt at inner temperature of higher than 0° C., and the solution was stirred at the same temperature for 30 minutes, the temperature of the reaction solution was increased to room temperature, and then the solution was filtered, washed with methanol, and then with $H_2O$ to thereby obtain crude crystal. Subsequently, the crude crystal was suspended in 400 ml of methanol, and the suspension was stirred for 1 hour with refluxing, the temperature was lowered to room temperature, and the reaction solution was filtered, washed with methanol, with water, and then with methanol, dried at 75° C. overnight, whereby 34.4 g of free acid type crystal of Dye-11 was obtained. The obtained crystal was made a 10 wt % aqueous solution with KOH (at 25° C., pH:about 8.3), IPA was added to the solution at inner temperature at 50° C. and crystallized, cooled, filtered, washed with IPA, and dried, whereby 35 g of (YELLOW-1) (potassium salt) was obtained. $\lambda max=436.4$ nm ($H_2O$), $\epsilon:3.53\times10^4$ ($dm^3 \cdot cm/mol$)

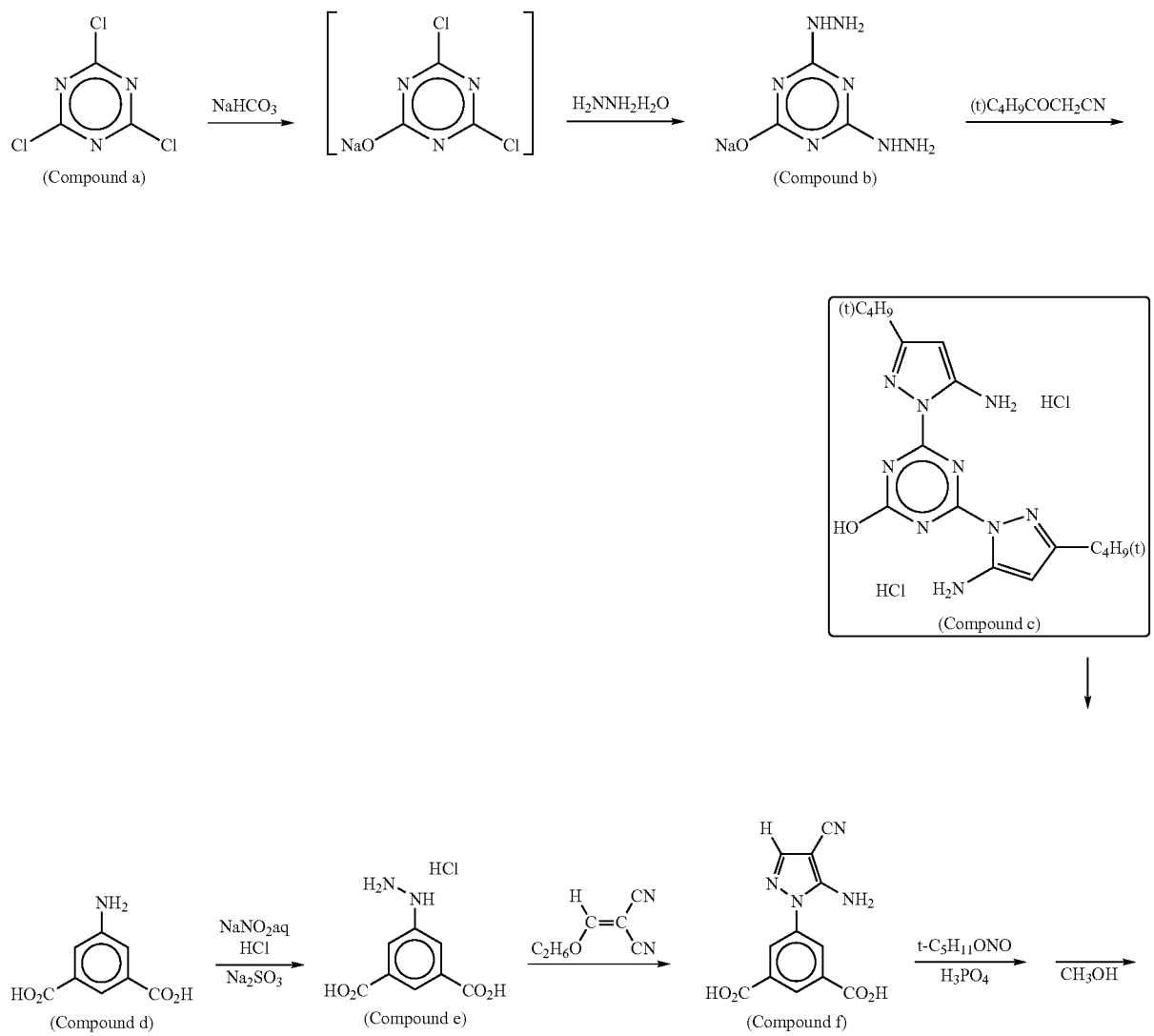

-continued
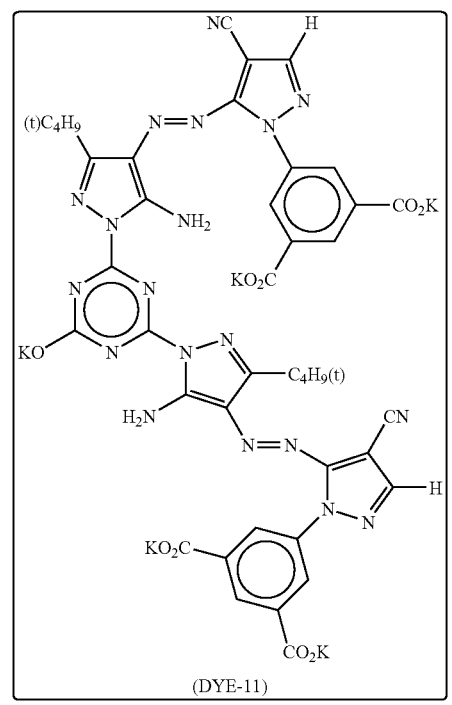
(DYE-11)
(YELLOW-4)
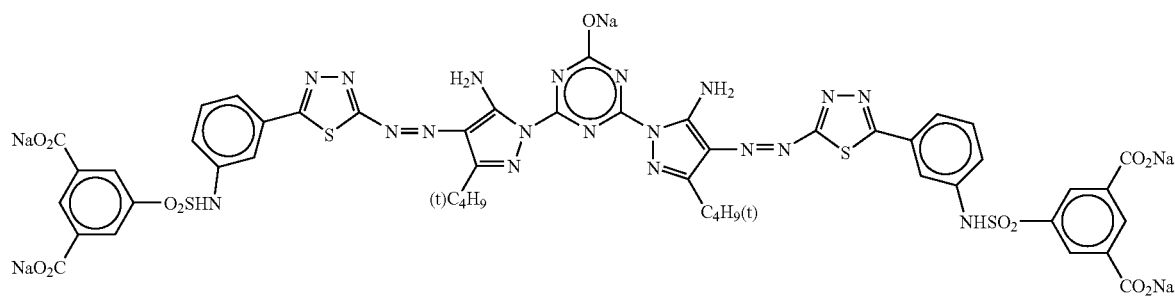
(YELLOW-5):C.I. Direct Yellow 132
(YELLOW-6):C.I. Direct Yellow 86
(YELLOW-7):C.I. Direct Yellow 58
As magenta dyes, the following (MAGENTA-1), (MAGENTA-2), (MAGENTA-3), (MAGENTA-4), and (MAGENTA-5) were used.
-continued
(MAGENTA-1)
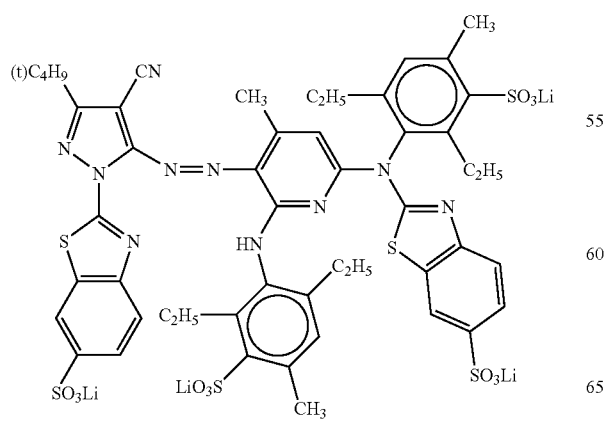
(MAGENTA-2)
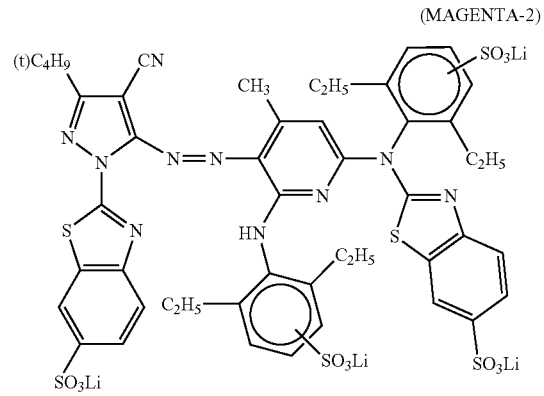

-continued

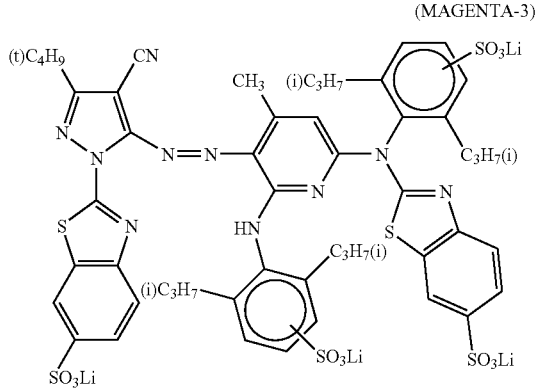

(MAGENTA-1) can be synthesized according to the following method.

(1) Synthesis of Compound (MAGENTA-1a):

5-Amino-3-tert-butyl-4-cyanopyrazole (1) (24.1 g) (0.147 mol), 45 ml of concentrated hydrochloric acid, 30 ml of acetic acid, and 45 ml of propionic acid were stirred at inner temperature of 0° C., and 10.1 g (0.147 mol) of sodium nitrite dissolved in 20 ml of water was dropped to the above solution for 10 minutes. The solution was stirred for 30 minutes as it was. Coupler component (2) (84.7 g) (0.147 mol) was dissolved in 231 ml of methanesulfonic acid, 147 ml of acetic acid, and 221 ml of propionic acid, the solution was stirred at 0° C., and the above diazonium salt was added to the solution over 30 minutes. After the addition of the diazonium salt, the reaction solution was further stirred for 30 minutes, and then the reaction solution was gradually added to 2,250 ml of water added with 750 g of ice and stirred. Precipitated compound (MAGENTA-1a) was filtered by suction and isolated. Yield: 73.8 g, 85%.

(2) Synthesis of Compound (MAGENTA-1b):

To 21 g (35.5 mmol) of the compound (MAGENTA-1a) were added 26.6 g (157 mmol) of heterylizing agent (3), 21.7 g of potassium carbonate, and 147 ml of DMSO, and the mixture was heated at inner temperature of 92° C. and stirred for 4 hours while nitrogen bubbling. After termination of stirring, the temperature was lowered to room temperature, and the compound (d5-b) precipitated from the reaction system was filtered by suction and isolated. This crude crystal was further dispersed in 3 liters of water to dissolve excessive amount of potassium carbonate, filtered by suction, whereby objective compound (MAGENTA-1b) was obtained. Yield: 20.0 g, 63.5%. λmax=558 nm (DMF solution), m/Z (POSI)=858.

(3) Synthesis of Compound (MAGENTA-1):

Compound (MAGENTA-1b) (2 g) (2.33 mmol) was dispersed in 7 g of Sulforan (manufactured by Tokyo Chemical Industry Co., Ltd.), and 1.7 g of NISSO SULFAN (sulfur trioxide, manufactured by NISSO METALLOCHEMICAL CO., LTD.) was dropped to the dispersion at inner temperature of 15° C. After termination of dropping, the dispersion was allowed to react for 2 hours at inner temperature of 70° C. After the reaction, the reaction solution was cooled to 20° C., and 2 ml of water was dropped to the reaction solution. The inner temperature was lowered to 5° C., and 3.3 ml of a 25 wt % sodium hydroxide aqueous solution was dropped thereto, and 0.8 ml of a 28 wt % methanol solution of sodium methoxide was further dropped. Further, 4 ml of methanol was dropped, and the precipitated inorganic salt was filtered and washed with 2 ml of methanol. Potassium acetate (2 g) and 5.6 ml of methanol were added to the filtrate, further 2.5 ml of ethanol was added to crystallize the dye, and the crystal was filtered by suction and washed with ethanol, whereby crude crystal of compound (MAGENTA-1) was obtained. The crude crystal containing the inorganic salt was purified by demineralization with Sephadex LH-20 gel chromatography (eluent, water/methanol:1/1 (v/v), manufactured by Pharmacia) to obtain compound (MAGENTA-1). Yield:2 g, 66%. λmax (DMSO)=567.1 nm, ε=46,900

Synthesis of (MAGENTA-1)

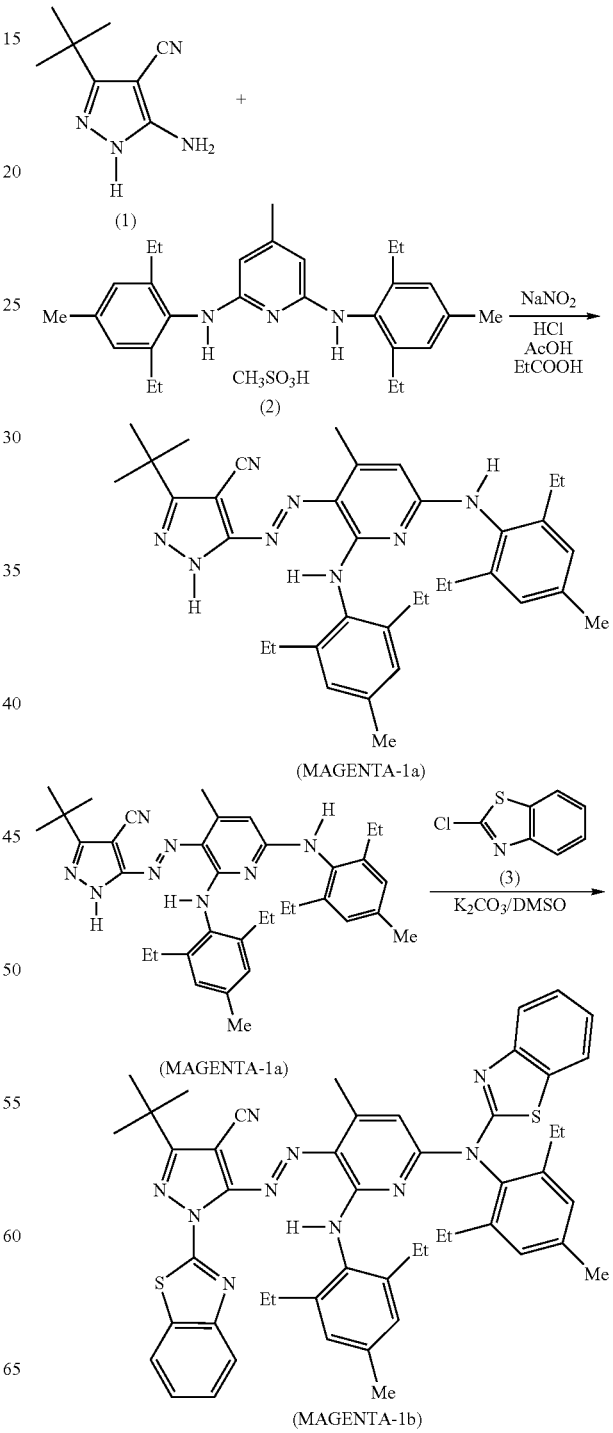

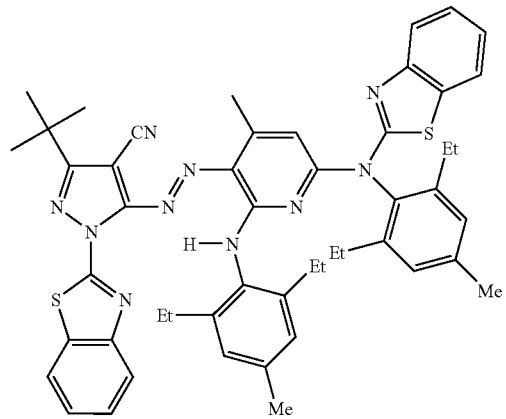
(MAGENTA-1b)
SO₃ →
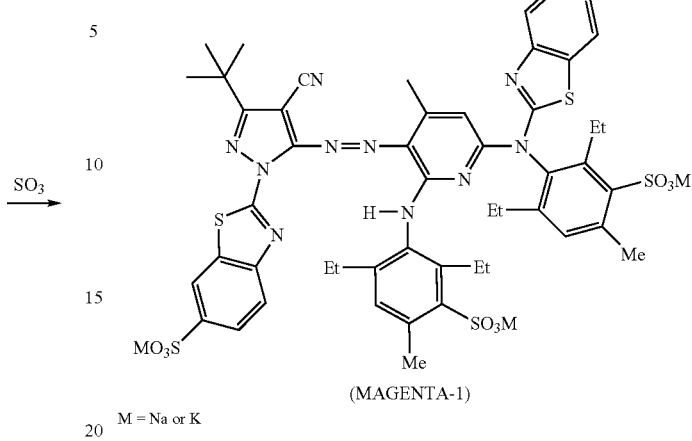
(MAGENTA-1)
M = Na or K
Compound (MAGENTA-2) and Compound (MAGENTA-3) can also be synthesized according to the similar synthesizing methods.
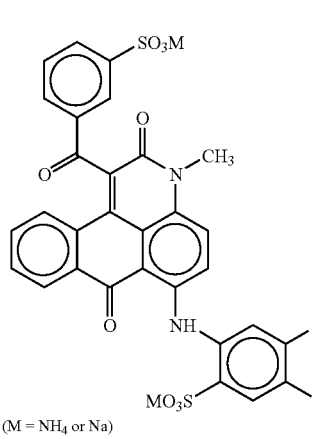
(M = NH₄ or Na)
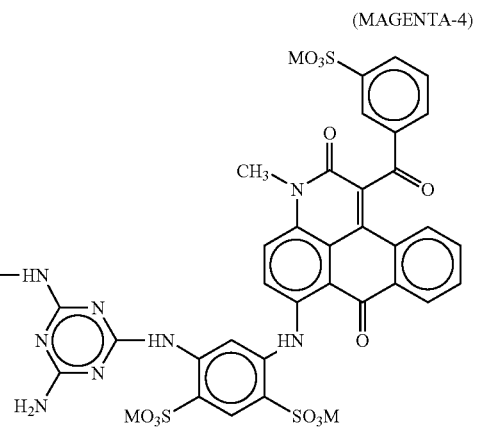
(MAGENTA-4)
(MAGENTA-5)
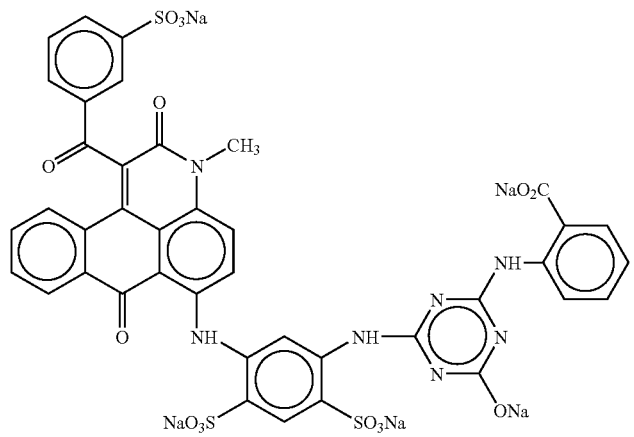
In Tables 3 and 4, as the cyan dyes, the following (CYAN-1), (CYAN-2), (CYAN-3), (CYAN-4) and (CYAN-5) were used.

(CYAN-1)
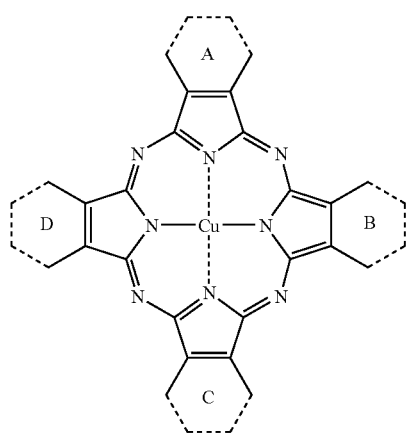
One of rings A to D represents:
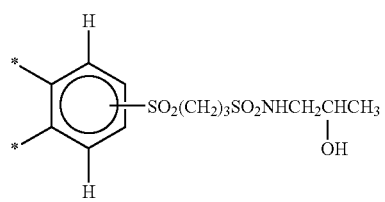
The remaining three represent:
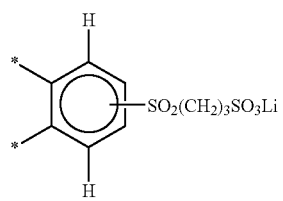
*is bonding position of the phthalocyanine ring.
(CYAN-2)
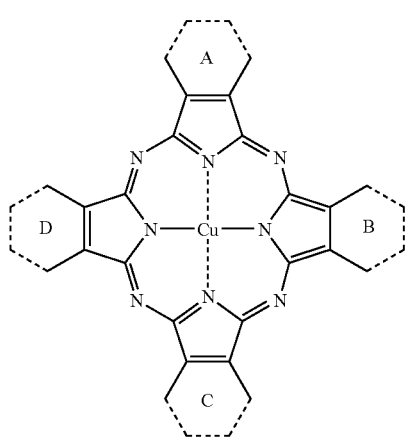
Two of rings A to D represent:
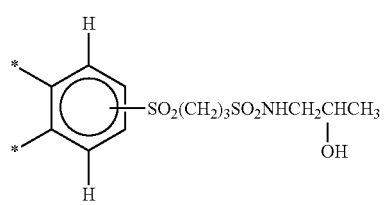
The remaining two represent:
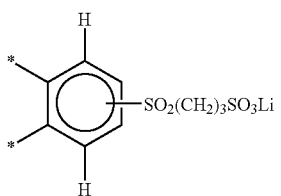
*is bonding position of the phthalocyanine ring.
(CYAN-3)
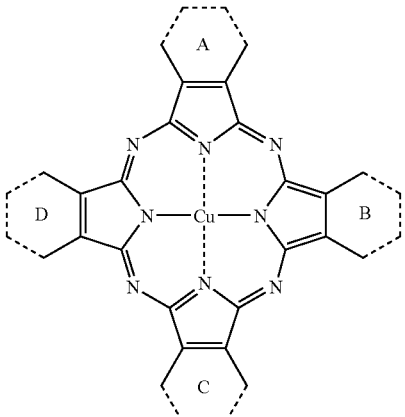
One of rings A to D represents:
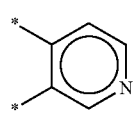
The remaining three represent:
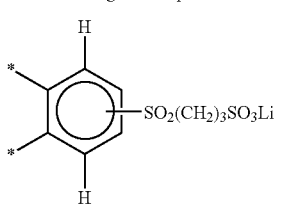
*is bonding position of the phthalocyanine ring.
(CYAN-4)
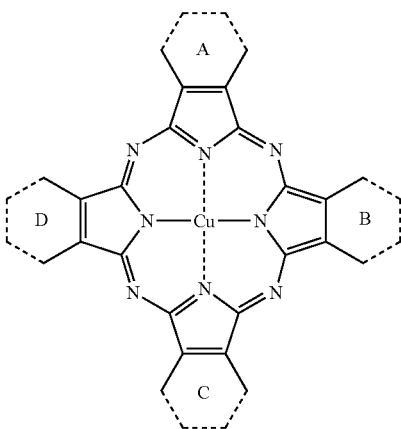
a: 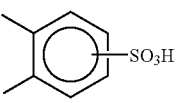

-continued

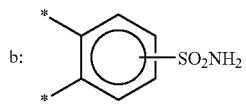

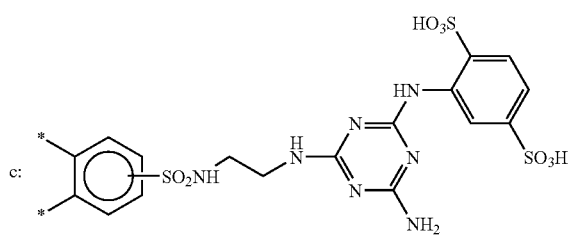

* is bonding position of the phthalocyanine ring.

The mixture of the following Compounds I to III.

$c=0, a+b=4$   I.

$c=1, a+b=3$   II.

$c=2, a+b=2$   III.

(CYAN-5):C.I. Direct Blue 199

Each of ink sets 1 to 10 was manufactured with each ink composition prepared above according to the combination as shown in Table 5 below.

density of step pattern was measured with densitometer X-rite 310 loading Status A Filter, and the change in density was measured.

2) Light fastness

Regarding light fastness, after measuring densities ($D_B$, $D_G$, $D_R$) Ci just after printing with X-rite 310, the image was irradiated with a xenon lamp (85,000 lux) for 10 days with a weather meter (manufactured by Atlas). After that, the densities Cf were measured, and light fastness was evaluated by finding the residual rate of dye [(Cf/Ci)×100].

The case where the residual rate of dye is 80% or more in all of $D_B$, $D_G$, $D_R$ is graded A, the case of from 70 to 80% even at a part is graded B, and the case of less than 70% even at a part is graded C.

3) Ozone-proofness

Regarding ozone-proofness, after measuring densities ($D_B$, $D_G$, $D_R$) Ci just after printing with X-rite 310, the image was exposed to ozone gas in a box set at ozone gas concentration of 5 ppm for 170 hours. After that, densities Cf were measured, and ozone-proofness was evaluated by finding the residual rate of dye [(Cf/Ci)×100].

The ozone gas concentration in the box was set with an ozone gas monitor (model OZG-EM-01, manufactured by APPLICS).

The case where the residual rate of dye is 80% or more in all of $D_B$, $D_G$, $D_R$ is graded A, the case of from 70 to 80% even at a part is graded B, and the case of less than 70% even at a part is graded C.

TABLE 5

| | Yellow | Light Magenta | Magenta | Light Cyan | Cyan | Black |
|---|---|---|---|---|---|---|
| Ink Set 1 | Y-1 | LM-1 | M-1 | LC-1 | C-1 | B-1 |
| Ink Set 2 | Y-2 | LM-2 | M-2 | LC-2 | C-2 | B-1 |
| Ink Set 3 | Y-3 | LM-3 | M-3 | LC-3 | C-3 | B-1 |
| Ink Set 4 | Y-4 | LM-4 | M-4 | LC-4 | C-4 | B-2 |
| Ink Set 5 | Y-5 | LM-5 | M-5 | LC-5 | C-5 | B-2 |
| Ink Set 6 | ICY32 (EPSON) | ICLM32 (EPSON) | ICM32 (EPSON) | ICLC32 (EPSON) | ICC32 (EPSON) | B-1 |
| Ink Set 7 | BCI-7Y (Canon) | BCI-7PM (Canon) | BCI-7M (Canon) | BCI-7PC (Canon) | BCI-7C (Canon) | B-1 |
| Ink Set 8 (Comparison) | Y-1 | LM-1 | M-1 | LC-1 | C-1 | B-3 |
| Ink Set 9 (Comparison) | Y-2 | LM-2 | M-2 | LC-2 | C-2 | B-3 |
| Ink Set 10 (Comparison) | Y-3 | LM-3 | M-3 | LC-3 | C-3 | B-3 |

Each of these inks was filled in a corresponding ink cartridge of Ink Jet Printer PMG820 (manufactured by SEIKO EPSON CORPORATION). In ink set 6, genuine inks for PMG820 were used as they were except for the black ink, and in ink set 7, ink of each color of BCI-7 (manufactured by Canon Inc.) was extracted and filled in a corresponding ink cartridge for PMG800, and these ink cartridges were loaded on PMG800, and printing was performed.

Evaluation:

1) Regarding image preservation stability, a black solid image of R:0, G:0, B:0 was made with imaging software Photoshop (manufactured by Adobe Systems Incorporated), and the black solid image was printed. The evaluations of the following 2) and 3) were performed with the obtained image. In evaluation of image preservation stability, the 4) Regarding image blotting of black ink under high humidity condition, the same black-and-white checkered image used in Example 1, a black-and-magenta checkered image formed by making the white area of the above image OD=1.0 of magenta, and a black-and-cyan checkered image formed by making the white area OD=1.0 of cyan, were prepared, and respective image samples were formed. With each image sample, blotting of each image after being allowed to stand on the conditions of 25° C. 90% RH for 7 days was visually judged.

An image having no blotting in the white area, the magenta area and the cyan area between the lines of checker is graded A, an image where the hue of color correction dye is observed a little is graded B, and an image where the color correction dye is clearly blotted on the white area is graded C.

The results obtained are shown in Table 6 below.

TABLE 6

| | Blotting under High Humidity | | | | |
|---|---|---|---|---|---|
| | Light Fastness | Ozone Proofness | Black/ White | Black/ Magenta | Black/Cyan |
| Ink Set 1 | A | A | A | A | A |
| Ink Set 2 | A | A | A | A | A |
| Ink Set 3 | A | A | A | A | A |
| Ink Set 4 | A | A | A | A | A |
| Ink Set 5 | A | A | A | A | A |
| Ink Set 6 | A | A | A | A | A |
| Ink Set 7 | A | A | A | A | A |
| Ink Set 8 (Comparison) | A | A | C | C | C |
| Ink Set 9 (Comparison) | A | A | C | C | C |
| Ink Set 10 (Comparison) | A | A | C | C | C |

Regarding blotting under high humidity condition, in the ink sets in comparative examples, blotting of the color correction dye in the black-and-magenta checker and the black-and-cyan checker is conspicuously deteriorated by the influence of the ink solvents coming from the magenta ink and the cyan ink, as compared with the black-and-white checker. On the other hand, in the ink sets in the invention, blotting of the color correction dye is not observed even in the black-and-magenta checker and the black-and-cyan checker, and it is confirmed that the ink sets in the invention show excellent anti-blotting property under high humidity condition.

When the same tests were carried out except for changing image-receiving sheets, almost the same results as in Table 6 were obtained. As the image-receiving sheets, Kassai (Photo Finish Advance, manufactured by Fuji Photo Film Co., Ltd.) double weight Hi, photographic paper CRISPIA (high glossy, manufactured by SEIKO EPSON CORPORATION), photographic paper (glossy, manufactured by SEIKO EPSON CORPORATION), Professional Photo Paper (manufactured by Canon Inc.), Super Photo Paper (manufactured by Canon Inc.), and Photolike QP (photographic image quality, manufactured by KONICA MINOLTA HOLDINGS, INC.) super double weight, were used.

INDUSTRIAL APPLICABILITY

By the use of the ink composition in the invention in ink jet recording, an image having high black tone and high print density, and highly fast to light and active gases in the environment can be formed, and blotting of image during preservation under high temperature high humidity condition can be greatly improved.

The entire disclosure of each and every foreign patent application from which the benefit of foreign priority has been claimed in the present application is incorporated herein by reference, as if fully set forth.

The invention claimed is:
1. An ink composition, which comprises:
at least two kinds of water-soluble dyes,
wherein at least one of the at least two kinds of water-soluble dyes is a compound selected from the group consisting of a compound represented by formula (S-1) and a salt of the compound represented by formula (S-1); and
at least one of the at least two kinds of water-soluble dyes is a compound having a naphthalene ring substituted with at least one hydroxyl group and three or more azo groups, which is a compound selected from the group consisting of a compound represented by formula (L-2), a salt of the compound represented by formula (L-2), a compound represented by formula (L-2a), a salt of the compound represented by formula (L-2a), a compound represented by formula (L-3), and a salt of the compound represented by formula (L-3):

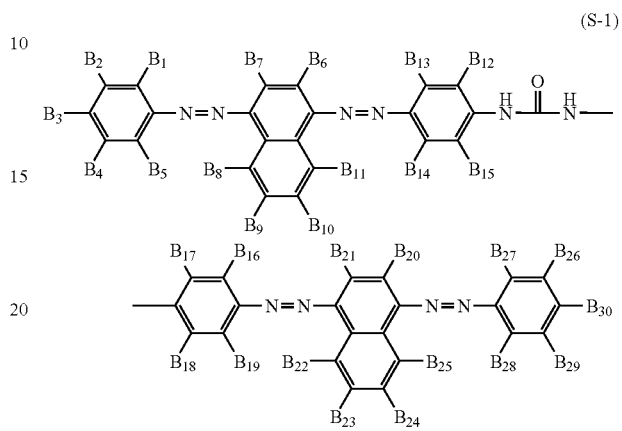

(S-1)

wherein $B_1$ to $B_{30}$ each independently represents a hydrogen atom or an ionic hydrophilic group, provided that at least one of $B_1$ to $B_{30}$ contains at least one ionic hydrophilic group;

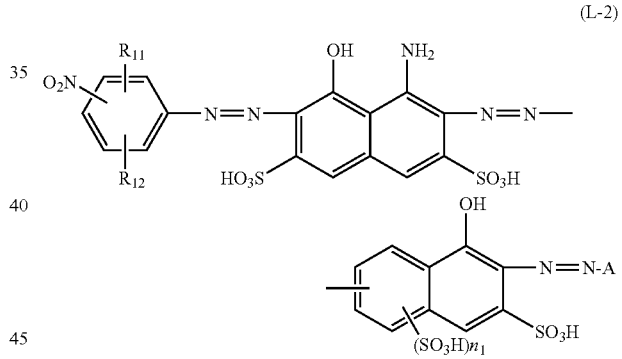

(L-2)

wherein $R_{11}$ and $R_{12}$ each independently represents a hydrogen atom; a halogen atom; a cyano group; a carboxyl group; a sulfo group; a sulfamoyl group that may be substituted with an alkyl group or a phenyl group; a phosphoric acid group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group or a carboxyl group; or an acylamino group that may be substituted with a hydroxyl group, an alkoxyl group having from 1 to 4 carbon atoms, a sulfo group or a carboxyl group;

A represents a phenyl group or a naphthyl group, and each of the phenyl group and the naphthyl group may be substituted with a halogen atom; a cyano group; a carboxyl group; a sulfo group; a sulfamoyl group that may be substituted with an alkyl group or a phenyl group; a phosphoric acid group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group or a carboxyl group; or an acylamino group that may be substituted with a hydroxyl group, an alkoxyl group having from 1 to 4 carbon atoms, a sulfo group or a carboxyl group; and $n_1$ represents 0 or 1;

$R^6$, $R^7$ and $R^8$ each independently represents a hydrogen atom; a halogen atom; a cyano group; a carboxyl group; a sulfo group; a nitro group; an alkyl group having from 1 to 4 carbon atoms; a hydroxyl group; an alkoxyl group having from 1 to 4 carbon atoms that may be substituted with a sulfo group; or an acylamino group that may be substituted with a hydroxyl group, an alkoxyl group having from 1 to 4 carbon atoms or a sulfo group;

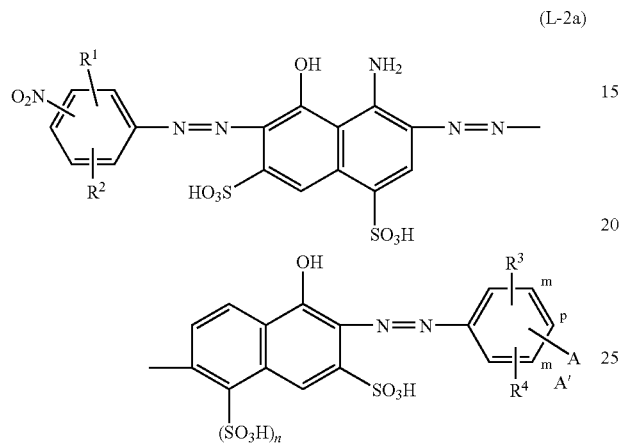

(L-2a)

wherein A' represents formula (L-2a-1);

the substitution position of A' is the m- or p-position to the azo group;

$R^1$ and $R^2$ each represents a hydrogen atom; a halogen atom; a cyano group; a carboxyl group; a sulfo group; a sulfamoyl group; an N-alkylaminosulfonyl group; an N-phenylamino- sulfonyl group; a phospho group; a nitro group; an acyl group; a ureido group; an alkyl group having from 1 to 4 carbon atoms that may be substituted with a hydroxyl group or an alkoxyl group having from 1 to 4 carbon atoms; an alkoxyl group having from 1 to 4 carbon atoms that may be substituted with a hydroxyl group, an alkoxyl group having from 1 to 4 carbon atoms, a sulfo group, or a carboxyl group; or an acylamino group that may be substituted with an alkoxyl group having from 1 to 4 carbon atoms, a sulfo group or a carboxyl group;

$R^3$ and $R^4$ each independently represents a hydrogen atom; a halogen atom; a cyano group; a carboxyl group; a sulfo group; a nitro group; an alkyl group having from 1 to 4 carbon atoms; a hydroxyl group; or an alkoxyl group having from 1 to 4 carbon atoms that may be substituted with an alkoxyl group having from 1 to 4 carbon atoms or a sulfo group; and n represents 0 or 1;

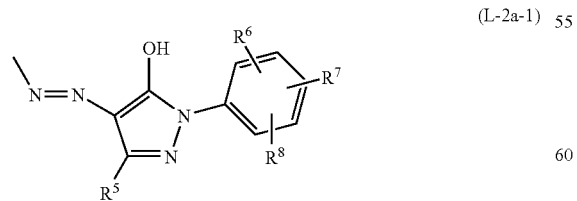

(L-2a-1)

wherein $R_5$ represents a cyano group; a carboxyl group; an alkyl group having from 1 to 4 carbon atoms; an alkoxycarbonyl group having from 1 to 4 carbon atoms; or a phenyl group;

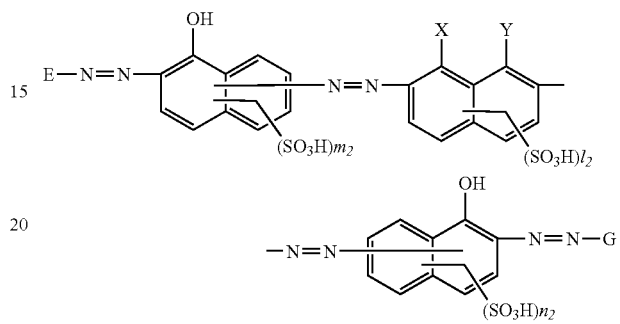

(L-3)

wherein E and G each independently represents a phenyl group that may be substituted; a naphthyl group that may be substituted; or a 5- or 6-membered aromatic heterocyclic group bonding to the azo group via a carbon atom, and each of E and G contains one or more carboxyl groups, one or more sulfo groups, or one or more carboxyl groups and one or more sulfo groups;

one of X and Y represents a hydroxyl group, and the other represents an amino group;

and $l_2$, $m_2$ and $n_2$ each independently represents 1 or 2.

2. The ink composition according to claim 1, wherein the number of azo groups of the compound having a naphthalene ring substituted with at least one hydroxyl group and three or more azo groups is five or less.

3. The ink composition according to claim 1, wherein the compound having a naphthalene ring substituted with at least one hydroxyl group and three or more azo groups contains one or more sulfonic acid group(s), one or more carboxyl group(s), or one or more sulfonic acid group(s) and one or more carboxyl group(s).

4. The ink composition according to claim 1, wherein at least one ionic hydrophilic group in the compound represented by formula (S-1) is a sulfo group.

5. The ink composition according to claim 1, which comprises
the compound represented by formula (S-1) and a salt of the compound represented by formula (S-1) in an amount of from 0.1 to 4 mass %.

6. The ink composition according to claim 1, wherein at least one of the compound represented by formula (S-1) and the compound having a naphthalene ring substituted with at least one hydroxyl group and three or more azo groups is a salt having a lithium ion as a counter ion.

7. An ink-manufacturing method, which comprises:
preparing an ink stock solution by dissolving a compound represented by formula (S-1) in water; and
reducing a concentration of the compound represented by formula (S-1) in the ink stock solution to make the ink composition according to claim 1.

8. The ink-manufacturing method according to claim 7, wherein the ink stock solution contains a water-miscible organic solvent.

9. The ink-manufacturing method according to claim 8, wherein the water-miscible organic solvent is selected from the group consisting of 2-pyrrolidone, triethylene glycol monobutyl ether, diethylene glycol monobutyl ether, triethylene glycol and diethylene glycol.

10. An ink composition, which is produced by the manufacturing method according to claim 7.

11. An ink set comprising an ink composition according to claim 1.

12. A recording method which comprises:
applying an ink composition according to claim 1 to a recording medium to perform record.

13. A recording method which comprises:
loading an ink set according to claim 11 in a recording apparatus; and
applying an ink composition from the recording apparatus to a recording medium.

14. The recording method according to claim 12, which comprises:
ejecting the ink composition from an ink jet nozzle to a recording medium.

* * * * *